US009509950B2

(12) United States Patent
Kobayashi

(10) Patent No.: US 9,509,950 B2
(45) Date of Patent: Nov. 29, 2016

(54) INFORMATION PROCESSING SYSTEM, INFORMATION PROCESSING METHOD, INFORMATION PROCESSING APPARATUS, AND CONTROL METHOD AND CONTROL PROGRAM OF INFORMATION PROCESSING APPARATUS

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/387,695

(22) PCT Filed: Feb. 28, 2013

(86) PCT No.: PCT/JP2013/055547
§ 371 (c)(1),
(2) Date: Sep. 24, 2014

(87) PCT Pub. No.: WO2013/146082
PCT Pub. Date: Oct. 3, 2013

(65) Prior Publication Data
US 2015/0116447 A1 Apr. 30, 2015

(30) Foreign Application Priority Data
Mar. 24, 2012 (JP) .................................. 2012-068503

(51) Int. Cl.
*H04N 7/15* (2006.01)
*H04W 4/00* (2009.01)
(Continued)

(52) U.S. Cl.
CPC ............ *H04N 7/15* (2013.01); *H04L 12/1818* (2013.01); *H04W 4/001* (2013.01); *H04W 8/18* (2013.01); *H04W 8/22* (2013.01); *H04W 76/02* (2013.01)

(58) Field of Classification Search
CPC .... H04L 12/1818; H04N 7/15; H04N 7/152; H04N 7/14; H04W 76/02; H04W 8/18; H04W 8/12; H04W 4/001
USPC ...................... 348/14.01–14.16; 379/202.01; 455/414.1
See application file for complete search history.

(56) References Cited

U.S. PATENT DOCUMENTS 5,781,731 A 7/1998 Koreeda et al.
6,738,635 B1 5/2004 Lewis et al.
(Continued)

FOREIGN PATENT DOCUMENTS

CN 1620054 A 5/2005
CN 1930558 A 3/2007
(Continued)

OTHER PUBLICATIONS

Patent Examination Report mailed Aug. 7, 2015 by the Australian Patent Office in counterpart Australian Patent Application No. 2013238427.
(Continued)

*Primary Examiner* — Melur Ramakrishnaiah
(74) *Attorney, Agent, or Firm* — Finnegan, Henderson, Farabow, Garrett & Dunner LLP

(57) ABSTRACT

An apparatus of this invention is directed to an information processing apparatus that predicts the necessity of device connection to a mobile terminal and instructs a user to perform the predicted device connection. The information processing apparatus includes a device connection predictor that predicts device connection to the mobile terminal, and a device connection instruction information transmitter that transmits via a network, to the mobile terminal carried by the user, device connection instruction information for instructing the user to perform the device connection predicted by the device connection predictor.

17 Claims, 45 Drawing Sheets

(51) Int. Cl.
  *H04W 8/18*   (2009.01)
  *H04W 8/22*   (2009.01)
  *H04W 76/02*  (2009.01)
  *H04L 12/18*  (2006.01)

(56) References Cited

U.S. PATENT DOCUMENTS

| | | | |
|---|---|---|---|
| 7,356,575 | B1 | 4/2008 | Shapiro |
| 7,480,703 | B2 | 1/2009 | Shapiro |
| 7,647,386 | B2 | 1/2010 | Shapiro |
| 7,730,165 | B2 | 6/2010 | Shapiro |
| 7,831,679 | B2 | 11/2010 | Apacible et al. |
| 8,843,589 | B2 | 9/2014 | Shapiro |
| 9,088,458 | B2 | 7/2015 | Jin et al. |
| 2003/0093507 | A1 | 5/2003 | Shapiro |
| 2005/0084082 | A1 | 4/2005 | Horvitz et al. |
| 2005/0149490 | A1 | 7/2005 | Shapiro |
| 2006/0010206 | A1 | 1/2006 | Apacible et al. |
| 2006/0242275 | A1 | 10/2006 | Shapiro |
| 2007/0274492 | A1* | 11/2007 | Baker et al. ............. 379/202.01 |
| 2008/0281943 | A1 | 11/2008 | Shapiro |
| 2010/0005142 | A1* | 1/2010 | Xiao et al. ................... 709/204 |
| 2010/0037300 | A1 | 2/2010 | Jin et al. |
| 2010/0226288 | A1 | 9/2010 | Scott et al. |
| 2011/0267419 | A1 | 11/2011 | Quinn et al. |
| 2011/0296506 | A1 | 12/2011 | Caspi |
| 2012/0224021 | A1* | 9/2012 | Begeja et al. ............. 348/14.08 |
| 2013/0304919 | A1 | 11/2013 | Jin et al. |
| 2014/0280922 | A1 | 9/2014 | Shapiro |

FOREIGN PATENT DOCUMENTS

| | | |
|---|---|---|
| CN | 102119525 A | 7/2011 |
| JP | 9-91341 | 4/1997 |
| JP | 2005-109710 | 4/2005 |
| JP | 2007-102308 | 4/2009 |
| JP | 2009-253869 | 10/2009 |
| JP | 2011-254158 | 12/2011 |

OTHER PUBLICATIONS

Extended European Search Report mailed Sep. 30, 2015 by the European Patent Office in counterpart European Patent Application No. 13768961.8.

International Search Report mailed May 28, 2013 in corresponding PCT International Application.

Office Action mailed Apr. 5, 2016, by the Japanese Patent Office in counterpart Japanese Patent Application No. 2012-068503.

Chinese Office Action mailed Jun. 2, 2016, by the Chinese Patent Office in counterpart Chinese Patent Application No. 201380016269.2.

* cited by examiner

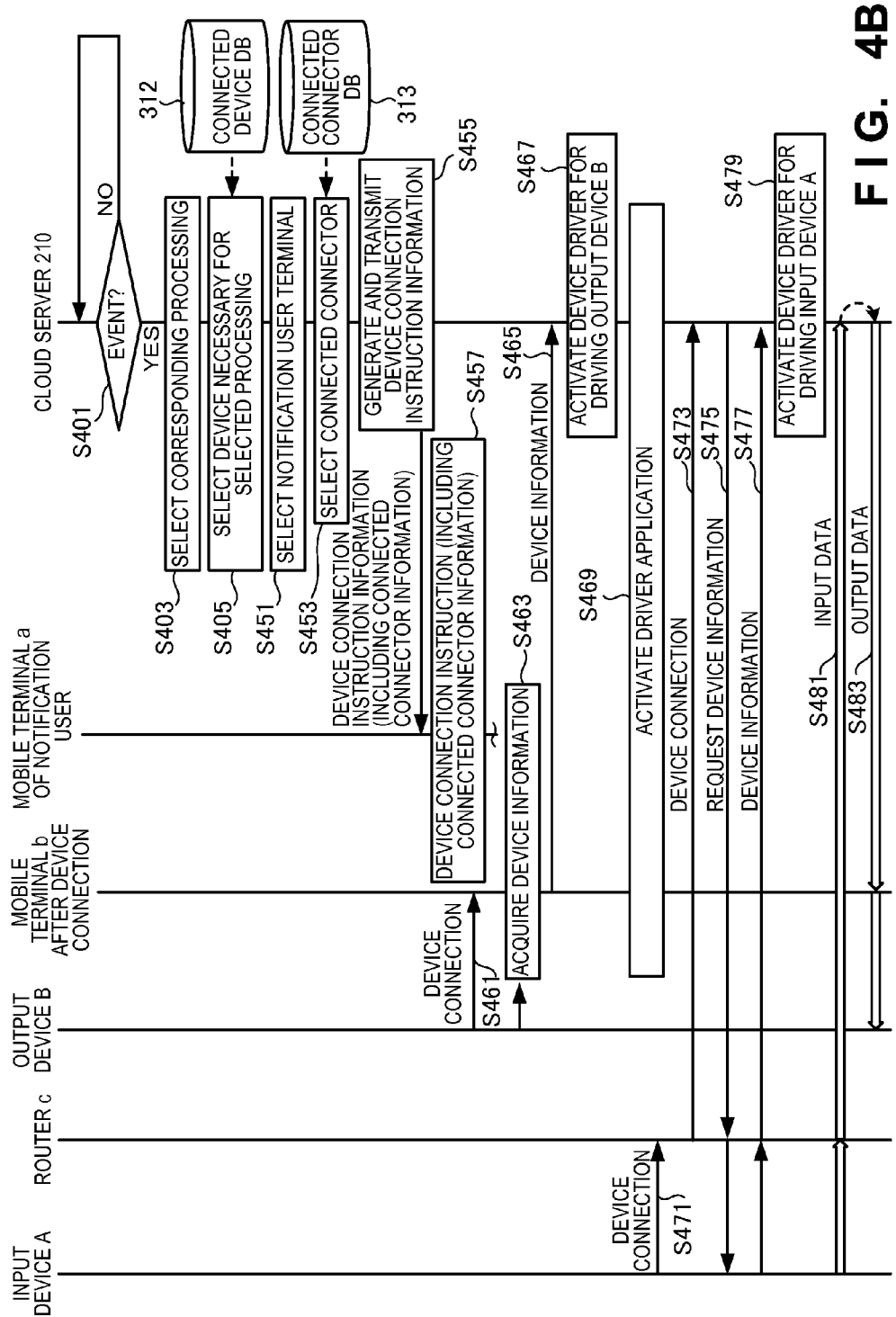

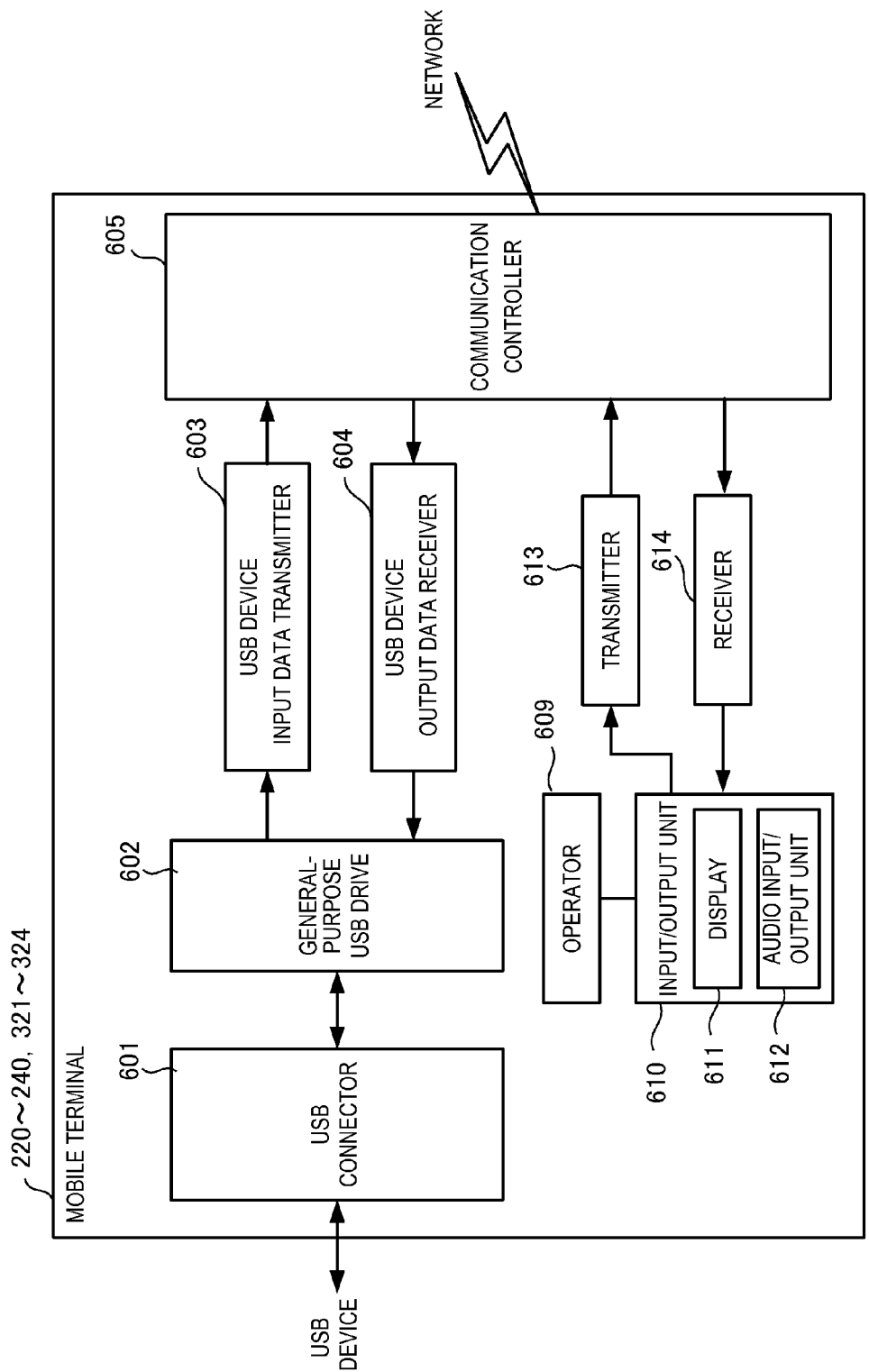
F I G. 6

FIG. 8

| DEVICE ID | MODEL | INPUT/OUTPUT | CONNECTED CONNECTOR | COMMUNICATION METHOD | CAPABILITY | ... |
|---|---|---|---|---|---|---|
| | | | | | | |
| | | | | | | |
| ... | | | | | | |

FIG. 12

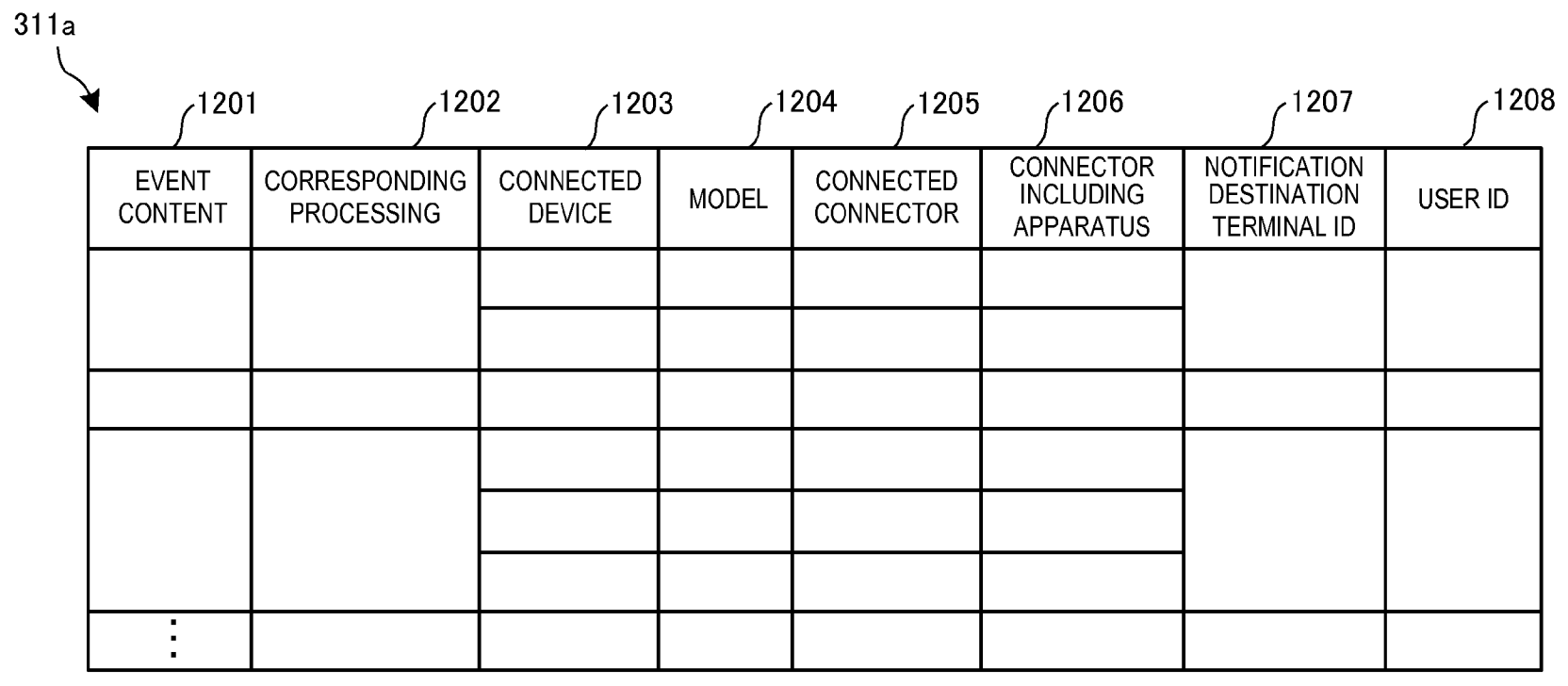

| EVENT CONTENT | CORRESPONDING PROCESSING | CONNECTED DEVICE | MODEL | CONNECTED CONNECTOR | CONNECTOR INCLUDING APPARATUS | NOTIFICATION DESTINATION TERMINAL ID | USER ID |
|---|---|---|---|---|---|---|---|
| | | | | | | | |
| | | | | | | | |
| | | | | | | | |
| ... | | | | | | | |

311a

| DATE/ TIME | SCHEDULE CONTENT | CONNECTED DEVICE INSTRUCTION TIMING | REGISTRATION USER ID | FIRST USE LOCATION | PERSON RESPONSIBLE FOR PREPARATION | PARTICIPANT | SECOND LOCATION INFORMATION | PERSON RESPONSIBLE FOR PREPARATION | PARTICIPANT | ... |
|---|---|---|---|---|---|---|---|---|---|---|
| | | | | | | | | | | |
| | ... | | | | | | | | | |
| | | | | | | | | | | |
| ... | ... | | | | | | | | | |
| | | | | | | | | | | |

| TRANSMISSION TIMING | SCHEDULE CONTENT | TRANSMISSION DESTINATION | FIRST DEVICE CONNECTION CANDIDATE | | ... | SECOND DEVICE CONNECTION CANDIDATE | ... |
| --- | --- | --- | --- | --- | --- | --- | --- |
| | | | FIRST CONNECTED DEVICE CANDIDATE (CONNECTED CONNECTOR CANDIDATE) | SECOND CONNECTED DEVICE CANDIDATE (CONNECTED CONNECTOR CANDIDATE) | ... | | |
| | | | | | | | |
| | ... | | | | | | |
| | ... | | | | | | |
| ... | | | | | | | |

2401: TRANSMISSION TIMING
2402: SCHEDULE CONTENT
2403: TRANSMISSION DESTINATION
2404: FIRST DEVICE CONNECTION CANDIDATE
2405: SECOND DEVICE CONNECTION CANDIDATE
1811a

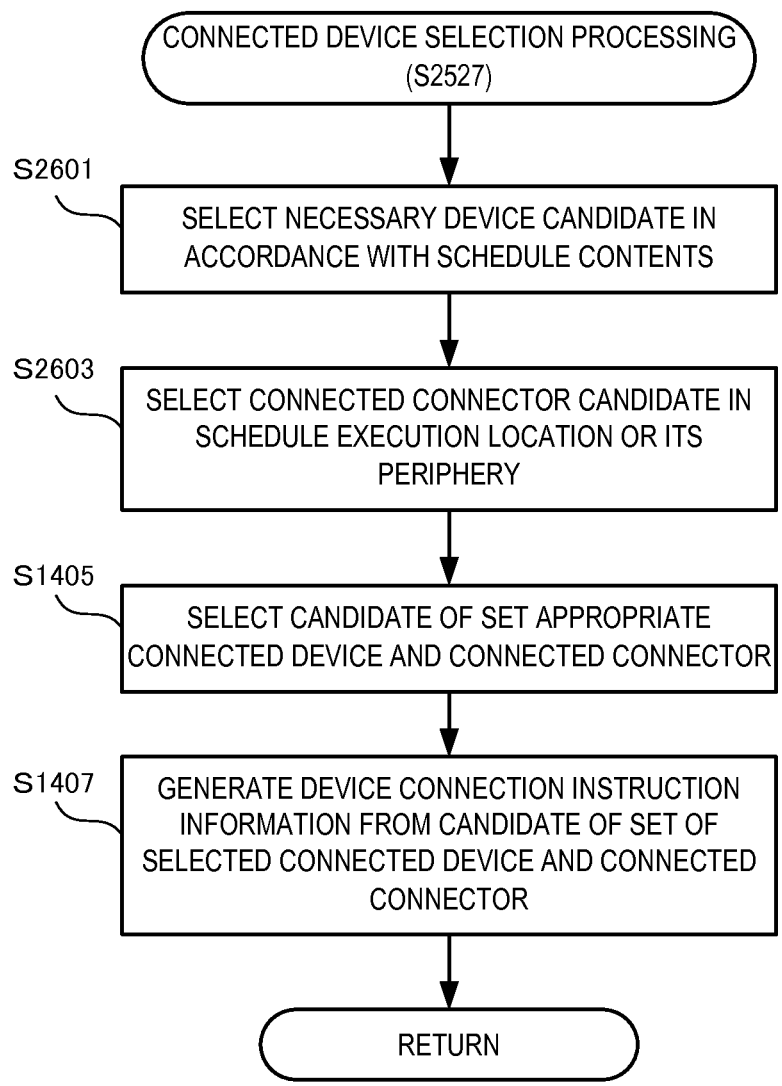
F I G. 26

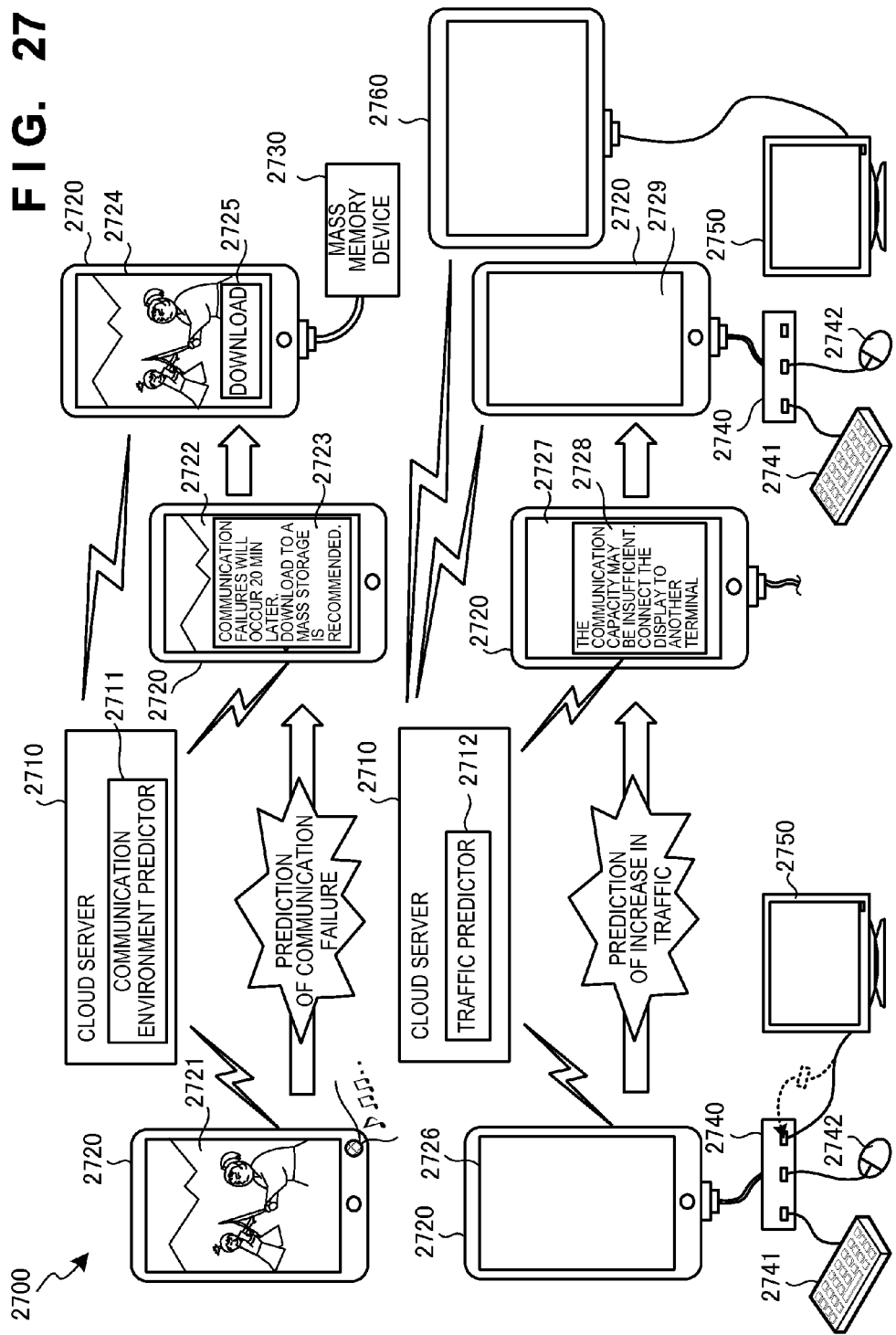

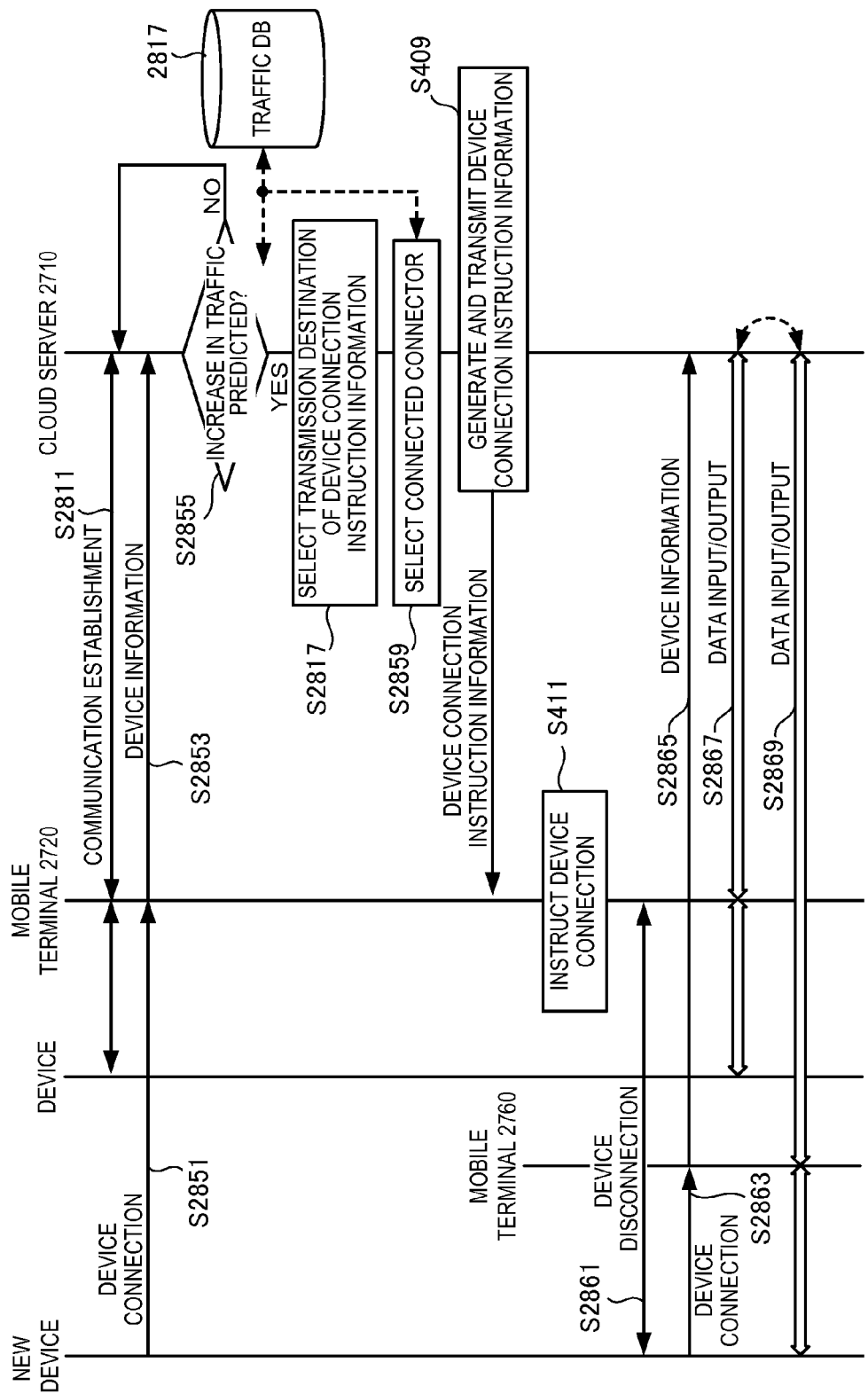
F I G. 28B

2816

3010

| 3011 REGION INFORMATION | 3012 ROAD INFORMATION | 3013 COMMUNICATION CAPACITY | 3014 MAXIMUM DURATION | 3015 MAXIMUM RANGE |
|---|---|---|---|---|
| NATIONAL ROUTE n | ○○ TUNNEL | ○ | 7 MIN | |
| XX AIRPORT | | α | | 500M RADIUS |
| POINT COORDINATES | △△ TUNNEL | β | | 5KM RADIUS |
| SANYODO SHINKANSEN | | ○ | 11 MIN | |
| ... | | | | |

3020

| 3021 REGION INFORMATION | 3022 MAXIMUM RANGE | 3023 COMMUNICATION FAILURE | 3024 START TIME | 3025 PREDICTED DURATION |
|---|---|---|---|---|
| POINT COORDINATES | 20KM RADIUS | -a dB | 9:00 | 2 HRS |
| ... | | | | |
| NATIONWIDE | | -n dB | MARCH 31, ALL DAY LONG | |

F I G. 30

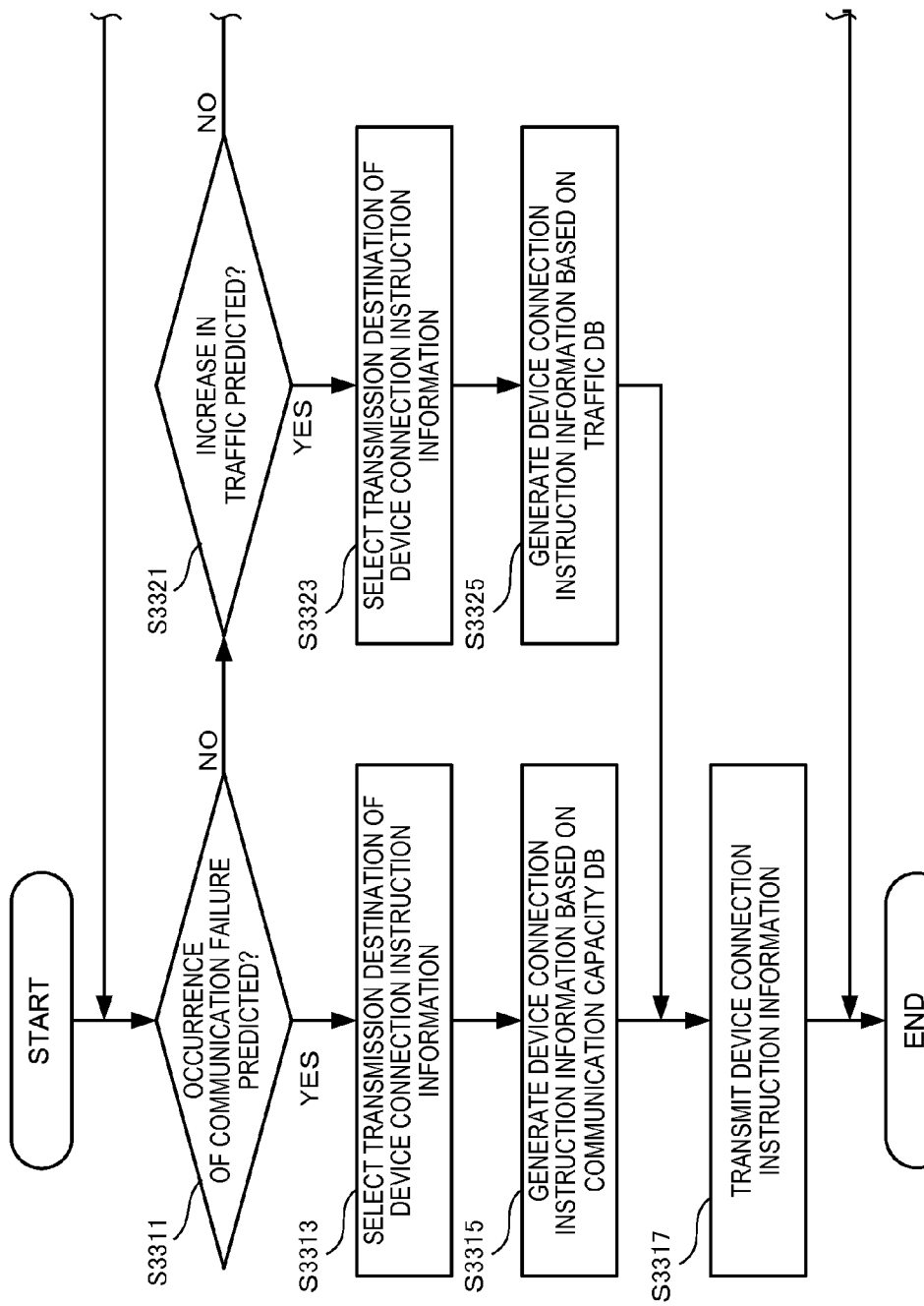
F I G. 33

| DATE/TIME | SCHEDULE CONTENT | CONNECTED DEVICE INSTRUCTION TIMING | REGISTRATION USER ID | PATIENT ID | ... |
|---|---|---|---|---|---|
| | PULSE MEASUREMENT | EVERY 3 HRS | | | |
| | BLOOD PRESSURE MEASUREMENT | 6:00 EVERY MORNING | | | |
| | ... | | | | |
| ... | ... | | | | |

| MOBILE TERMINAL 3801 | CONNECTED CONNECTOR 3802 | CONNECTED DEVICE 3803 | USED DRIVER 3804 | USED APPLICATION 3805 | USE COUNT 3806 | TOTAL SATISFACTION LEVEL 3807 | AVERAGE SATISFACTION LEVEL 3808 | MAXIMUM/MINIMUM SATISFACTION LEVEL 3809 | ANOTHER INDEX |
|---|---|---|---|---|---|---|---|---|---|
| SMARTPHONE | USB | PULSE SENSOR | | | | | | | |
| | | BLOOD PRESSURE SENSOR | ... | ... | | | | | |
| | | KEYBOARD | | | | | | | |
| | | MOUSE | | | | | | | |
| TABLET | HDMI | PULSE SENSOR | ... | | | | | | |
| | | BODY TEMPERATURE SENSOR | | | | | | | |
| | | DVD DRIVE | | | | | | | |
| ... | | | | | | | | | |

3418

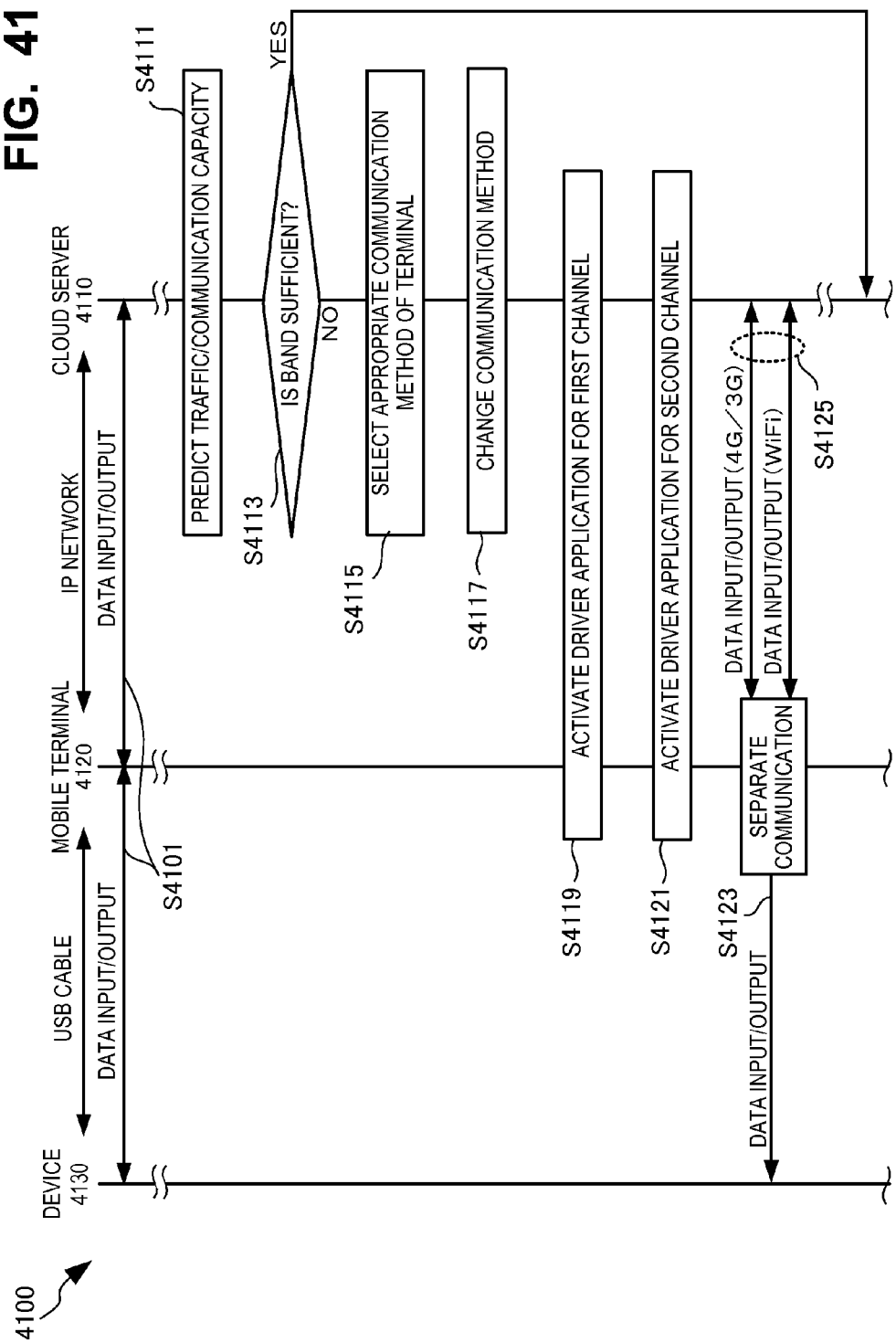

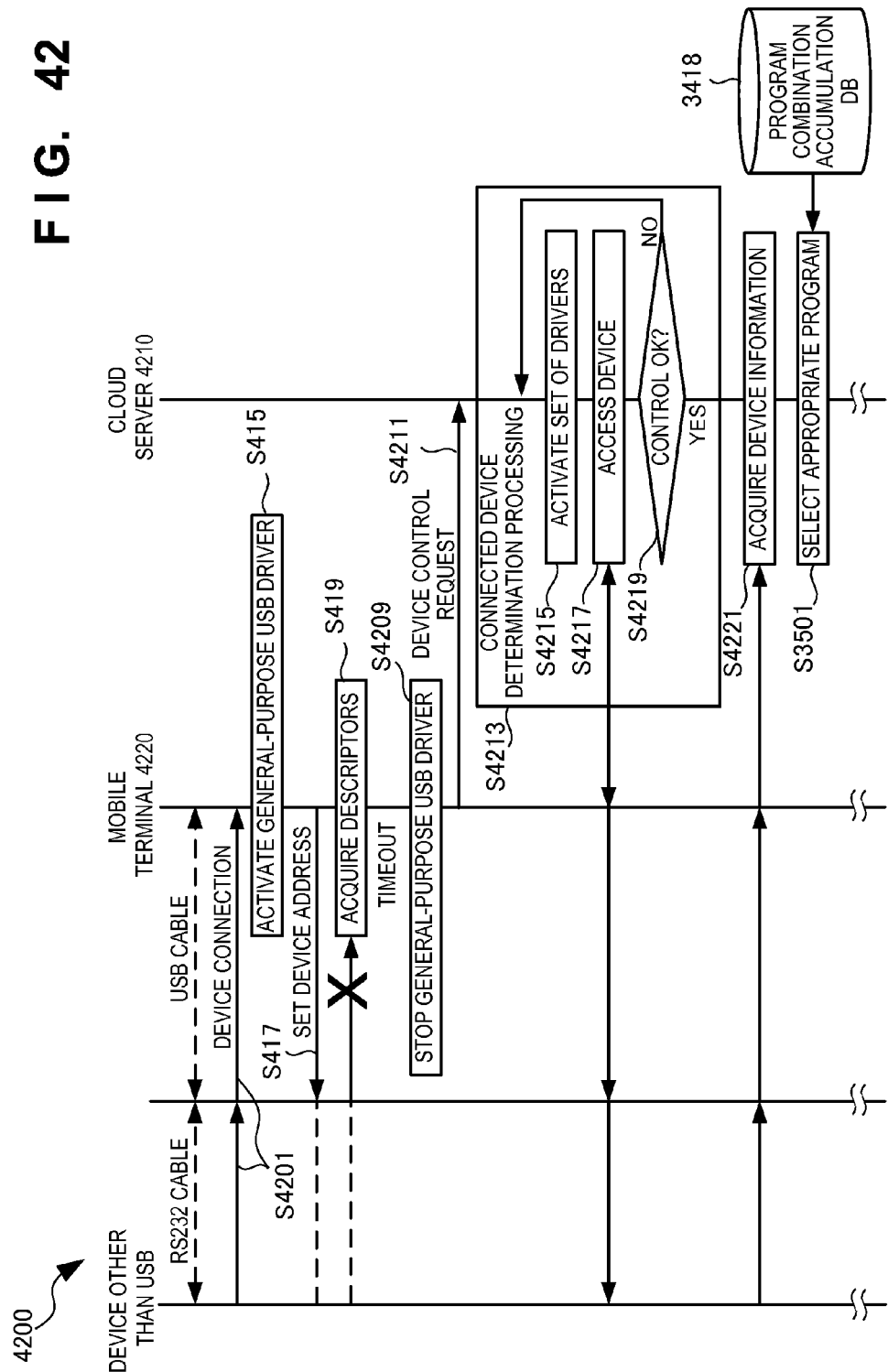

INFORMATION PROCESSING SYSTEM, INFORMATION PROCESSING METHOD, INFORMATION PROCESSING APPARATUS, AND CONTROL METHOD AND CONTROL PROGRAM OF INFORMATION PROCESSING APPARATUS

CROSS-REFERENCE TO RELATED PATENT APPLICATIONS

This application is a National Stage Entry of International Application No. PCT/JP2013/055547, filed Feb. 28, 2013, which claims priority from Japanese Patent Application No. 2012-068503, filed Mar. 24, 2012. The entire contents of the above-referenced applications are expressly incorporated herein by reference.

TECHNICAL FIELD

The present invention relates to a technique of connecting a device to a mobile terminal.

BACKGROUND ART

In the above technical field, patent literature 1 discloses a technique of, when a device is connected to a thin client, executing a corresponding device driver in a server.

CITATION LIST

Patent Literature

Patent literature 1: Japanese Patent Laid-Open No. 2007-102308

SUMMARY OF THE INVENTION

Technical Problem

In the technique described in the above literature, however, the server starts a service using device connection as a trigger, and device connection cannot be predicted.

The present invention enables to provide a technique of solving the above-described problem.

Solution to Problem

One aspect of the present invention provides an information processing apparatus comprising:
a device connection predictor that predicts device connection to a mobile terminal; and
a device connection instruction information transmitter that transmits via a network, to a mobile terminal carried by the user, device connection instruction information for instructing a user to perform the device connection predicted by said device connection predictor.

Another aspect of the present invention provides a control method of an information processing apparatus, the method comprising:
predicting device connection to a mobile terminal; and
transmitting via a network, to the mobile terminal carried by the user, device connection instruction information for instructing a user to perform the device connection predicted in said predicting step.

Still other aspect of the present invention provides a control program of an information processing apparatus, which causes a computer to execute:
predicting device connection to a mobile terminal; and
transmitting via a network, to the mobile terminal carried by the user, device connection instruction information for instructing a user to perform the device connection predicted in said predicting step.

Still other aspect of the present invention provides an information processing system including a mobile terminal carried by a user and an information processing apparatus connected to the mobile terminal via a network,
said information processing apparatus comprising:
a device connection predictor that predicts device connection to said mobile terminal; and
a device connection instruction information transmitter that transmits via the network, to said mobile terminal carried by the user, device connection instruction information for instructing the user to perform the device connection predicted by said device connection predictor, and
said mobile terminal comprising:
a device connection instruction information receiver that receives the device connection instruction information transmitted from said device connection instruction information transmitter; and
a device connector capable of connecting a device according to the device connection instruction information.

Still other aspect of the present invention provides an information processing method of an information processing system including a mobile terminal including a device connector capable of connecting a device and carried by a user and an information processing apparatus connected to the mobile terminal via a network, the method comprising:
predicting, by the information processing apparatus, device connection to the mobile terminal;
transmitting via the network, from the information processing apparatus to the mobile terminal carried by the user, device connection instruction information for instructing the user to perform the device connection predicted in said predicting step; and
receiving, by the mobile terminal, the device connection instruction information transmitted in said transmitting step.

Advantageous Effects of Invention

According to the present invention, it is possible to predict connection of a device to a mobile terminal and instruct the user to perform the predicted device connection.

BRIEF DESCRIPTION OF DRAWINGS

FIG. 4B is a sequence chart showing an operation procedure of connecting a device to a mobile terminal different from a connection-instructed mobile terminal in the information processing system according to the second embodiment of the present invention;

FIG. 6 is a block diagram showing the functional arrangement of a mobile terminal according to the second embodiment of the present invention;

FIG. 8 is a view showing the arrangement of a device DB according to the second embodiment of the present invention;

FIG. 12 is a view showing the arrangement of a device connection instruction table according to the second embodiment of the present invention;

FIG. 21 is a view showing the arrangement of a schedule DB according to the third embodiment of the present invention;

FIG. 24 is a view showing the arrangement of a device connection instruction table according to the third embodiment of the present invention;

FIG. 26 is a flowchart showing the processing procedure of connected device selection processing according to the third embodiment of the present invention;

FIG. 27 is a view for explaining the operation of an information processing system according to the fourth embodiment of the present invention;

FIG. 28B is a sequence chart showing the operation procedure when predicting an increase in the traffic in the information processing system according to the fourth embodiment of the present invention;

FIG. 30 is a view showing the arrangement of a communication capacity DB according to the fourth embodiment of the present invention;

FIG. 33 is a flowchart showing the processing procedure of the cloud server according to the fourth embodiment of the present invention;

FIG. 37 is a view showing the arrangement of a schedule DB according to the fifth embodiment of the present invention;

FIG. 38 is a view showing the arrangement of a program combination accumulation DB according to the fifth embodiment of the present invention;

FIG. 41 is a sequence chart showing the operation procedure when a mobile terminal communicates via a plurality of communication paths in an information processing system according to the sixth embodiment of the present invention; and FIG. 42 is a sequence chart showing the operation procedure when a mobile terminal cannot acquire device information in an information processing system according to the seventh embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An information processing apparatus 100 according to the first embodiment of the present invention will be described with reference to FIG. 1. The information processing apparatus 100 is an apparatus that instructs a mobile terminal 111 to connect a device.

Figure 1:
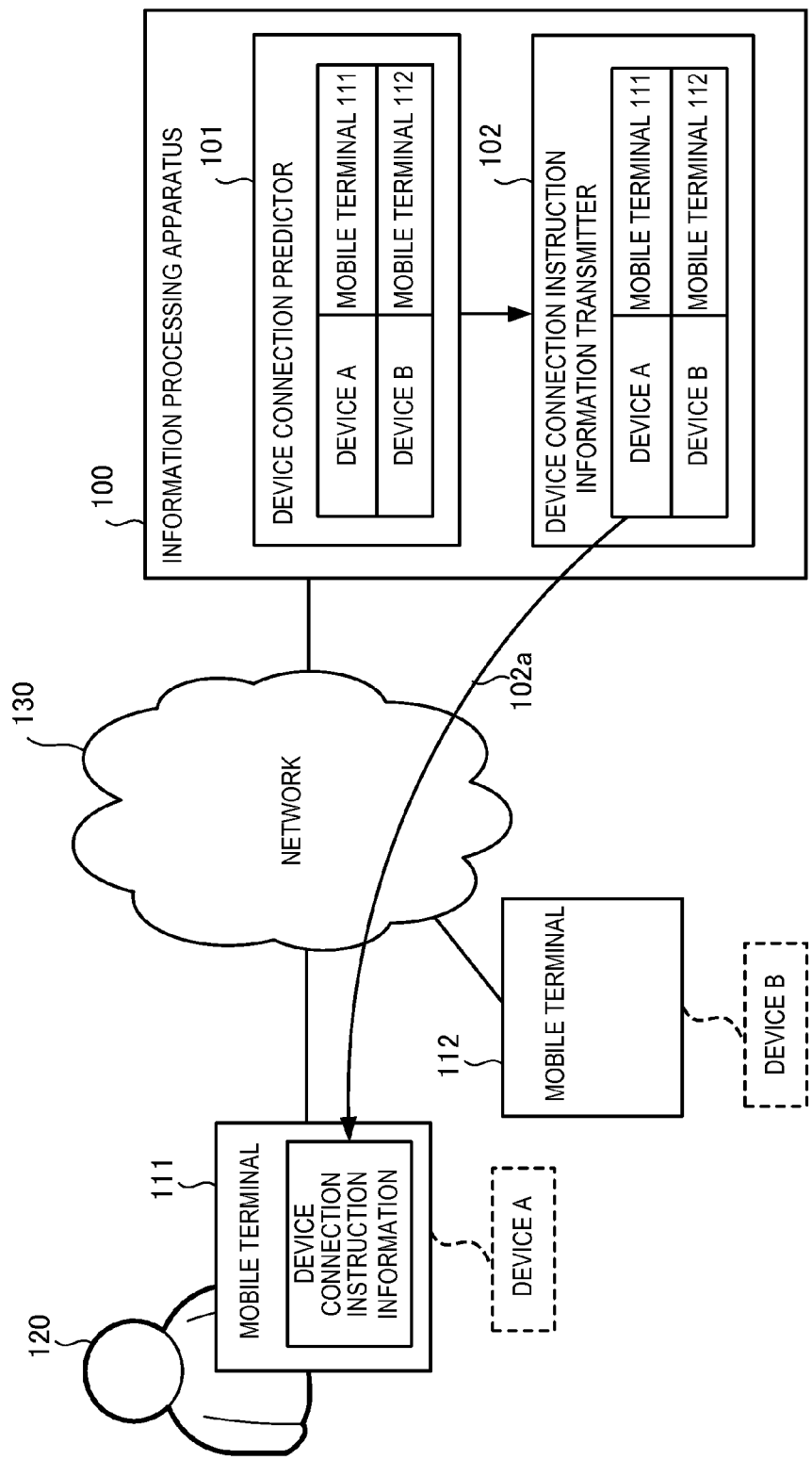
FIG. 1 is a block diagram showing the arrangement of an information processing apparatus according to the first embodiment of the present invention.

As shown in FIG. 1, the information processing apparatus 100 includes a device connection predictor 101 and a device connection instruction information transmitter 102. The device connection predictor 101 predicts device connection to the mobile terminal 111 and a mobile terminal 112. The device connection instruction information transmitter 102 transmits device connection instruction information 102a for instructing a user 120 to perform the device connection predicted by the device connection predictor 101 to the mobile terminal 111 carried by the user 120 via a network 130.

According to this embodiment, it is possible to prepare device connection to the mobile terminal in advance by predicting and instructing device connection to the mobile terminal.

Second Embodiment

An information processing system according to the second embodiment of the present invention will be described next. The information processing system according to this embodiment predicts occurrence of various events, selects and decides device connection associated with the events, and instructs a user's mobile terminal in advance to do the device connection.

According to this embodiment, event occurrence is predicted, and a device to be used by the user to cope with the event is selected and instructed, thereby preparing device connection to the mobile terminal corresponding to the event occurrence in advance.

Note that in this embodiment, a history of devices used at the time of event occurrence is accumulated, and a device to be connected is selected. However, a specific connected device may be stored in correspondence with an event.

<<Information Processing System>>

The arrangement and operation of the information processing system according to this embodiment will be described first with reference to FIGS. 2, 3, and 4A and 4B.

(Description of Operation)

Figure 2:
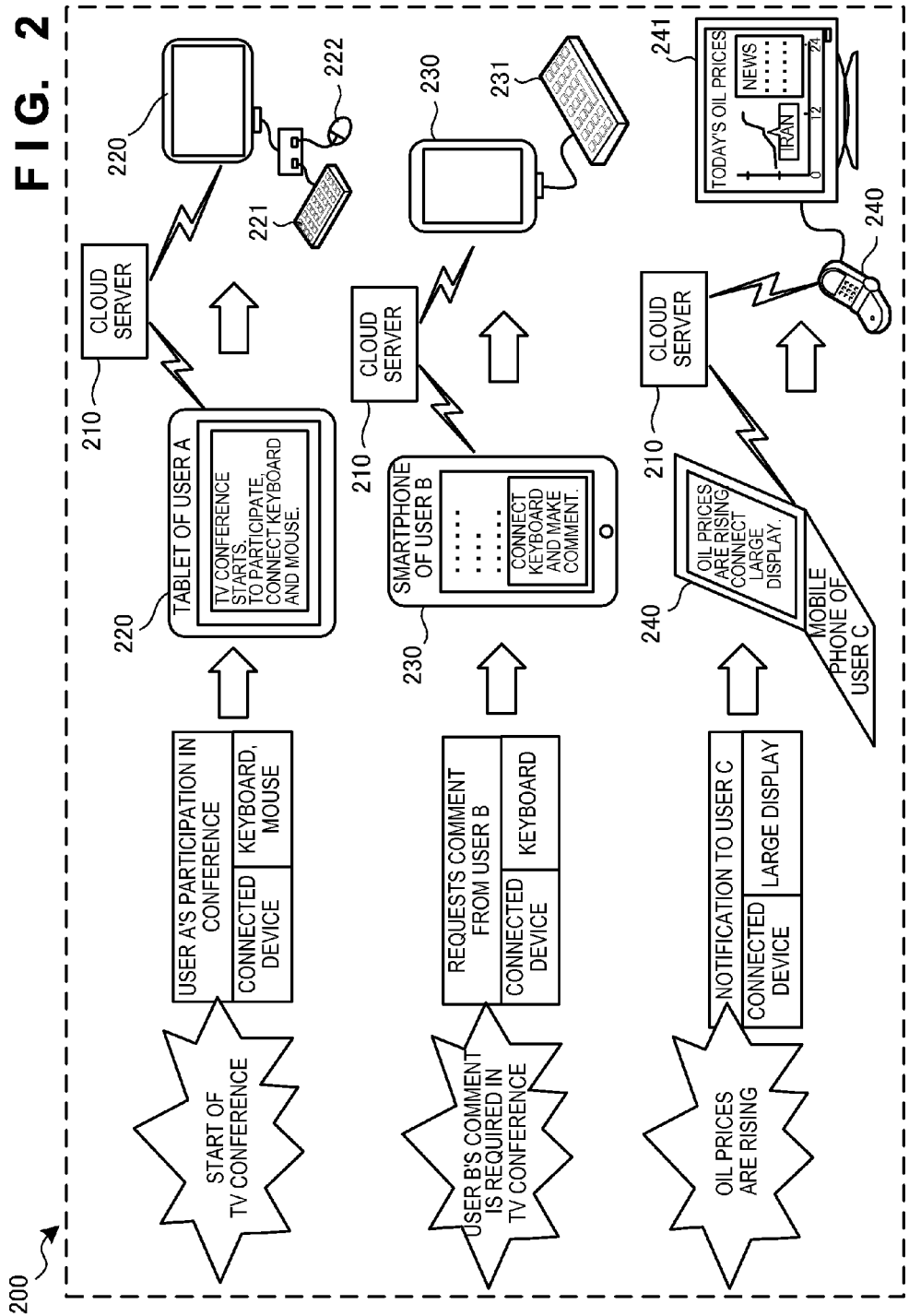
FIG. 2 is a view for explaining the operation of an information processing system according to the second embodiment of the present invention.

FIG. 2 is a view for explaining the operation of an information processing system 200 according to this embodiment.

The upper stage of FIG. 2 shows an operation of querying a user A whether to participate in a TV conference at the time of an event occurrence of starting the TV conference. A cloud server 210 that is an information processing apparatus notifies the user A that to participate in the TV conference using a mobile terminal 220 that is a tablet, he/she requires to connect a keyboard and a mouse to the mobile terminal 220 as connected devices. When a keyboard 221 and a mouse 222 are connected to the mobile terminal 220 in response to the notification, the cloud server 210 selects and activates a program necessary for controlling the keyboard 221 and the mouse 222. The cloud server 210 connects the mobile terminal 220, the keyboard 221, and the mouse 222 to a virtual PC (personal computer) to allow the user A to participate in the TV conference.

The middle stage of FIG. 2 shows an operation of requesting a comment from a user B at the time of an event occurrence of requiring a comment of the user B who is not participating in the TV conference. The cloud server 210 that is an information processing apparatus notifies the user B that to make a comment in the TV conference using a mobile terminal 230 that is a smartphone, he/she requires to connect a keyboard to the mobile terminal 230 as a connected device. When a keyboard 231 is connected to the mobile terminal 230 in response to the notification, the cloud server 210 selects and activates a program necessary for controlling the keyboard 231. The cloud server 210 connects the mobile terminal 230 and the keyboard 231 to the virtual PC (personal computer) to allow the user B to input a comment using the keyboard 231 while viewing the screen of the mobile terminal 230.

The lower stage of FIG. 2 shows an operation of notifying a user C of rise of oil prices at the time of the event occurrence. The cloud server 210 that is an information processing apparatus notifies the user C that to acquire the notification using a mobile terminal 240 that is a mobile phone, he/she requires to connect a large display to the mobile terminal 240 as a connected device. When a large display 241 is connected to the mobile terminal 240 in response to the notification, the cloud server 210 selects and activates a program necessary for controlling the large display 241. The cloud server 210 displays detailed information of oil price fluctuations on the large display 241 via the mobile terminal 240 of the user C.

(Arrangement)

Figure 3:
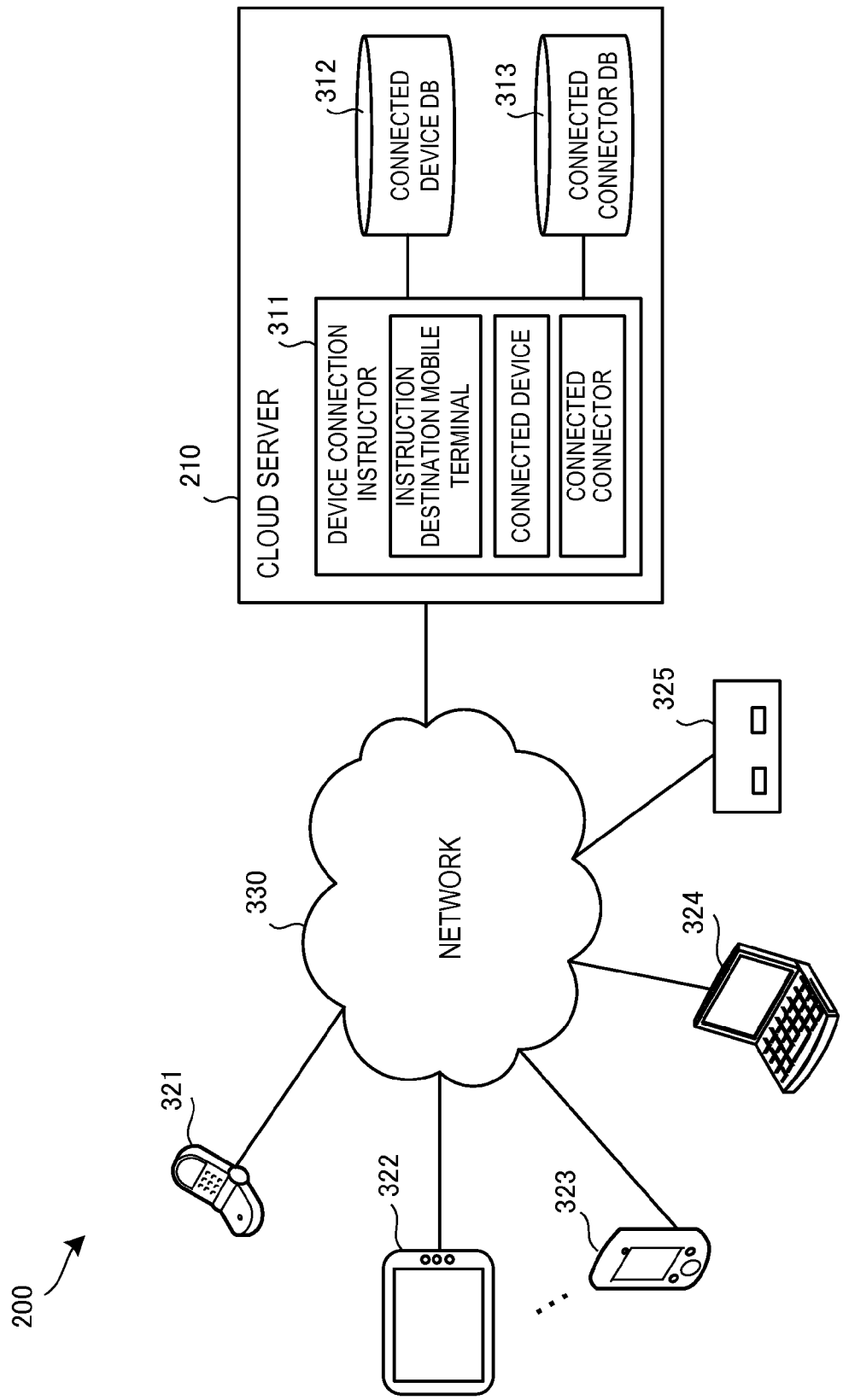
FIG. 3 is a block diagram showing the arrangement of the information processing system according to the second embodiment of the present invention.

FIG. 3 is a block diagram showing the arrangement of the information processing system 200 according to this embodiment.

As shown in FIG. 3, the information processing system 200 includes the cloud server 210 and mobile terminals 321 to 325 (including router 325) connected via a network 330. In this embodiment, USB devices can be connected to the mobile terminals 321 to 325.

The cloud server 210 includes a connected device DB 312 that accumulates a history of connected devices connected to each mobile terminal in association with events that have occurred, and a connected connector DB 313 that accumulates a history of connected devices connected to specific connectors (when the number of connectors is one, the device corresponds to a mobile terminal). The cloud server 210 also includes a device connection instructor 311 that instructs a mobile terminal to connect a selected device to a selected connector at the time of event occurrence based on the connected device DB 312 and the connected connector DB 313. The device connection instructor 311 stores the instructed mobile terminal, the connected device, and the connected connector as device connection instruction information.

(Operation Procedure)

Figure 4A:
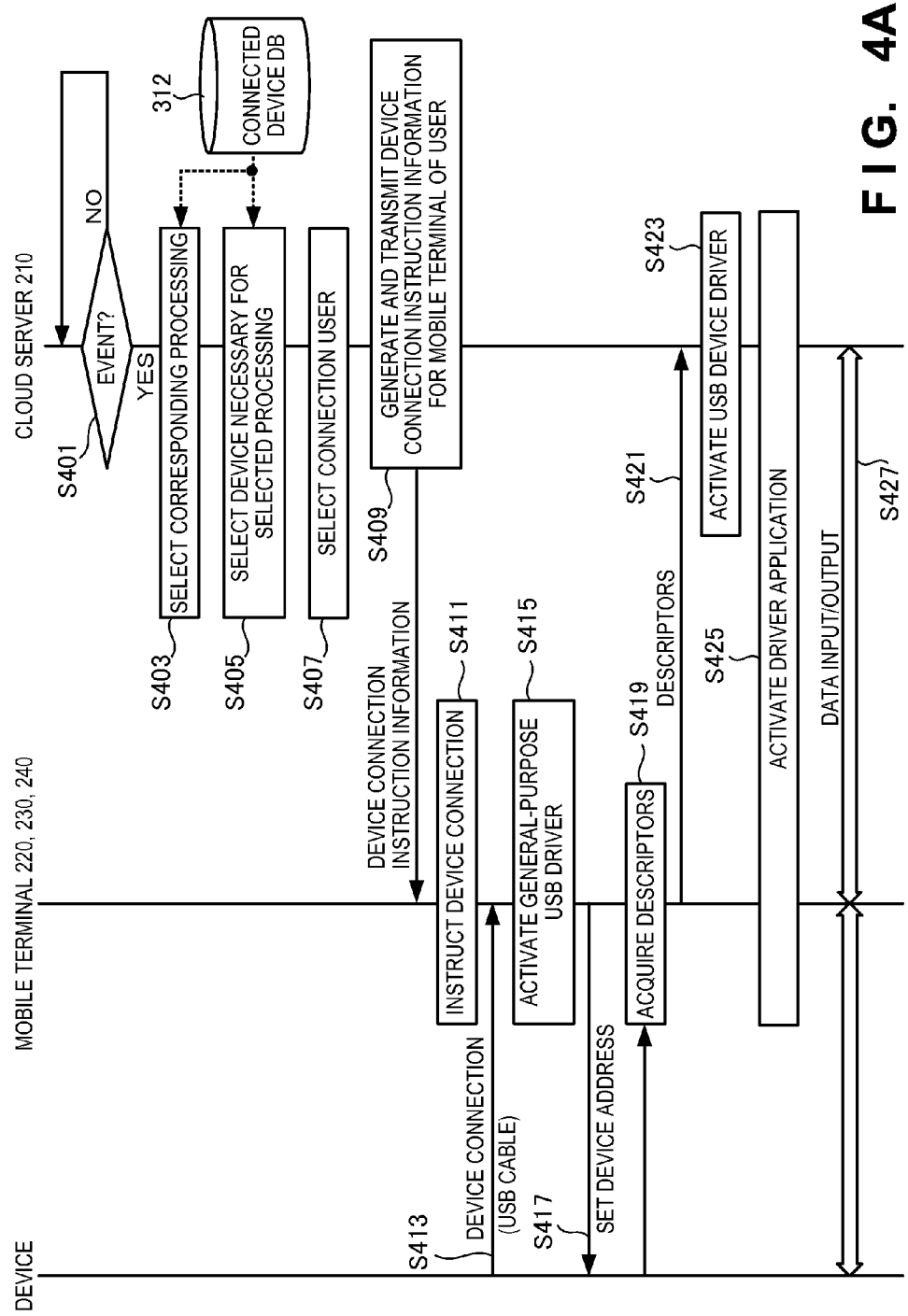
FIG. 4A is a sequence chart showing an operation procedure of connecting a device to a connection-instructed mobile terminal in the information processing system according to the second embodiment of the present invention.

FIG. 4A is a sequence chart showing an operation procedure of connecting a device to a connection-instructed mobile terminal in the information processing system 200 according to this embodiment.

In step S401, the cloud server 210 waits for event occurrence. Upon detecting event occurrence, the cloud server 210 advances to step S403 and selects processing corresponding to the event that has occurred. In step S405, a device necessary for the selected processing is selected. In step S407, a user who connects the selected device is selected. In step S409, device connection instruction information for the mobile terminal carried by the selected user is generated and transmitted to the mobile terminals 220 to 240 that are a tablet, a smartphone, and a mobile phone, respectively.

Upon receiving the device connection instruction information, the mobile terminals 220 to 240 instruct device connection in step S411 (see FIG. 2). When the instructed device is connected in response to the device connection instruction in step S413, the mobile terminals 220 to 240 activate a general-purpose USB driver in step S415. In step S417, a device address by the mobile terminals 220 to 240 is set. In step S419, the descriptors of the device are acquired. The acquired descriptors are transferred to the cloud server 210 in step S421.

Upon acquiring the descriptors, in step S423, the cloud server 210 activates a USB device driver to drive the connected device determined from the descriptors. In step S425, a driver application to connect the cloud server 210 and the connected device via the mobile terminals 220 to 240 is activated. In step S427, data input/output between the cloud server 210 and the connected device via the mobile terminals 220 to 240 is implemented.

FIG. 4B is a sequence chart showing an operation procedure of connecting a device to a mobile terminal different from a connection-instructed mobile terminal in the information processing system 200 according to this embodiment. Note that the same step numbers as in FIG. 4A denote the same steps in FIG. 4B, and a description thereof will be omitted.

In step S451, the cloud server 210 selects a user's mobile terminal to notify device connection instruction information. In step S453, a connected connector to which the selected device is connected is selected. In this example, device connection instruction information for the mobile terminal to notify the device connection instruction information, the connected connector (when the number of connectors is one, the device corresponds to a mobile terminal) to connect the device, and the mobile terminal carried by the selected user is generated and transmitted in step S455. The device connection instruction information includes connected connector information. In FIG. 4B, a mobile terminal a is notified of the device connection instruction information. Assume that the device connection instruction information includes an instruction to connect an output device B to a mobile terminal b, and an input device A to a router c. In step S457, the mobile terminal a of the notified user outputs the device connection instruction including the connected connector.

In step S461, the output device B is connected to the mobile terminal b in response to the device connection instruction to the mobile terminal a. In step S463, the mobile terminal acquires device information (descriptors). Note that FIG. 4B does not illustrate the detailed protocol of the USB driver in order to avoid cumbersomeness. In step S465, the device information is transferred to the cloud server 210.

In step S467, the cloud server 210 activates a device driver to drive the output device B. In step 469, a driver application to connect the cloud server 210 and the output device B via the mobile terminal b is activated.

On the other hand, in step S471, the input device A is connected to the router c. In step S473, the router c notifies the cloud server 210 of the device connection. In step S475, the cloud server 210 requests device information (descriptors) of the input device A via the router c in accordance with the USB protocol. In response to this, the input device A returns the device information via the router c in step S477. In step S479, the cloud server 210 activates a device driver to drive the input device A.

Assume that the output device B then outputs input data from the input device A. In step S481, the cloud server 210 acquires the input data from the input device A via the router c. After data processing is performed as required, in step S483, output data is sent to the output device B via the mobile terminal b. For example, when the input device A is a DVD player, and the output device B is a display, a DVD video is output to the display.

<<Functional Arrangement of Cloud Server>>

Figure 5:
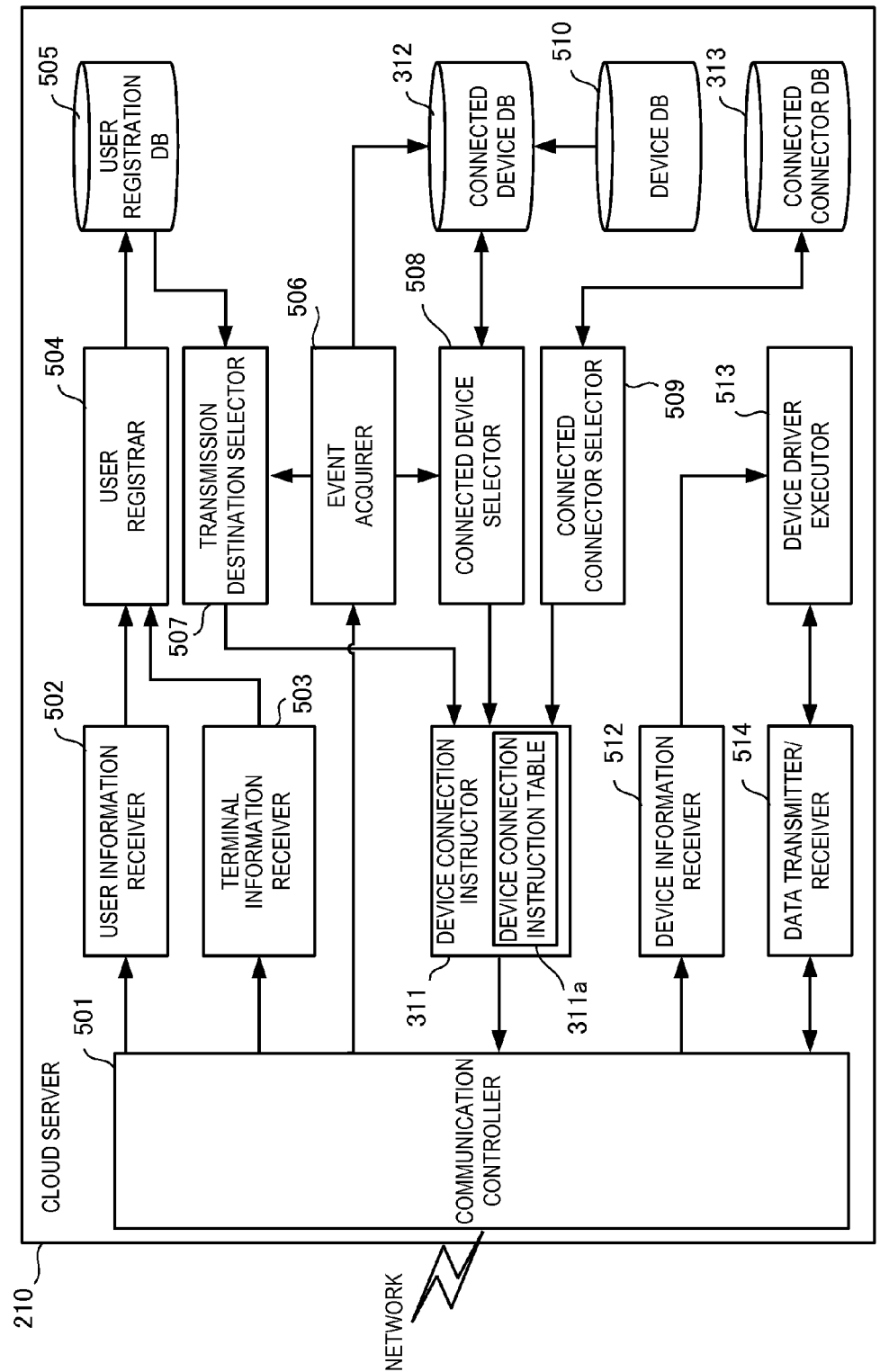
FIG. 5 is a block diagram showing the functional arrangement of a cloud server according to the second embodiment of the present invention.

FIG. 5 is a block diagram showing the functional arrangement of the cloud server 210 according to this embodiment.

The cloud server 210 includes a communication controller 501 that communicates with the mobile terminals 220 to 240 and 321 to 325 via the network 330. A user information receiver 502 receives user information such as a user ID and authentication information from a message that the communication controller 501 has received from the mobile terminal. A terminal information receiver 503 receives terminal information such as a mobile terminal ID and authentication information. Based on the user information and the terminal information, a user registrar 504 registers the user in a user registration DB 505 (see FIG. 7).

An event acquirer 506 functions as an event detector that acquires an external event via the communication controller 501 or acquires an event that occurs in the cloud server 210. When the event acquirer 506 acquires an event, a transmission destination selector 507 refers to the user registration DB 505 and selects a transmission destination mobile terminal to which device connection instruction information is transmitted.

Figure 8:
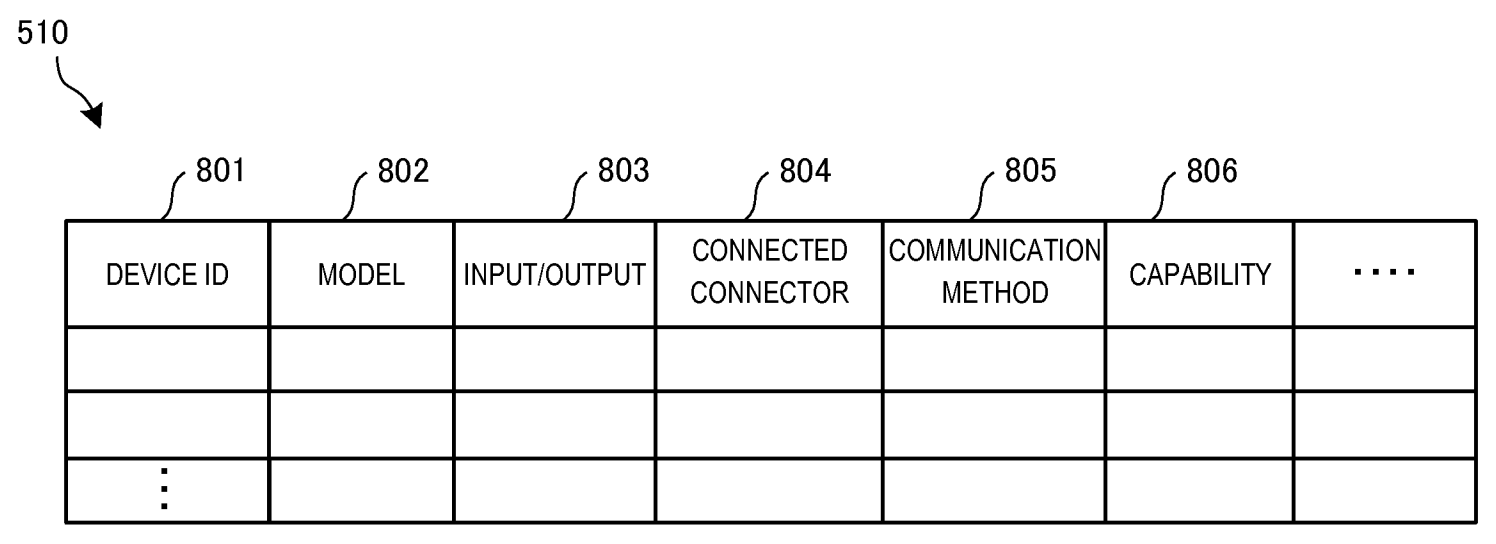

When the event acquirer 506 acquires an event, a connected device selector 508 selects a connected device for a device connection instruction based on the connected device DB 312 (see FIGS. 9A and 9B) and a device DB 510 (FIG. 8). On the other hand, a connected connector selector 509 selects a connected connector that is the connection destination of the connected device included in the device connection instruction based on the connected connector DB 313 (see FIG. 10).

The connected device selected by the connected device selector 508 and the connected connector selected by the connected connector selector 509 are stored in a device connection instruction table 311a of the device connection instructor 311. The device connection instructor 311 transmits the device connection instruction information generated based on the device connection instruction table 311a to the transmission destination mobile terminal selected by the transmission destination selector 507.

A device information receiver 512 receives device information (descriptors) of the device connected via the mobile terminal. A device driver executor 513 drives the connected device. A data transmitter/receiver 514 transmits/receives data to/from the connected device via the mobile terminal.

<<Functional Arrangement of Mobile Terminal>>

FIG. 6 is a block diagram showing the functional arrangement of the mobile terminals 220 to 240 and 321 to 324 according to this embodiment. Since all mobile terminals have the same arrangement, the mobile terminal 220 will be representative of them in the following description.

The mobile terminal 220 according to this embodiment includes a USB connector 601 used to connect a USB device. The mobile terminal 220 also includes a general-purpose A USB driver 602 configured to acquire the descriptors of the device connected to the USB connector 601. The mobile terminal 220 also includes a USB device input data transmitter 603 to IP-encapsulate input data from the USB device and transmit it to/from the cloud server 210 via a communication controller 605 and the IP network. The mobile terminal 220 also includes a USB device output data receiver 604 that receives output data to the USB device, which is received from the cloud server 210 via the communication controller 605 and the IP network, and decapsulates and transfers the data to the general-purpose USB driver 602. Note that the USB device input data transmitter 603 and the USB device output data receiver 604 may operate by partially downloading a driver application from the cloud server 210. The communication controller 605 is a controller that controls communication with the cloud server 210 or another mobile terminal via the network. In general, image and data communication is done by 4G/3G, and audio communication of a mobile phone or a smartphone is done by WiFi.

The mobile terminal 220 also includes a transmitter 613 which transmits data different from that of the USB device via the communication controller 605, and a receiver 614. The mobile terminal 220 also includes an operator 609 formed from a touch panel, a keyboard, and the like, and an input/output unit 610. The input/output unit 610 includes a display 611 that displays data received by the receiver 614, and an audio input/output unit 612 that inputs/outputs an audio.

(User Registration DB)

Figure 7:
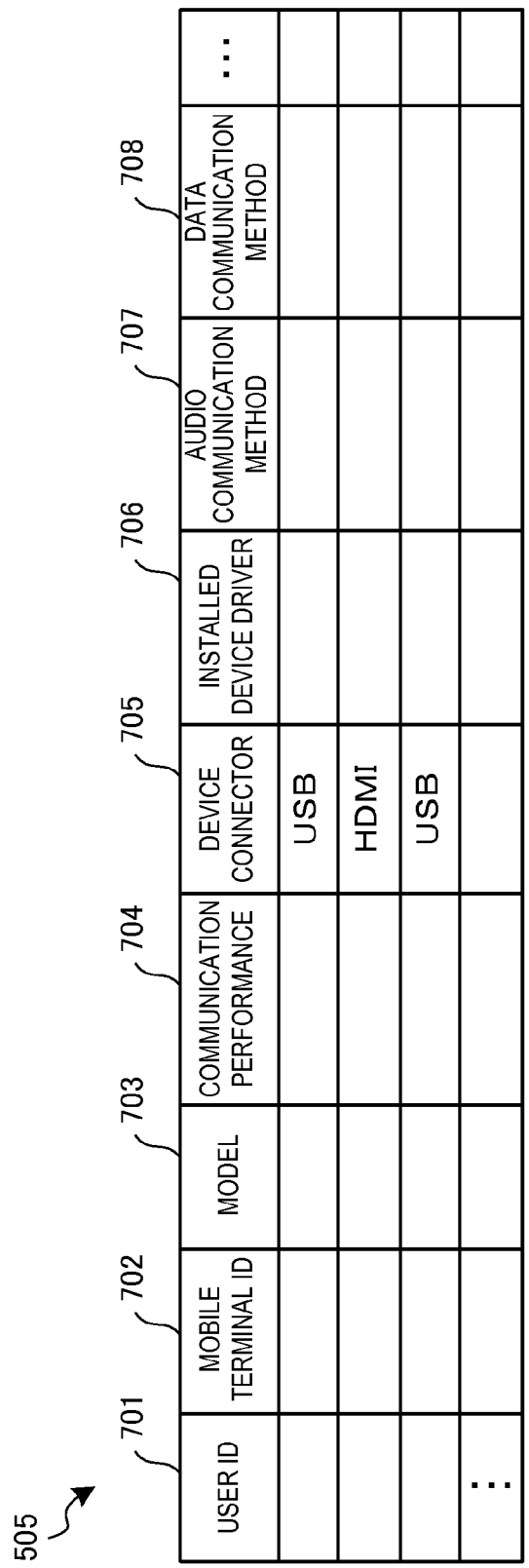
FIG. 7 is a view showing the arrangement of a user registration database (database will be abbreviated as DB hereinafter) according to the second embodiment of the present invention.

FIG. 7 is a view showing the arrangement of the user registration DB 505 according to this embodiment. Note that the user registration DB 505 is not limited to the arrangement shown in FIG. 7.

The user registration DB 505 stores a mobile terminal ID 702, a model 703 of the mobile terminal, communication performance 704, a device connector 705 held by the mobile terminal, an installed device driver 706, an audio communication method 707, a data communication method 708, and the like in association with a user ID 701.

(Device DB)

FIG. 8 is a view showing the arrangement of the device DB 510 according to this embodiment. Note that the device DB 510 is not limited to the arrangement shown in FIG. 8.

The device DB 510 stores a device model 802, a type 803 indicating an input device or an output device, a connected connector 804 held by the device, a communication method 805, a device capability 806, and the like in association with a device ID 801. Since the connected connector 804 and the communication method 805 correspond to each other, only one of them may be stored.

(Connected Device DB)

Figure 9A:
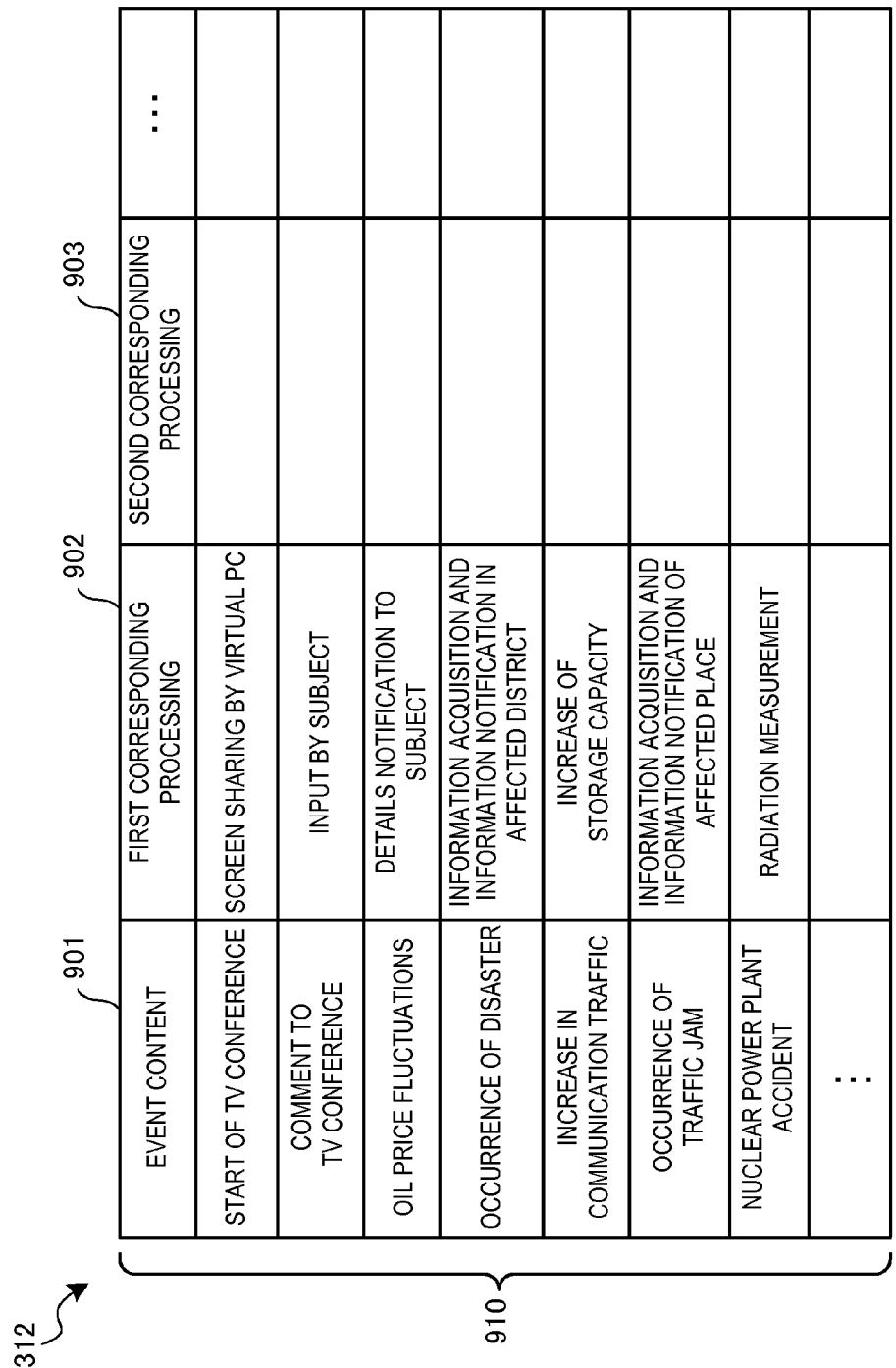
FIG. 9A is a view showing a partial arrangement of a connected device DB according to the second embodiment of the present invention.
Figure 9B:
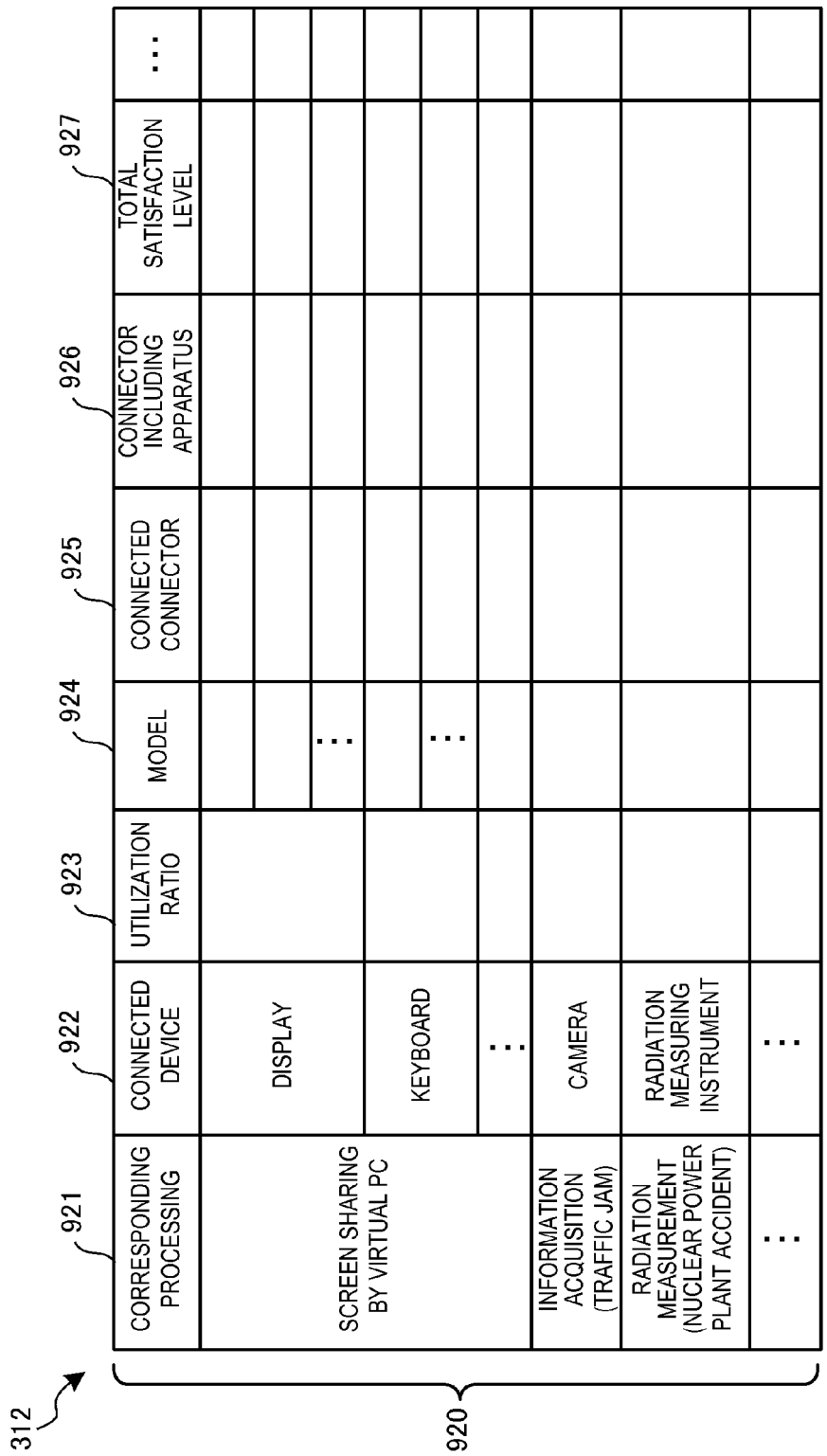
FIG. 9B is a view showing a partial arrangement of the connected device DB according to the second embodiment of the present invention.

FIGS. 9A and 9B are views showing the arrangement of the connected device DB 312 according to this embodiment. Note that the connected device DB 312 is not limited to the arrangement shown in FIGS. 9A and 9B.

FIG. 9A is a view showing a partial arrangement of the connected device DB 312 according to this embodiment. FIG. 9A shows a database 910 that accumulates a history representing what kind of corresponding processing was performed by the cloud server 210 based on the contents of an event that had occurred.

The database 910 stores first corresponding processing 902, second corresponding processing 903, . . . in association with an event content 901. The storage order can be the descending order of appearance count or the like. In addition, an appearance frequency or appearance rate may be stored in correspondence with each corresponding processing.

FIG. 9B is a view showing a partial arrangement of the connected device DB 312 according to this embodiment. FIG. 9B shows a database 920 that accumulates a history representing what kind of connected device was connected by the user or what kind of connected device was instructed to be connected by the cloud server 210 based on corresponding processing selected from FIG. 9A.

The database 920 stores a connected device 922 in association with corresponding processing 921. In association with each connected device 922, a utilization ratio 923 representing the use count of the device with respect to the appearance count of the corresponding processing 921 is stored. In addition, a model 924 of each connected device 922 is stored. A connected connector 925, a connector including apparatus 926, and a total satisfaction level 927 of all registered users in the past are stored in association with each model 924. Note that the connector including apparatus 926 includes a mobile terminal and a router.

(Connected Connector DB)

Figure 10:
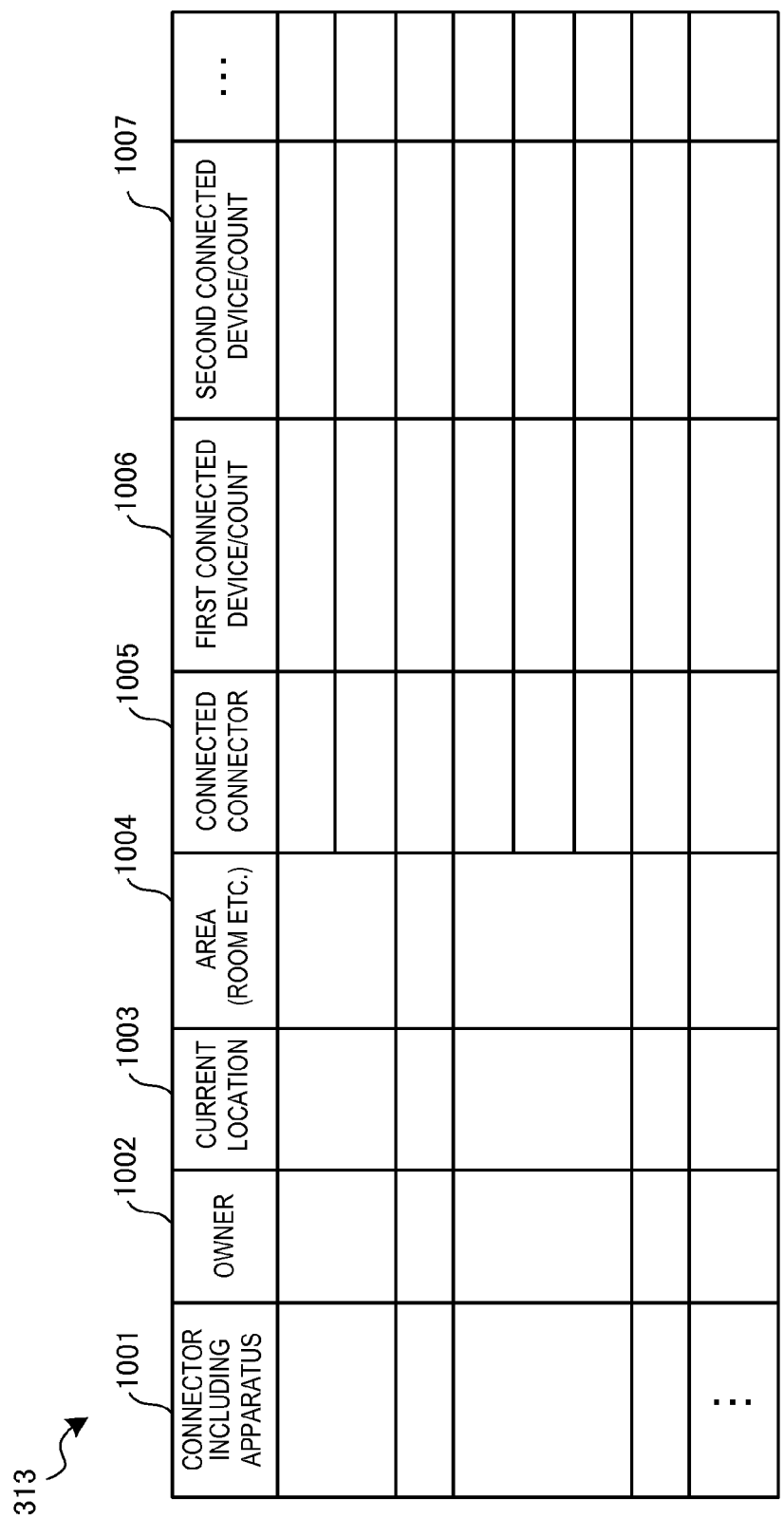
FIG. 10 is a view showing the arrangement of a connector DB according to the second embodiment of the present invention.

FIG. 10 is a view showing the arrangement of the connector DB 313 according to this embodiment. Note that the connected connector DB 313 is not limited to the arrangement shown in FIG. 10.

The connected connector DB 313 stores an owner 1002, a current location 1003 measured by a GPS (Global Positioning System) or the like, and an area 1004 such as a room including the current location 1003 in association with a connector including apparatus 1001. A connected connector 1005, a connection count 1006 of a first connected device, a connection count 1007 of a second connected device, . . . are stored in association with each connector including apparatus 1001. Note that the connector including apparatus 1001 includes a mobile terminal and a router.

<<Hardware Arrangement of Cloud Server>>

Figure 11:
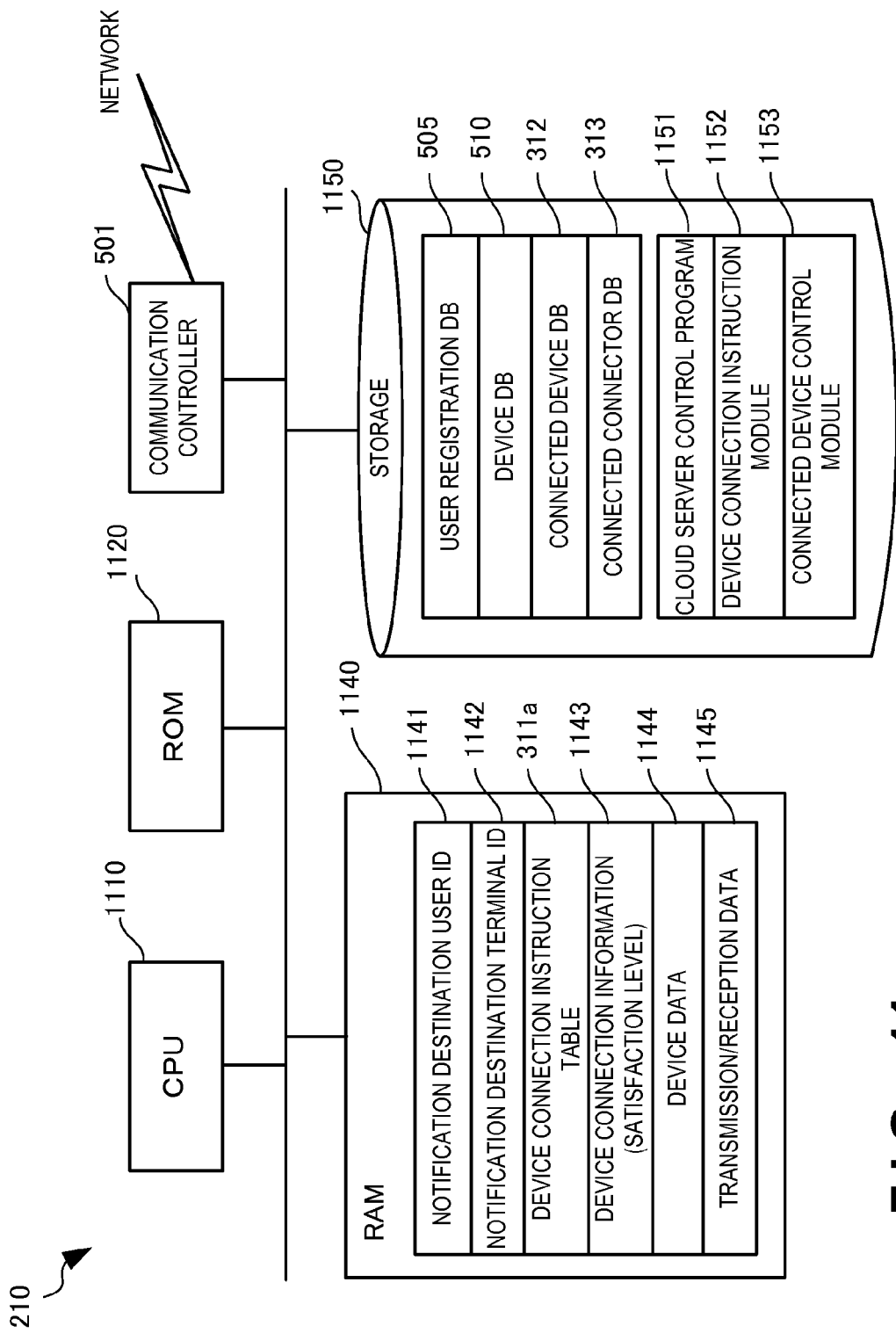
FIG. 11 is a block diagram showing the hardware arrangement of the cloud server according to the second embodiment of the present invention.

FIG. 11 is a block diagram showing the hardware arrangement of the cloud server 210 according to this embodiment.

Referring to FIG. 11, a CPU 1110 is a processor for arithmetic control, and implements each functional component of the cloud server 210 shown in FIG. 5 by executing a program. A ROM 1120 stores initial data, permanent data of programs and the like, and programs. The communication controller 501 is a communication controller, and in this embodiment, communicates with the mobile terminals 220, 240, and 321 to 324, and the router 325 via the network 330. Note that the number of CPUs 1110 is not limited to one, and the CPU 1110 may include a plurality of CPUs or a GPU (Graphics Processing Unit) for image processing.

A RAM 1140 is a random access memory used by the CPU 1110 as a work area for temporary storage. An area to store data necessary for implementation of the embodiment is allocated to the RAM 1140. A notification destination user ID 1141 is the identifier of the user of the communication destination to which device connection instruction information is transmitted. A notification destination terminal ID 1142 is the identifier of the mobile terminal of the communication destination. The device connection instruction table 311*a* is a table used to generate device connection instruction information to be transmitted to the mobile terminal indicated by the notification destination terminal ID 1142. Device connection information 1143 is history information of device connection including a user's satisfaction level and the like and searched from the connected device DB 312 or the connected connector DB 313 to generate device connection instruction information (see FIG. 12). Device data 1144 is data to be input/output from/to a device. Transmission/reception data 1145 is a message to be transmitted/received to/from the mobile terminal via the communication controller 501.

A storage 1150 stores databases, various kinds of parameters, and following data and programs necessary for implementation of the embodiment. The user registration DB 505 is the database shown in FIG. 7. The device DB 510 is the database shown in FIG. 8. The connected device DB 312 is the database shown in FIGS. 9A and 9B. The connected connector DB 313 is the database shown in FIG. 10.

The storage 1150 stores the following programs. A cloud server control program 1151 is a program that controls the entire cloud server 210. A device connection instruction module 1152 is a module that generates device connection instruction information and transmits it to the mobile terminal in the cloud server control program 1151. The device connection instruction module 1152 includes connected device selection processing (see FIG. 14). A connected device control module 1253 is a module that controls the connected device in the cloud server control program 1151. The connected device control module 1153 includes a USB device driver and a driver application used to connect the cloud server 210, the mobile terminal 220, and the device in cooperation with the driver application of the mobile terminal.

Note that FIG. 11 shows data and programs associated with this embodiment but not general-purpose data and programs in the cloud server.

(Device Connection Instruction Table)

FIG. 12 is a view showing the arrangement of the device connection instruction table 311*a* according to this embodiment.

The device connection instruction table 311*a* stores selected corresponding processing in association with an event content 1201. A connected device 1203 selected as a device that requires to be connected is stored in association with each corresponding processing. A model 1204, a connected connector 1205, and a connector including apparatus 1206 are stored in association with each connected device 1203. Note that the connector including apparatus 1206 includes a mobile terminal and a router.

In addition, a notification destination terminal ID 1207 to which device connection instruction information is transmitted and a user ID 1208 of a notification destination are stored in association with each event content 1201 and corresponding processing 1202. Note that although one notification destination terminal is stored in FIG. 12, a plurality of notification destination terminals may be stored.

<<Processing Procedure of Cloud Server>>

Figure 13:
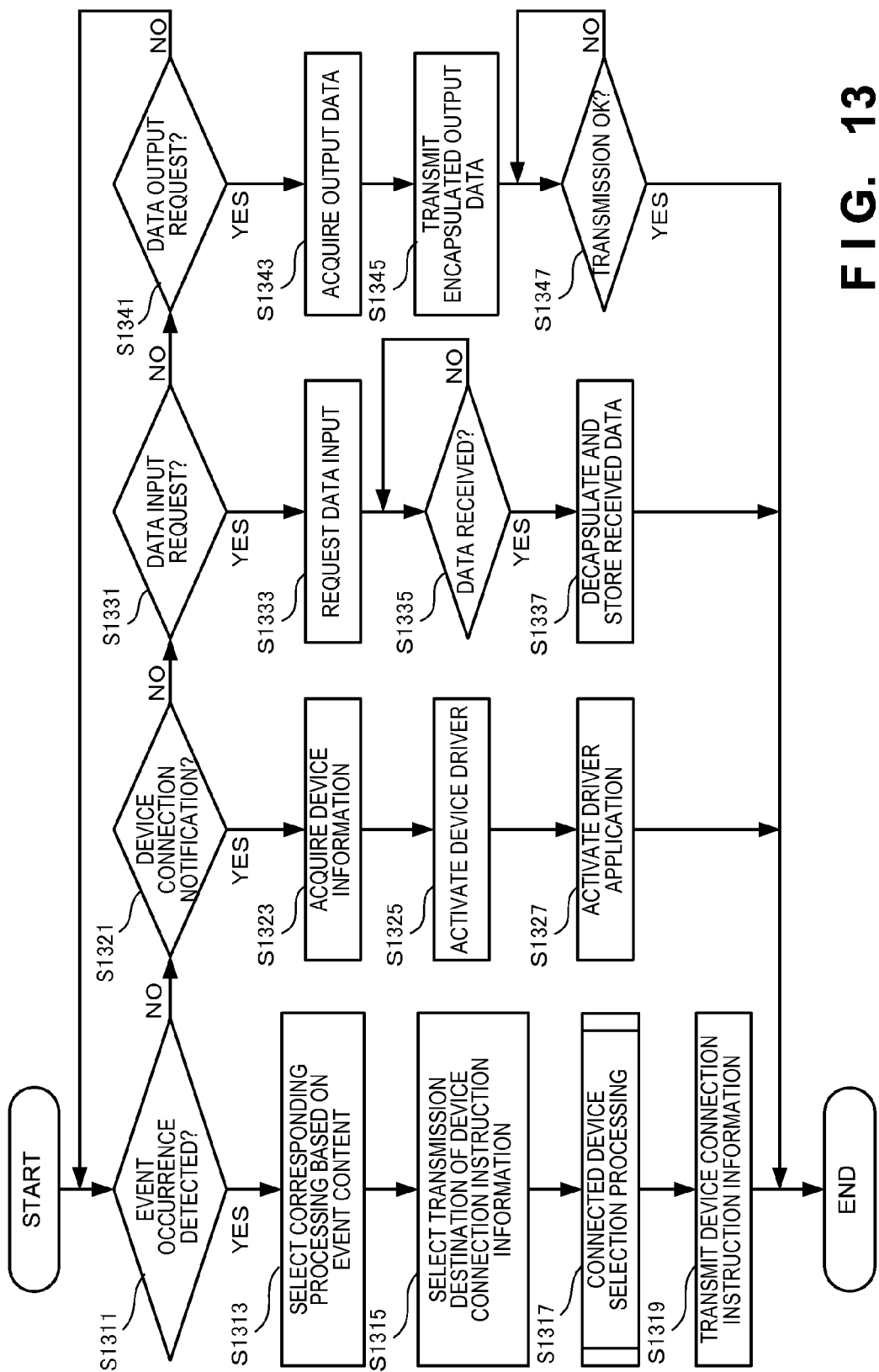
FIG. 13 is a flowchart showing the processing procedure of the cloud server according to the second embodiment of the present invention.

FIG. 13 is a flowchart showing the processing procedure of the cloud server 210 according to this embodiment. This flowchart is executed by the CPU 1110 shown in FIG. 11 using the RAM 1140 and implements the functional components shown in FIG. 5. Note that the flowchart of FIG. 13 starts in accordance with an event occurrence, a device connection notification, a data input/output request, and the like in the cloud server 210.

First, in step S1311, the cloud server 210 determines whether event occurrence is detected (or event occurrence is acquired). In step S1321, the cloud server 210 determines whether a device connection notification from the mobile terminal is received. In step S1331, the cloud server 210 determines whether to request input data from the device connected to the mobile terminal. In step S1341, the cloud server 210 determines whether to request data output to the device connected to the mobile terminal.

Upon detecting event occurrence, the cloud server 210 advances to step S1313 and selects corresponding processing by referring to the connected device DB 312 based on the contents of the event that has occurred. In step S1315, the cloud server 210 selects a mobile terminal as the transmission destination of device connection instruction information to be generated. In step S1317, the cloud server 210 executes connected device selection processing of selecting a connected device by referring to the connected device DB 312 and the connected connector DB, and generating device connection instruction information (see FIG. 14). In step S1319, the cloud server 210 transmits the generated device connection instruction information to the mobile terminal of the transmission destination.

Upon receiving a device connection notification from the mobile terminal, the cloud server 210 advances to step S1323 and acquires the device information (descriptors) of the connected device from the mobile terminal. Note that if the mobile terminal cannot acquire the device information, the cloud server 210 directly acquires the device information from the device connected via the mobile terminal, as will be described later in the seventh embodiment. In step S1325, the cloud server 210 activates a corresponding device driver based on the device information. Next, the cloud server 210 activates a driver application to connect the cloud server 210, the mobile terminal 220, and the connected device.

To request input data from the device, the cloud server 210 advances to step S1333 and requests data input from the device connected to the mobile terminal. In step S1335, the cloud server 210 waits for reception of input data. Upon receiving input data, the cloud server 210 advances to step S1337, and decapsulates the received data and stores the input data.

To request data output to the device, the cloud server 210 advances to step S1343 and acquires output data. The output data can be either data generated in the cloud server 210 or data that the cloud server 210 has acquired via another mobile terminal or from an external server. Next, the cloud server 210 encapsulates the acquired data to generate transmission data, and transmits it to the device connected to the mobile terminal. In step S1347, the cloud server 210 waits for reception completion from the mobile terminal, and upon confirming transmission OK, ends the data output.

(Connected Device Selection Processing)

Figure 14:
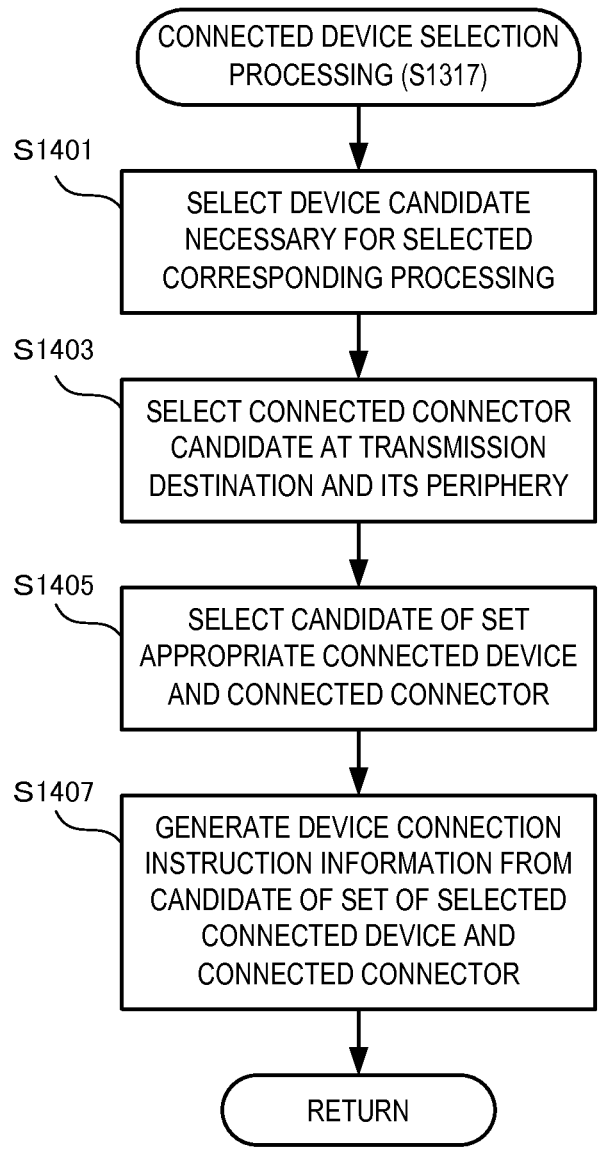
FIG. 14 is a flowchart showing the processing procedure of connected device selection processing according to the second embodiment of the present invention.

FIG. 14 is a flowchart showing the processing procedure of connected device selection processing S1317 according to this embodiment.

First, in step S1401, the cloud server 210 selects a device candidate necessary and appropriate for selected corresponding processing by referring to the connected device DB 312. In step S1403, the cloud server 210 selects a connected connector candidate usable and appropriate at the transmission destination and its periphery by referring to the connected connector DB 313. In step S1405, the cloud server 210 selects a candidate of the set of the selected appropriate connected device and connected connector based on the user's satisfaction level and the like. In step S1407, the cloud server 210 generates device connection instruction information to be notified to the mobile terminal from the candidate of the set of the selected appropriate connected device and connected connector.

<<Hardware Arrangement of Mobile Terminal>>

Figure 15:
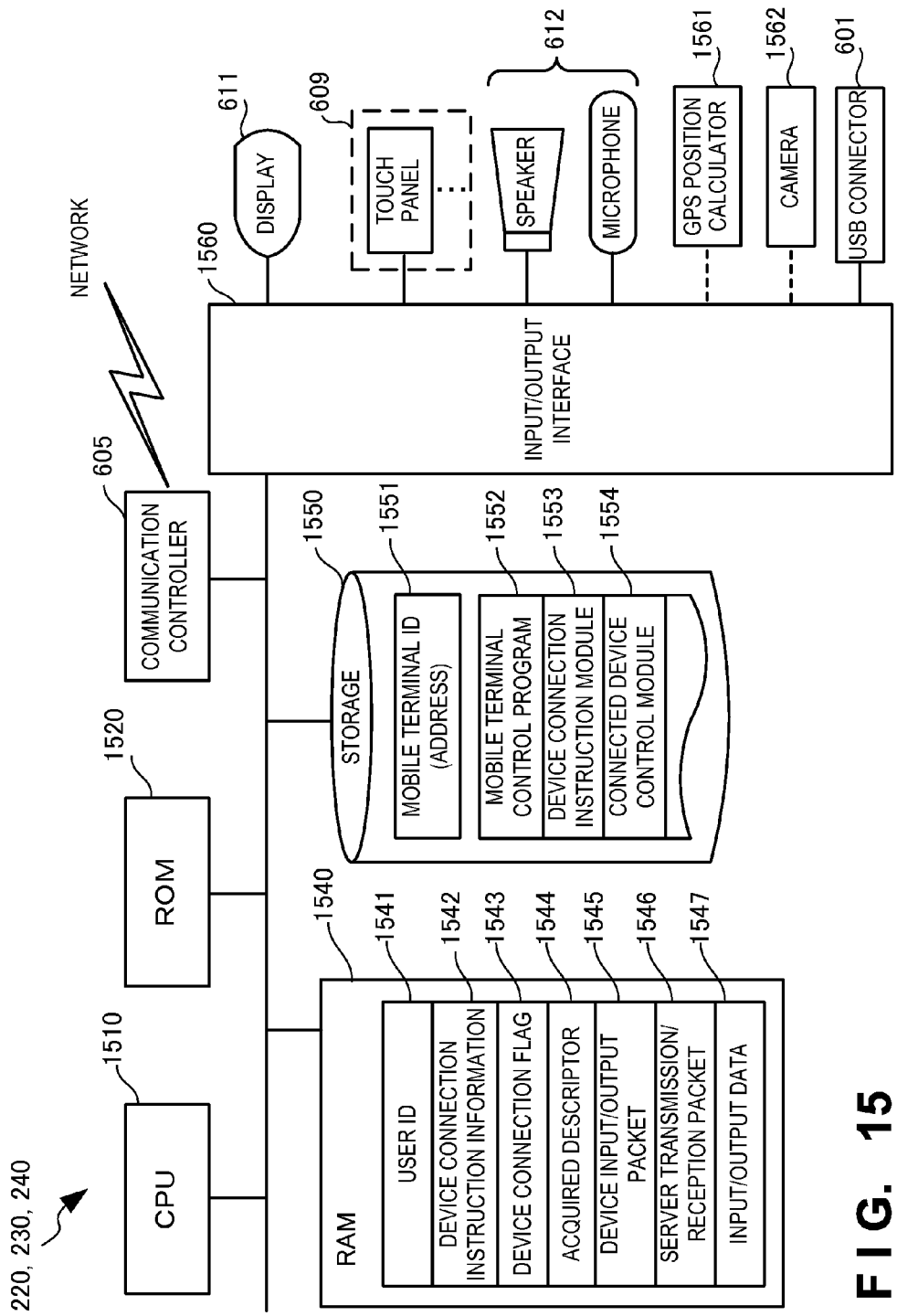
FIG. 15 is a block diagram showing the hardware arrangement of the mobile terminal according to the second embodiment of the present invention.

FIG. 15 is a block diagram showing the hardware arrangement of the mobile terminals 220 to 240 and 321 to 324 according to this embodiment. Since all mobile terminals have the same arrangement, the mobile terminal 220 will be representative of them in the following description.

Referring to FIG. 15, a CPU 1510 is a processor for arithmetic control, and implements each functional component of the mobile terminal 220 shown in FIG. 6 by executing a program. A ROM 1520 stores initial data, permanent data of programs and the like, and programs. The communication controller 605 is a communication controller, and in this embodiment, communicates with the cloud server 210 via the network. Note that the number of CPUs 1510 is not limited to one, and the CPU 1510 may include a plurality of CPUs or a GPU for image processing.

A RAM 1540 is a random access memory used by the CPU 1510 as a work area for temporary storage. An area to store data necessary for implementation of the embodiment is allocated to the RAM 1540. A user ID 1541 is the identifier of the user who is using the mobile terminal. Device connection instruction information 1542 is information for instructing device connection, which is received from the cloud server 210. A device connection flag 1543 is a flag representing that a device is connected to the USB connector 601. An acquired descriptor 1544 is a descriptor acquired from the connected USB device. A device input/output packet 1545 is a packet to be input/output from/to the USB device. A server transmission/reception packet 1546 is an encapsulated packet to be transmitted/received to/from the cloud server 210 via the communication controller 605. Input/output data 1547 is input/output data to be input/output via an input/output interface 1560.

A storage 1550 stores databases, various kinds of parameters, and following data and programs necessary for implementation of the embodiment. A mobile terminal ID 1551 is the identifier of the mobile terminal. The storage 1550 stores the following programs. A mobile terminal control program 1552 is a control program that controls the entire mobile terminal 220. A device connection instruction module 1553 is a module that receives device connection instruction information from the cloud server 210 and displays it on the display 611 in the mobile terminal control program 1552. A connected device control module 1554 is a module that controls the connected device in the mobile terminal control program 1552. The connected device control module 1653 includes a general-purpose USB driver or a driver application used to connect the cloud server 210, the mobile terminal 220, and the device in cooperation with the driver application of the cloud server 210.

The input/output interface 1560 interfaces input/output data from/to an input/output device. The display 611 and the operator 609 formed from a touch panel and the like are connected to the input/output interface 1560. The audio input/output unit 612 such as a speaker or a microphone is also connected to the input/output interface 1560. A GPS (Global Positioning System) position generator 1561 and a camera 1562 are also connected to the input/output interface 1560. Additionally, the USB connector 601 is connected to the input/output interface 1560.

Note that FIG. 15 shows data and programs associated with this embodiment but not general-purpose data and programs in the mobile terminal.

(Processing Procedure of Mobile Terminal)

Figure 16:
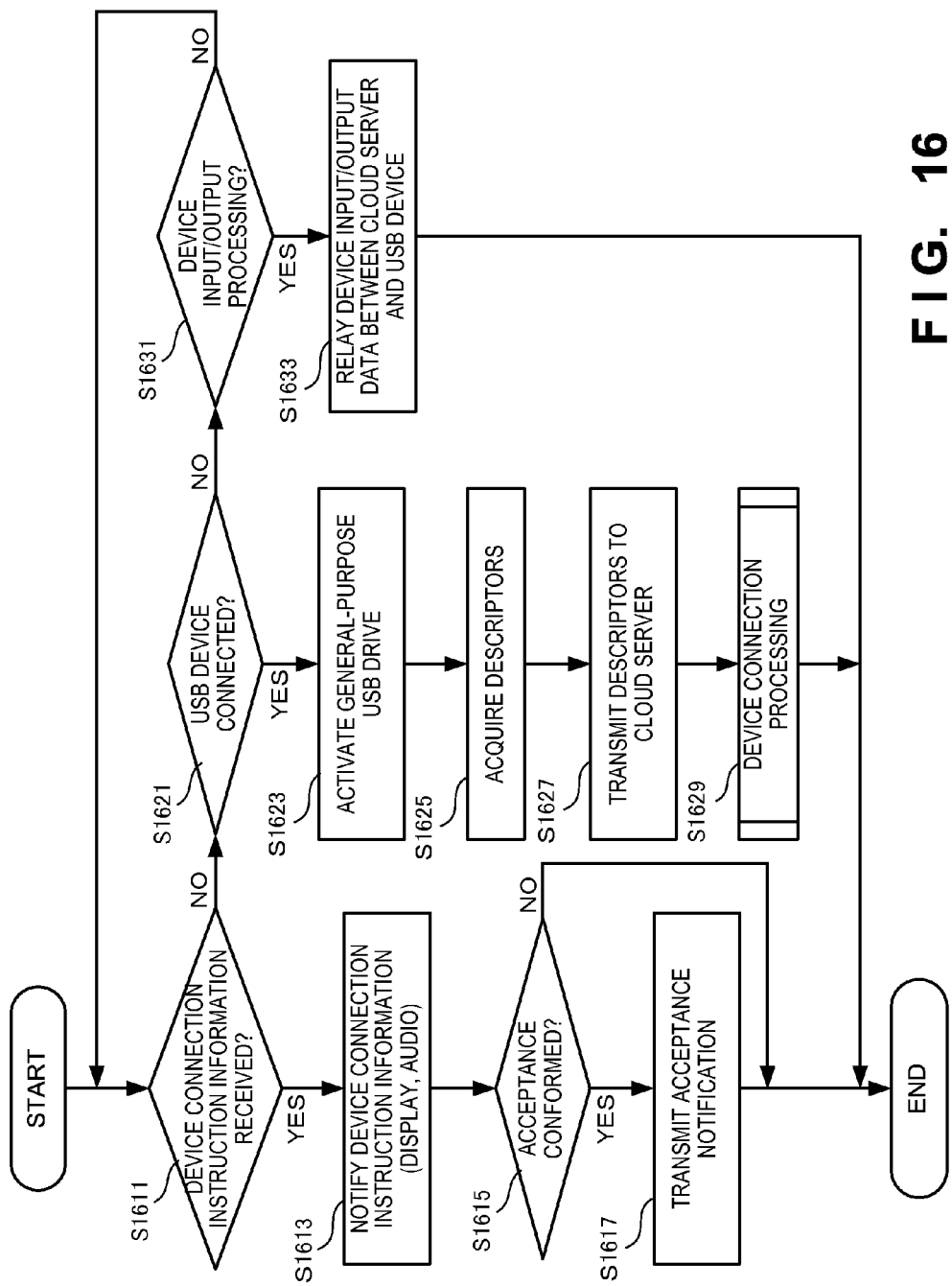
FIG. 16 is a flowchart showing the processing procedure of the mobile terminal according to the second embodiment of the present invention.

FIG. 16 is a flowchart showing the processing procedure of the mobile terminals 220 to 240 and 321 to 324 according to this embodiment. This flowchart is executed by the CPU 1510 using the RAM 1540 and implements the functional components shown in FIG. 6. Note that the flowchart of FIG. 16 starts in accordance with an event occurrence such as a device connection instruction from the cloud server 210, connection of a USB device, or input/output processing of a device in the mobile terminal.

First, in step S1611, the mobile terminal determines whether device connection instruction information from the cloud server 210 is received. In step S1621, the mobile terminal determines whether a USB device is connected to the USB connector. In step S1431, the mobile terminal determines whether to perform input/output processing of the connected device.

upon receiving device connection instruction information, the mobile terminal advances to step S1613 and notifies the device connection instruction information. The notification includes screen display and/or audio output. In step S1615, the mobile terminal waits for user's acceptance conformation of the device connection instruction information. When acceptance of the device connection instruction information is confirmed by user's touch or the like, the mobile terminal transmits the acceptance notification to the cloud server 210 in step S1617. Note that the acceptance confirmation is processing for preventing delay of device connection because of the absence of the user to which the device connection instruction information is transmitted.

Third Embodiment

An information processing system according to the third embodiment of the present invention will be described next. The information processing system according to this embodiment is different from the second embodiment in that an approach of a registered schedule is detected as event occurrence. The rest of the components and operations is the same as in the second embodiment. Hence, the same reference numerals as in the second embodiment denote the same components and operations, and a detailed description thereof will be omitted.

According to this embodiment, a device connection instruction is given to a user in correspondence with an approach of a schedule, thereby preparing device connection to a mobile terminal corresponding to the schedule in advance.

Note that in this embodiment, an example in which device connection to the connected connector of a predetermined mobile terminal is instructed will be described. However, only a device instruction may be given to the user, and the connected connector may freely be chosen by the user. As in the second embodiment, a history of devices used in a schedule is accumulated, and a device to be connected is predicted. However, a specific connected device may be stored in correspondence with a schedule.

<<Information Processing System>>

The arrangement and operation of the information processing system according to this embodiment will be described with reference to FIGS. 17 and 18.

(Description of Operation)

Figure 17:
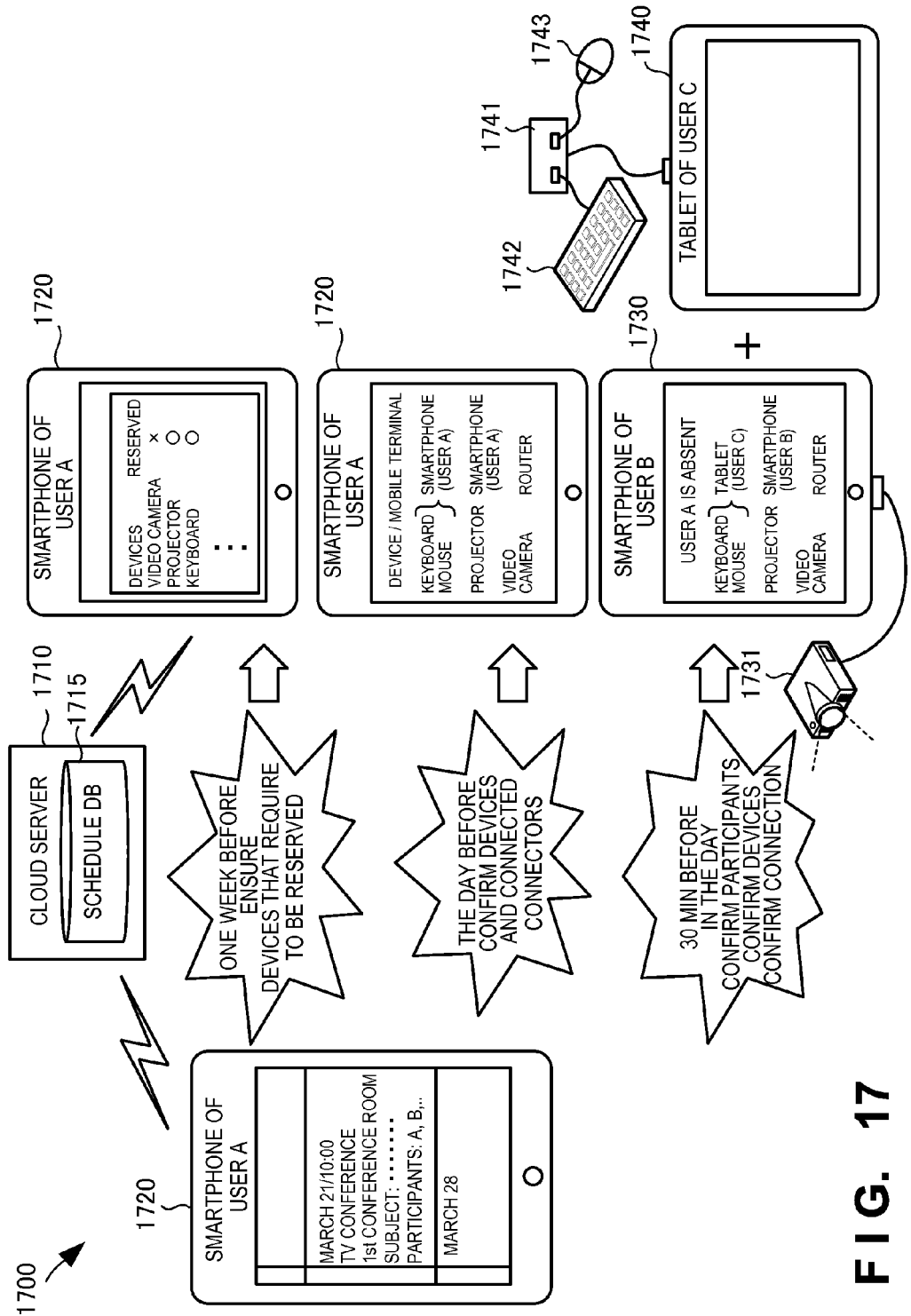
FIG. 17 is a view for explaining the operation of an information processing system according to the third embodiment of the present invention.

FIG. 17 is a view for explaining the operation of an information processing system 1700 according to this embodiment. FIG. 17 shows an operation of processing an event occurrence, that is, device preparation for a TV conference registered as a schedule in advance.

In the left view of FIG. 17, the schedule of a TV conference on March 21 is registered from a mobile terminal 1720 that is the smartphone of a user A. The schedule information includes, for example, the name of the room (first conference room) to be used, the subject (smartphone development), and the participants (A, B, . . . ) of the TV conference. The schedule is transmitted from the mobile terminal 1720 to a cloud server 1710 and registered in a schedule DB 1715 of the cloud server 1710. That is, the schedule DB 1715 functions as a schedule storage.

In this example, events occur one week before the start of the TV conference, the day before the start of the TV conference, and 30 min before the start of the TV conference. First, one week before the start of the TV conference, the mobile terminal 1720 that is the smartphone of the user A shown on the upper stage of the right view is notified whether devices that require to be reserved have already been reserved. Next, on the day before the start of the TV conference, the mobile terminal 1720 that is the smartphone of the user A shown on the middle stage of the right view is notified of necessary devices and connected connectors thereof.

Thirty minutes before the start of the TV conference, a mobile terminal 1730 that is the smartphone of a user B shown on the lower stage of the right view is notified of necessary devices and connected connectors thereof. Assume here that a response of absence is returned for the notification from the cloud server 210 to the mobile terminal 1720 that is the smartphone of the user A, or no response is returned, and timeout occurs. In this case, a participant (user B) other than the user (user A) of the cloud server is estimated or detected from the history by referring to the DB, and a device connection instruction is given to the participant. Notification is done for the mobile terminal 1730 that is the smartphone of the user B as the next participant. In the lower stage of the right view, a projector 1731 is connected to the mobile terminal 1730 that is the smartphone of the user B, and a keyboard 1742 and a mouse 1743 are connected to a mobile terminal 1740 that is the tablet of a user C via a router 1741 in accordance with the device connection instruction.

The cloud server 1710 confirms connection of the necessary devices, and makes a TV conference program including a device driver, a driver application, a data processing application, and a web application run on a virtual PC. The devices are connected, thereby completing the preparation for the start of the TV conference and waiting for arrival of participants.

(Arrangement)

Figure 18:
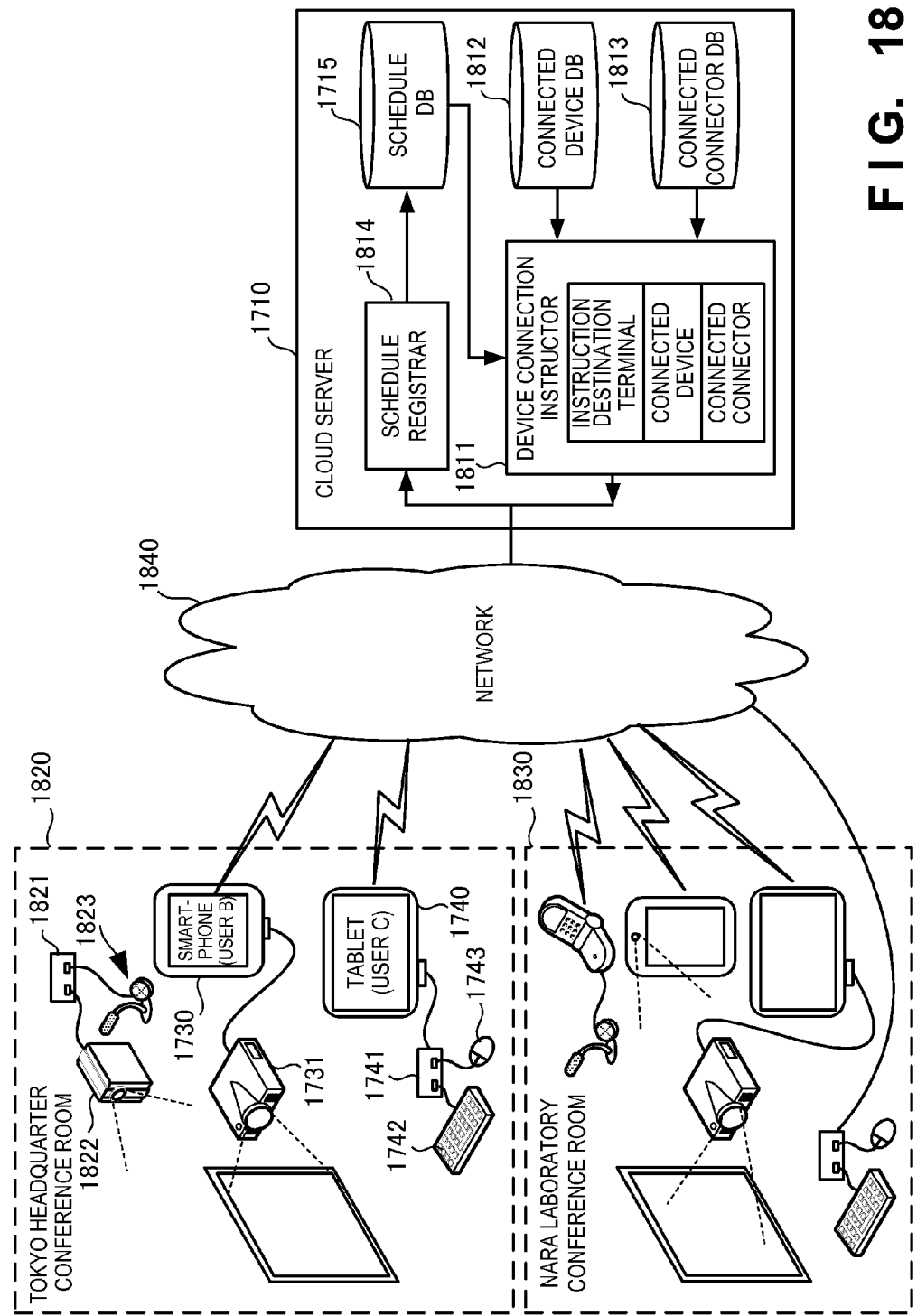
FIG. 18 is a block diagram showing the arrangement of the information processing system according to the third embodiment of the present invention.

FIG. 18 is a block diagram showing the arrangement of the information processing system 1700 according to this embodiment. Referring to FIG. 18, a TV conference including a Tokyo headquarter conference room 1820 and a Nara laboratory conference room 1830 is assumed.

The information processing system 1700 includes the cloud server 1710, mobile terminals (including a router) in the Tokyo headquarter conference room 1820, and mobile terminals in the Nara laboratory conference room 1830, which are connected via a network 1840.

The cloud server 1710 includes a schedule registrar 1814 that registers, in the schedule DB 1715, a schedule instructed to be registered by the user. The cloud server 1710 also includes a connected device DB 1812 that accumulates a connection history used to select a connected device in correspondence with the schedule contents of this embodiment, and a connected connector DB 1813 that accumulates a connection history used to select a connected connector in correspondence with the schedule contents. Each of the connected device DB 1812 and the connected connector DB 1813 functions as a connection history accumulator. The cloud server 1710 also includes a device connection instructor 1811 that generates device connection instruction information by referring to the schedule DB 1715, the connected device DB 1812, and the connected connector DB 1813, and instructs the mobile terminal at an appropriate time. The device connection instructor 1811 stores an instruction destination terminal to which the device connection instruction information is sent, and a connected device and a connected connector included in the device connection instruction information.

The mobile terminal 1730 that is the smartphone of the user B and the projector 1731 connected to the mobile terminal 1730 are arranged in the Tokyo headquarter conference room 1820. In addition, the mobile terminal 1740 that is the smartphone of the user C and the keyboard 1742 and the mouse 1743 connected to the mobile terminal 1740 via the router 1741 are arranged. A video camera 1822 and a microphone and speaker 1823 are connected to a router 1821 installed in the conference room as connected devices.

In the Nara laboratory conference room 1830 as well, devices instructed by the cloud server 210 are connected to the mobile terminals, thereby completing preparation for the start of the TV conference. Note that a detailed description of the mobile terminals and connected devices in the Nara laboratory conference room 1830 will be omitted.

(Operation Procedure)

Figure 19:
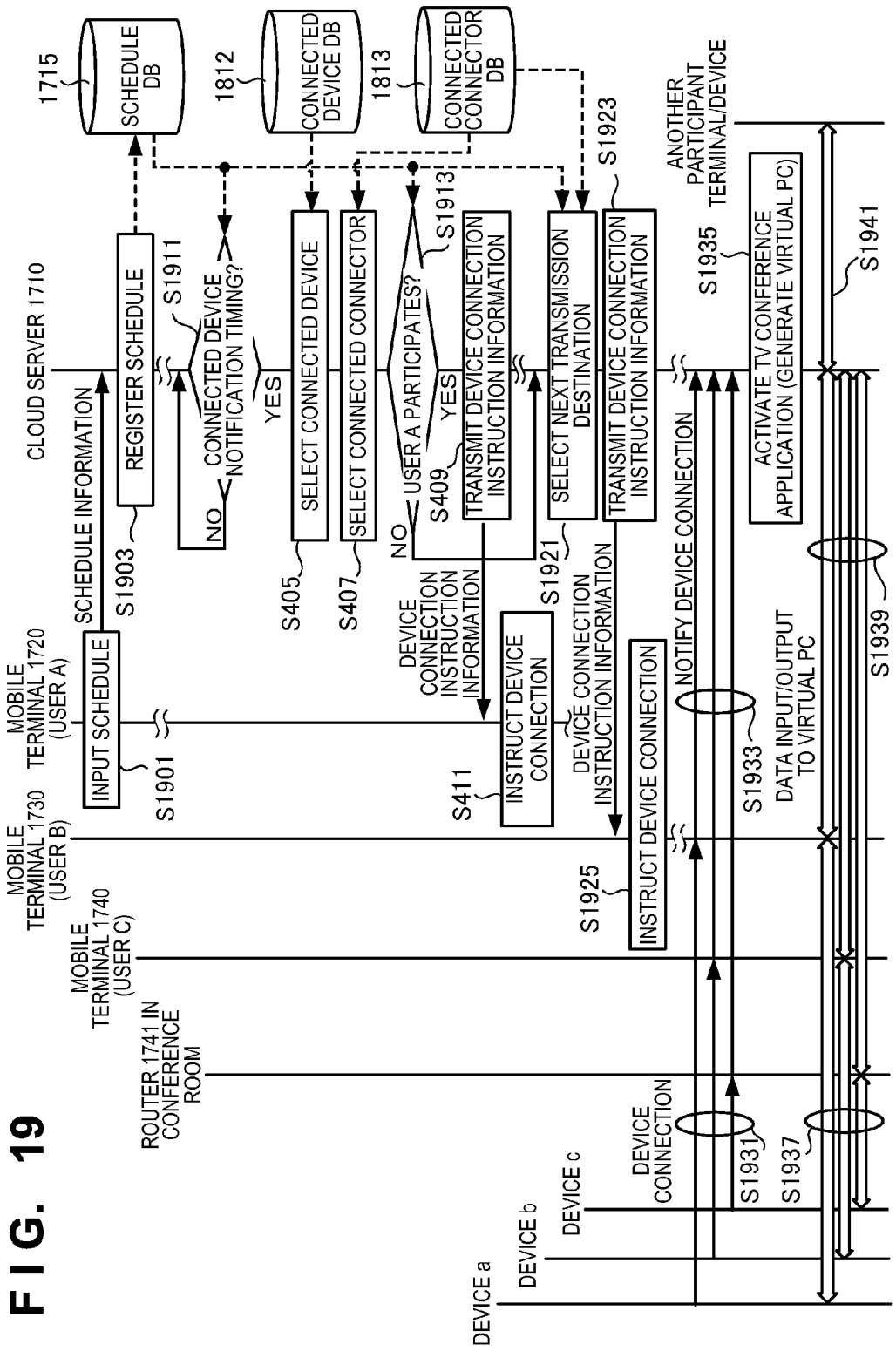
FIG. 19 is a sequence chart showing the operation procedure of the information processing system according to the third embodiment of the present invention.

FIG. 19 is a sequence chart showing the operation procedure of the information processing system 1700 according to this embodiment. Note that the same step numbers as in FIG. 4A of the second embodiment denote the same steps in FIG. 19, and a description thereof will be omitted.

First, in step S1901, a schedule is input from the mobile terminal 1720 of the user A. The cloud server 1710 receives the schedule information from the mobile terminal 1720 and registers the schedule in the schedule DB 1715 in step S1903. After that, the cloud server 1710 manages the registered schedule and notifies the mobile terminal of the user of information about the connected device at an appropriate time.

In step S1911, the cloud server 1710 determines whether the connected device notification timing has come. The timing is, for example, one week before, the day before, or 30 min before the schedule shown in FIG. 17. Note that the notification timing can be either uniformly preset or set by the user. The operation procedure 30 min before in FIG. 17 will be described below.

When the notification timing as the event has come, a connected device and a connected connector are selected. In step S1913, the cloud server 1710 determines whether the user A who has registered the schedule participates. If the user A participates, device connection instruction information is transmitted to the mobile terminal 1720, and device connection is prepared by the user A.

If the user A is absent, the cloud server 1710 advances to step S1921 and selects the next transmission destination of the device connection instruction information. As the next transmission destination, another participant in the same schedule or a person familiar with the user A may be selected based on the past participation history and the like. In step S1923, the device connection instruction information is transmitted to the mobile terminal 1730 (in this example, the smartphone of the user B) of the selected transmission destination. In step S1925, the mobile terminal 1730 receives the device connection instruction information and instructs the user B to do device connection.

After that, in step S1931, devices a to c are connected to the mobile terminal 1730 of the user B who participates, the mobile terminal 1740 of the user C who participates, and the router 1741 in the conference room, respectively. In step S1933, each of the mobile terminals and the router sends a device connection notification to the cloud server 1710.

In step S1935, a virtual PC is generated, and a TV conference application is activated. This TV conference application allows a participant group in another location, in this example, the Nara laboratory conference room or the like to share the screen. In steps S1937, S1939, and S1941, data input/output from/to the virtual PC is executed, and the TV conference with the shared screen is implemented.

<<Functional Arrangement of Cloud Server>>

Figure 20:
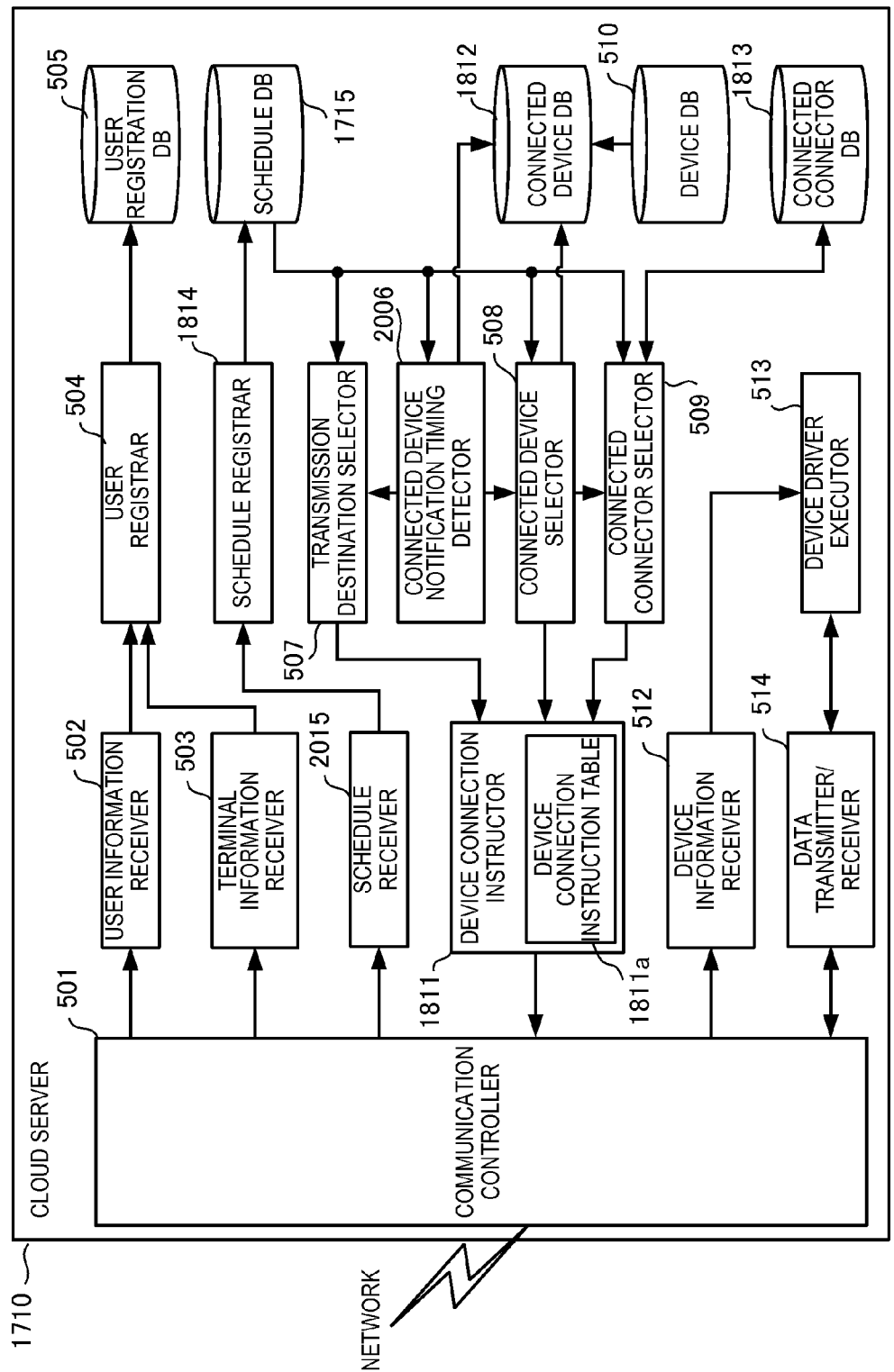
FIG. 20 is a block diagram showing the functional arrangement of a cloud server according to the third embodiment of the present invention.

FIG. 20 is a block diagram showing the functional arrangement of the cloud server 1710 according to this embodiment. Note that the same reference numerals as in FIG. 5 of the second embodiment denote the same functional components in FIG. 20, and a description thereof will be omitted.

A schedule receiver 2015 receives schedule registered contents received from the mobile terminal. The schedule registered contents are sent to the schedule registrar 1814 and registered in the schedule DB 1715 (see FIG. 21). The connected device DB 1812 accumulates the history of connected devices corresponding to the schedule contents (see FIG. 22). The connected connector DB 1813 accumulates the history of connected connectors corresponding to the schedule contents (see FIG. 23).

A connected device notification timing detector 2006 detects the connected device notification timing based on the schedule information in the schedule DB 1715. The connected device notification timing detector 2006 activates a transmission destination selector 507, a connected device selector 508, or connected connector selector 509. The device connection instructor 1811 includes a device connection instruction table 1811a (see FIG. 23), and stores the connected device and connected connector selected in correspondence with the schedule contents. The device connection instructor 1811 generates device connection instruction information and transmits it to the transmission destination mobile terminal selected by the transmission destination selector 507.

(Schedule DB)

FIG. 21 is a view showing the arrangement of the schedule DB 1715 according to this embodiment. Note that the schedule DB 1715 is not limited to FIG. 21.

The schedule DB 1715 stores a schedule content 2102 in association with a date/time 2101 of holding a schedule. The interval of the dates/times 2101 may be variable depending on the number of schedules. A connected device instruction timing 2103 and a registration user ID 2104 who has registered the schedule are stored in association with each schedule content 2102. In addition, first location information 2105 including a first use location, a person responsible for preparation, and a participant, second location information 2106 including a second use location, a person responsible for preparation, and a participant, . . . are stored. Note that the number of location information may be one. Information of a device or router installed in the location can be searched from the use location.

(Connected Device DB)

Figure 22:
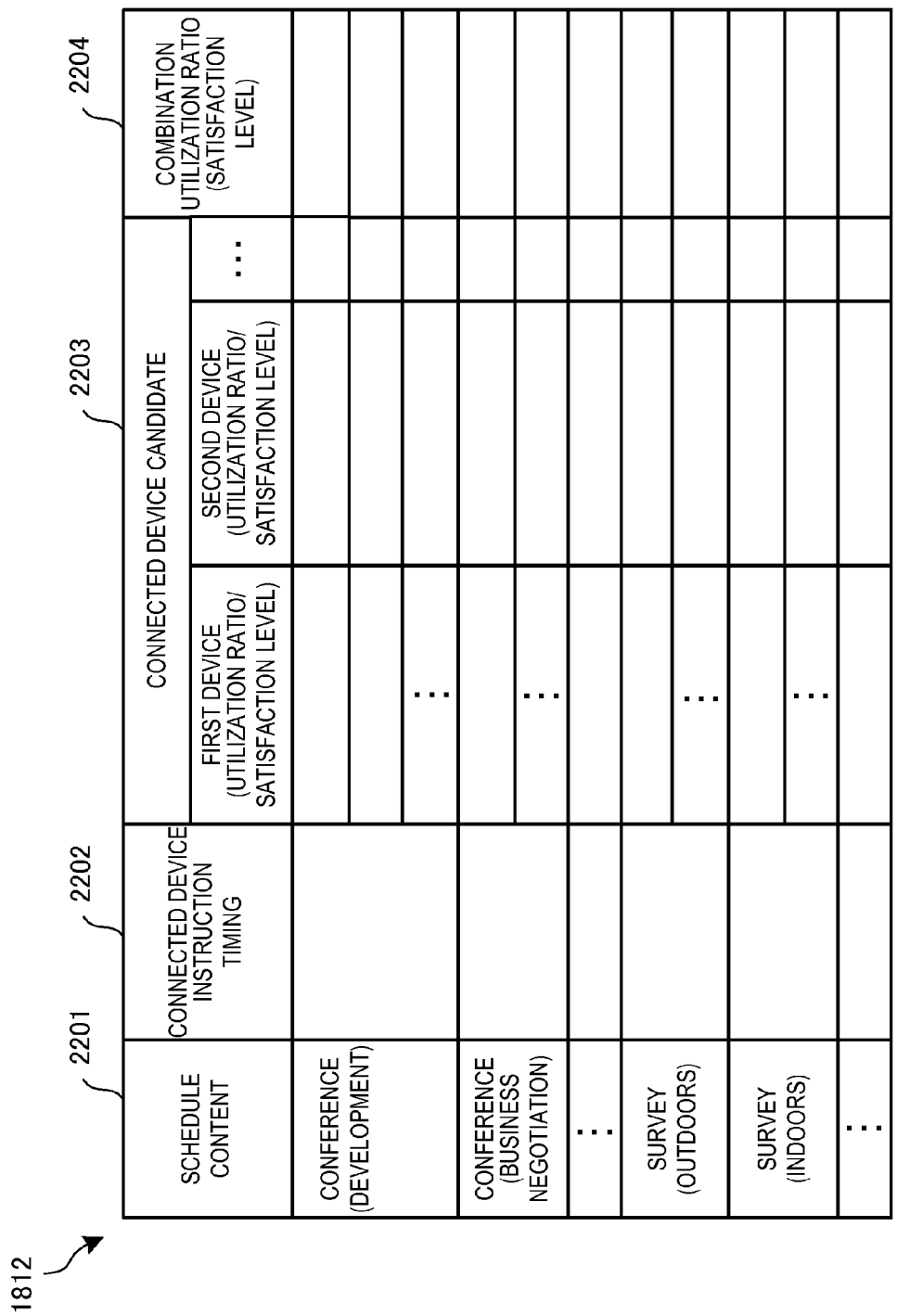
FIG. 22 is a view showing the arrangement of a connected device DB according to the third embodiment of the present invention.

FIG. 22 is a view showing the arrangement of the connected device DB 1812 according to this embodiment. Note that the connected device DB 1812 is not limited to FIG. 22.

The connected device DB 1812 stores a connected device candidate 2203 in association with a schedule content 2201 and a connected device instruction timing 2202. A first device, a second device, . . . , are stored in the connected device candidate 2203, and the use ratio and user's satisfaction level of each device corresponding to the schedule are added. In addition, the use ratio and user's satisfaction level of each device combination are stored in association with each connected device candidate 2203.

(Connected Connector DB)

Figure 23:
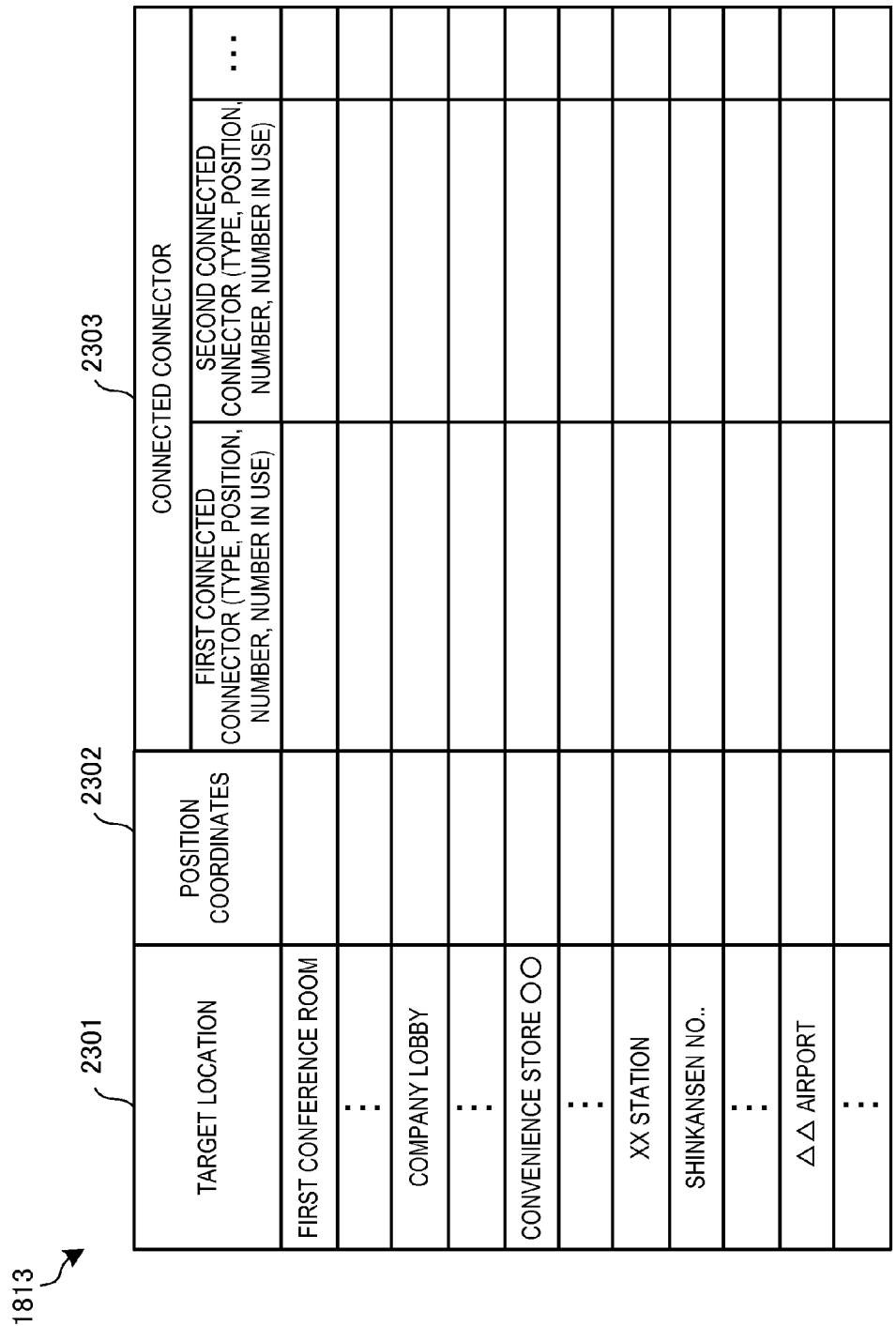
FIG. 23 is a view showing the arrangement of a connector DB according to the third embodiment of the present invention.

FIG. 23 is a view showing the arrangement of the connected connector DB 1813 according to this embodiment. Note that the connected connector DB 1813 is not limited to FIG. 23.

The connected connector DB 1813 stores position coordinates 2302 of a target location 2301 included in the schedule information and a connected connector 2303 usable at the target location in association with the target location. A first connected connector, a second connected connector, . . . , are stored in the connected connector 2303. Each connected connector includes the information of the type and position, the number of connectors, and the number of connectors currently in use.

Note that as for the connector of a mobile terminal carried by a user, the position may be confirmed by DPS as the user moves, and the connected connector DB 1813 may be updated any time. Alternatively, when selecting a connected connector, a connector may be added independently of the connected connector DB 1813.

(Device Connection Instruction Table)

FIG. 24 is a view showing the arrangement of a device connection instruction table 2011a according to this embodiment.

The device connection instruction table 2011a stores a schedule content 2402 in association with a transmission timing 2401. The device connection instruction table 2011a also stores a transmission destination 2403 of device connection instruction information, a first device connection candidate 2404, a second device connection candidate 2405, . . . , in association with each schedule content 2402. As each device connection candidate, at least one connected device candidate (in FIG. 14, only the first and second device connection candidates) including a connected connector candidate is stored.

Note that a utilization ratio or user's satisfaction level may be added to each connected device candidate or device connection candidate.

<<Processing Procedure of Cloud Server>>

Figure 25:
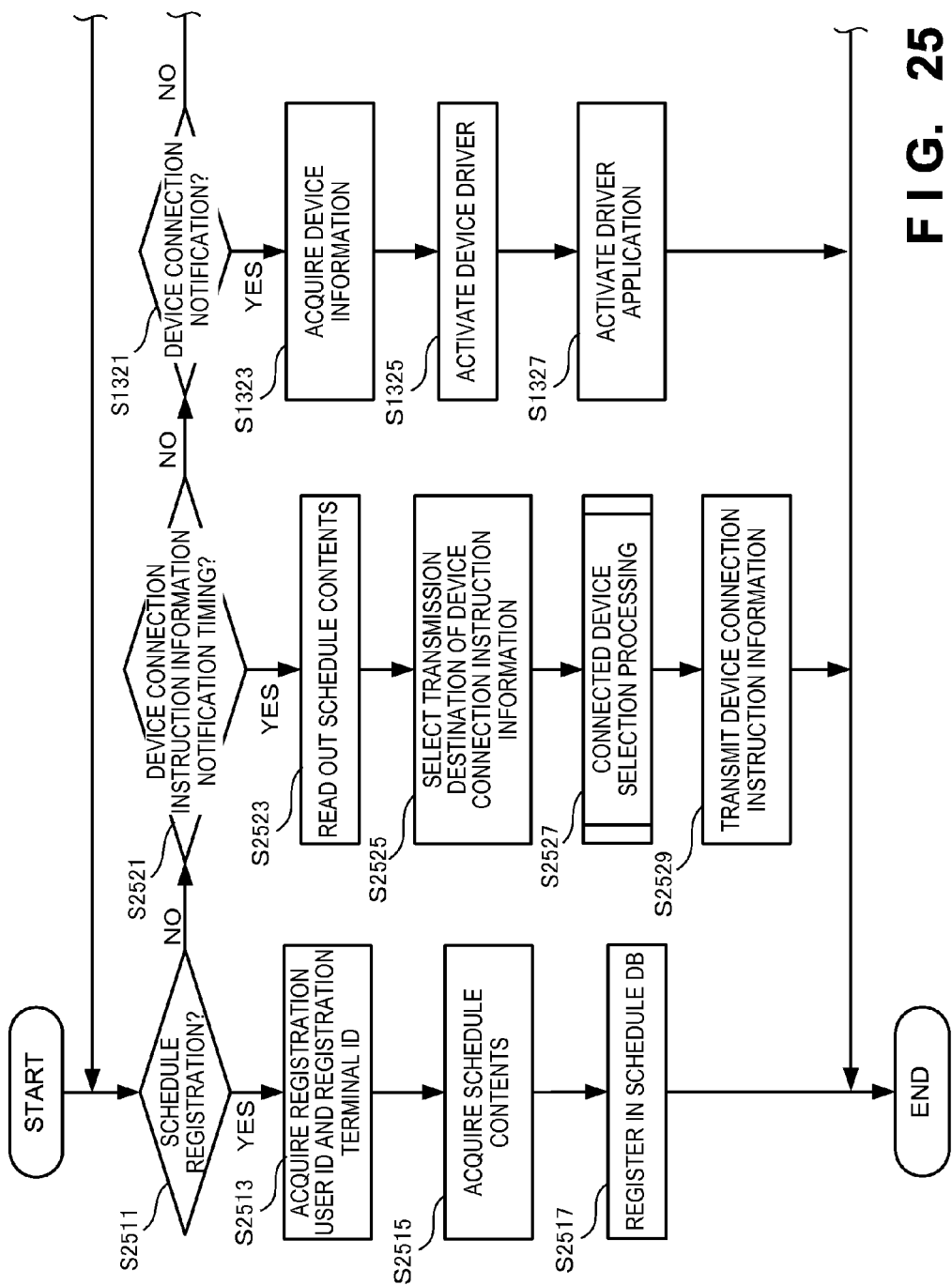
FIG. 25 is a flowchart showing the processing procedure of the cloud server according to the third embodiment of the present invention.

FIG. 25 is a flowchart showing the processing procedure of the cloud server 1710 according to this embodiment. This flowchart is executed by a CPU 1110 shown in FIG. 11 using a RAM 1140 and implements the functional components shown in FIG. 20. Note that FIG. 25 does not illustrate the same processes as in FIG. 13 of the second embodiment, and additionally, the same step numbers denote the same steps, and a description thereof will be omitted.

In step S2511, the cloud server 1710 determines whether to register a schedule from the mobile terminal. In step S2521, the cloud server 1710 determines whether the device connection instruction information notification timing has come.

To register a schedule from the mobile terminal, the cloud server 1710 advances to step S2513 and acquires a user ID and a mobile terminal ID to be registered. In step S2515, the cloud server 1710 acquires the schedule content. In step S2517, the cloud server 1710 registers the acquired schedule in the schedule DB 1715.

If the device connection instruction information notification timing has come, the cloud server 1710 advances to step S2523 and reads out the schedule content from the schedule DB 1715. In step S2525, the cloud server 1710 selects the mobile terminal of the transmission destination of the device connection instruction information. In step S2527, the cloud server 1710 selects a connected device and a connected connector and executes connected device selection processing of generating device connection instruction information (see FIG. 26). In step S2529, the cloud server 1710 transmits the generated device connection instruction information to the selected transmission destination mobile terminal.

(Connected Device Selection Processing)

FIG. 26 is a flowchart showing the processing procedure of connected device selection processing S2527 according to this embodiment. Note that the same step numbers as in FIG. 14 of the second embodiment denote the same steps in FIG. 26, and a description thereof will be omitted.

In step S2601, the cloud server 1710 selects a necessary device candidate in accordance with the schedule content. In step S2603, the cloud server 1710 selects a connected connector candidate in the schedule execution location or a connected connector candidate that can be used by connecting a connected device in the periphery. The subsequent processing is the same as in FIG. 14.

Fourth Embodiment

An information processing system according to the fourth embodiment of the present invention will be described next. The information processing system according to this embodiment is different from the second embodiment in that prediction of a change in the communication capacity or traffic is detected as event occurrence. The rest of the components and operations is the same as in the second embodiment. Hence, the same reference numerals as in the second embodiment denote the same components and operations, and a detailed description thereof will be omitted.

According to this embodiment, a device connection instruction is given to a user in correspondence with prediction of a change in the communication capacity or traffic, thereby preparing device connection to a mobile terminal corresponding to the communication state in advance.

<<Information Processing System>>

The arrangement and operation of the information processing system according to this embodiment will be described with reference to FIGS. 27, 18A, and 18B.

(Description of Operation)

FIG. 27 is a view for explaining the operation of an information processing system 2700 according to this embodiment.

The upper stage of FIG. 27 shows processing when a communication environment predictor 2711 of a cloud server 2710 predicts occurrence of a communication failure as an event during appreciation of a moving image on a display screen 2721 of a mobile terminal 2720 that is a smartphone. The communication failure includes a communication failure that occurs, for example, in an incommunicable zone such as a tunnel in which a vehicle enters, a communication failure caused by a natural environment such as a magnetic storm, and a connection failure caused by a malfunction of a relay station or a decrease or increase in the traffic. When the communication environment predictor 2711 predicts these communication failures, a window 2723 opens on a display screen 2722 of the mobile terminal 2720 shown in the central view of the upper stage. The window 2723 displays, for example, a message "Communication failures will occur 20 min later. Download to a mass storage is recommended" to prompt the user to connect a mass memory device. When a mass memory device 2730 is connected to the USB connector of the mobile terminal 2720, as shown on the right view of the upper stage, a display screen 2724 displays a message 2725 representing that download is progressing. Note that the displayed message may be accompanied with an audio output.

The lower stage of FIG. 27 assumes a case where the user uses a virtual PC of the cloud server 2710 by connecting, via a router 2740, a keyboard 2741 and a mouse 2742 to the USB connector of the display screen 2721 of the mobile terminal 2720 that is a smartphone. Also assumes a state in which the user wants to display a display screen 2726 of the mobile terminal 2720 on a large screen, or the user has connected a large display 2750 or is going to connect it in accordance with an instruction from the cloud server 1710 because of new necessity of a large screen. At this time, for example, a traffic predictor 2712 predicts the total traffic or average traffic of all devices. Upon predicting that the communication capacity of the mobile terminal will pose a problem in communication, the traffic predictor 2712 notifies the mobile terminal 2720 of it. To do this, a window 2728 opens on a display screen 2727 of the mobile terminal 2720 shown in the central view of the lower stage. The window 2728 displays, for example, a message "The communication capacity may be insufficient. Connect the display to another terminal" to prompt the user to connect the large display to another mobile terminal. When the large display 2750 is connected to the USB connector of a mobile terminal 2760 that is the tablet of a nearby friend, as shown on the right view of the lower stage, a communication failure of the mobile terminal 2720 caused by an increase in the traffic can be prevented.

(Operation Procedure)

Figure 28A:
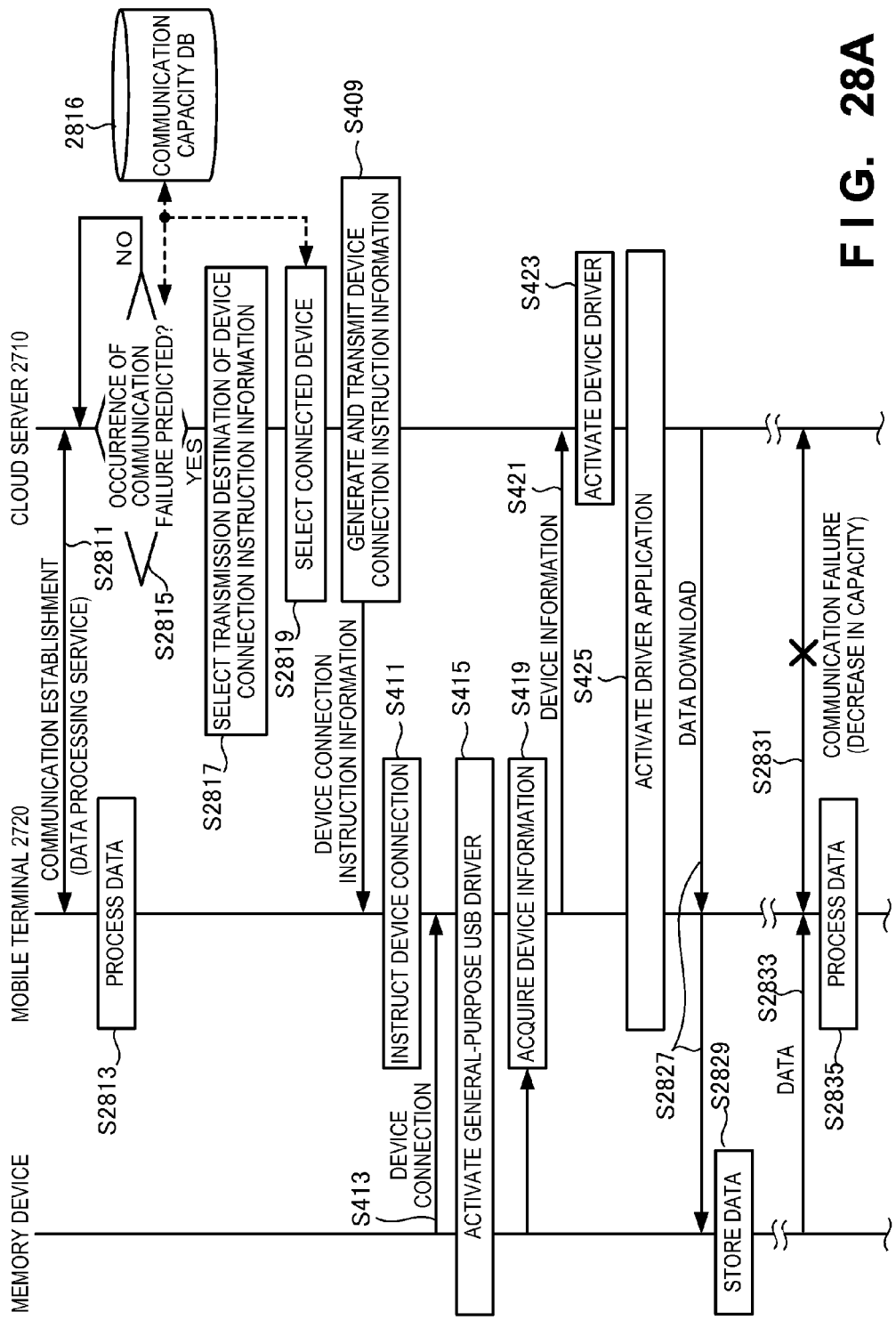
FIG. 28A is a sequence chart showing the operation procedure when predicting communication failure occurrence in the information processing system according to the fourth embodiment of the present invention.

FIGS. 28A and 28B show the operation procedure of the information processing system 2700 according to this embodiment. Note that the same step numbers as in FIG. 4A or 4B of the second embodiment denote the same steps in FIGS. 28A and 28B, and a description thereof will be omitted.

FIG. 28A is a sequence chart showing the operation procedure when predicting communication failure occurrence in the information processing system 2700 according to this embodiment.

In step S2811, communication between the cloud server 2710 and the mobile terminal 2720 has been established. The mobile terminal 2720 is performing data processing in step S2813.

When the cloud server 2710 that is predicting communication failure occurrence predicts occurrence of a communication failure based on a communication capacity DB 2816 in step S2815, the process advances to step S2817. In step S2817, the cloud server 2710 selects the transmission destination of device connection instruction information. In the upper stage of FIG. 27, the transmission destination is the mobile terminal 2720 in general. However, transmission to another mobile terminal in the periphery is also possible. In step S2819, the cloud server 2710 selects a connected device by referring to the communication capacity DB 2816. The procedure after device connection instruction information is generated and transmitted to the mobile terminal 2720 until a device (in this example, memory device) is connected and made controllable from the cloud server 2710 is the same as in FIG. 4A.

In step S2827, data is downloaded from the cloud server 2710 to the memory device. In step S2829, the memory device stores the downloaded data. After that, in step S2831, communication between the cloud server 2710 and the mobile terminal 2720 stops or the capacity becomes short due to a communication failure. At this time, in step S2833, the mobile terminal 2720 reads out the data downloaded to the memory device in advance. The data processing of the mobile terminal 2720 continues in step S2835 without being affected by the communication failure.

FIG. 28B is a sequence chart showing the operation procedure when predicting an increase in the traffic in the information processing system 2700 according to this embodiment. The same step numbers as in FIG. 28A denote the same steps in FIG. 28B, and a description thereof will be omitted.

In step S2851, a new device is connected to the mobile terminal 2720. In step S2853, the device information of the connected device is transmitted from the mobile terminal 2720 to the cloud server 2710.

In step S2855, the cloud server 2710 predicts an increase in the traffic by referring to a traffic DB 2817. In step S2859, the cloud server 2710 selects a connected connector to which the connection of the device is to be changed to suppress the increase in the traffic.

Upon knowing a device connection instruction of the mobile terminal 2720, the new device is disconnected from the mobile terminal 2720 in step S2861. In step S2863, the device is connected to the other mobile terminal 2760. In step S2865, the mobile terminal 2760 transmits acquired device information to the cloud server 2710. After that, the cloud server 2710 connects the new device to the virtual PC, thereby enabling data input/output between the device connected to the mobile terminal 2720 and the new device connected to the mobile terminal 2760 via the cloud server 2710.

<<Functional Arrangement of Cloud Server>>

Figure 29:
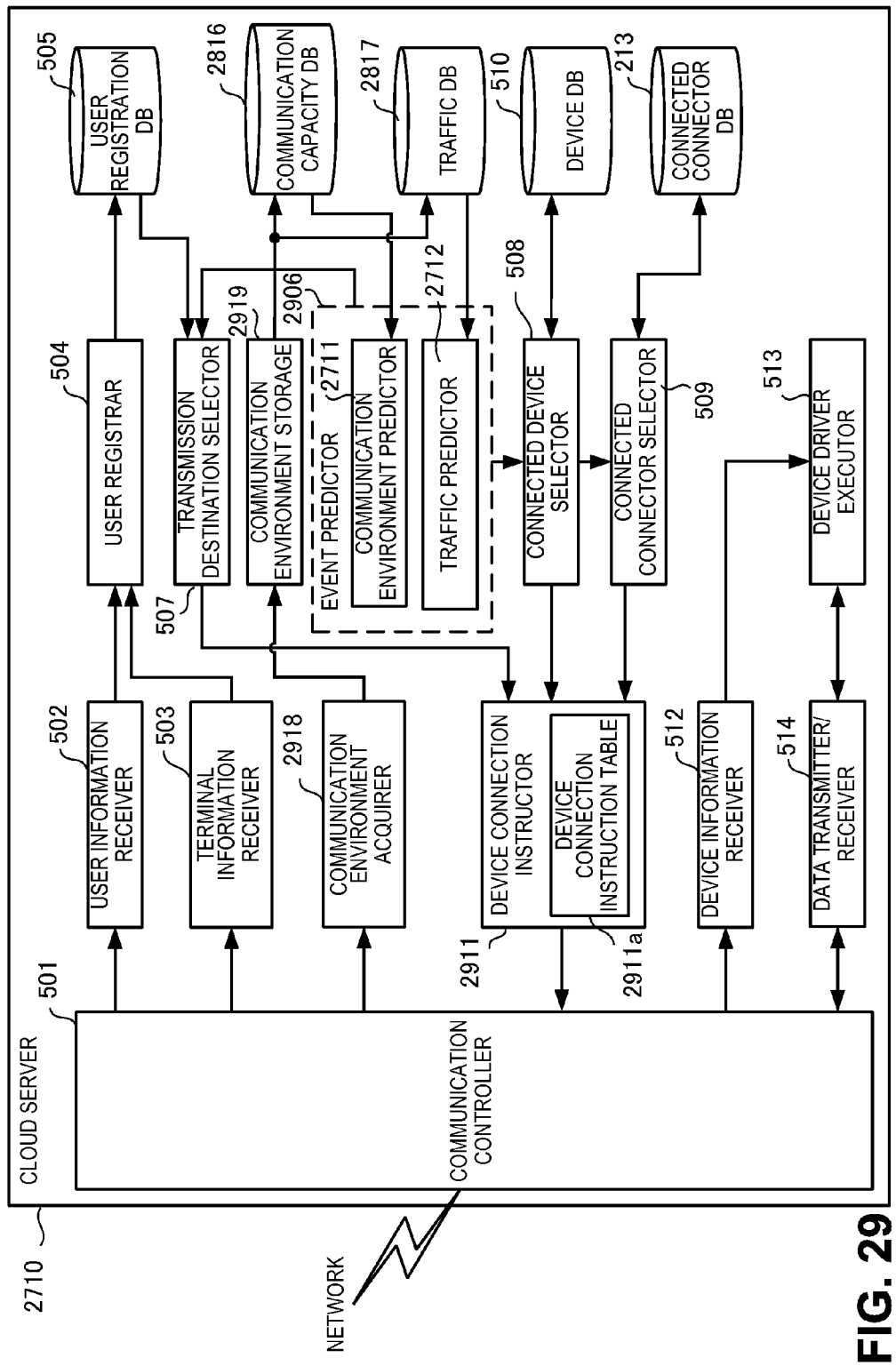
FIG. 29 is a block diagram showing the functional arrangement of a cloud server according to the fourth embodiment of the present invention.

FIG. 29 is a block diagram showing the functional arrangement of the cloud server 2710 according to this embodiment. Note that the same reference numerals as in FIG. 5 of the second embodiment denote the same functional components in FIG. 29, and a description thereof will be omitted.

A communication environment acquirer 2918 acquires the information of the communication environment from the mobile terminal or another communication apparatus via a communication controller 501. A communication environment storage 2919 stores the communication environment information in the communication capacity DB 2816 (see FIG. 30) and the traffic DB 2817 (see FIG. 31). An event predictor 2906 includes the communication environment predictor 2711 and the traffic predictor 2712. The communication environment predictor 2711 functions as communication capacity predictor that predicts the communication capacity by referring to the communication capacity DB 2816, and predicts occurrence of a communication failure. The traffic predictor 2712 predicts an increase in the traffic by referring to the traffic DB 2817. The event predictor 2906 predicts the communication failure of the communication environment predictor 2711 or the increase in the traffic of the traffic predictor 2712 as an event occurrence.

A device connection instructor 2911 includes a device connection instruction table 2911a (see FIG. 32), generates device connection instruction information including a connected device and a connected connector, and transmits it to the selected transmission destination mobile terminal.

(Communication Capacity DB)

FIG. 30 is a view showing the arrangement of the communication capacity DB 2816 according to this embodiment. Note that the arrangement of the communication capacity DB 2816 is not limited to FIG. 30.

The communication capacity DB 2816 includes a database 3010 that accumulates a history of a decrease in the communication capacity in a steady specific location or area, and a database 3020 that records a records a communication failure that suddenly occurs.

The database 3010 stores road information 3012 when concerning a road, a communication capacity decrease state 3013, a maximum duration 3014 during which the decrease in the communication capacity continues, and a maximum range 3015 of the decrease in the communication capacity in association with region information 3011.

The database 3020 stores a maximum range 3022 of a communication failure, a numerical value 3023 of the communication failure, a start time 3024 of the communication failure, and a predicted duration 3025 in association with region information 3021.

(Traffic DB)

Figure 31:
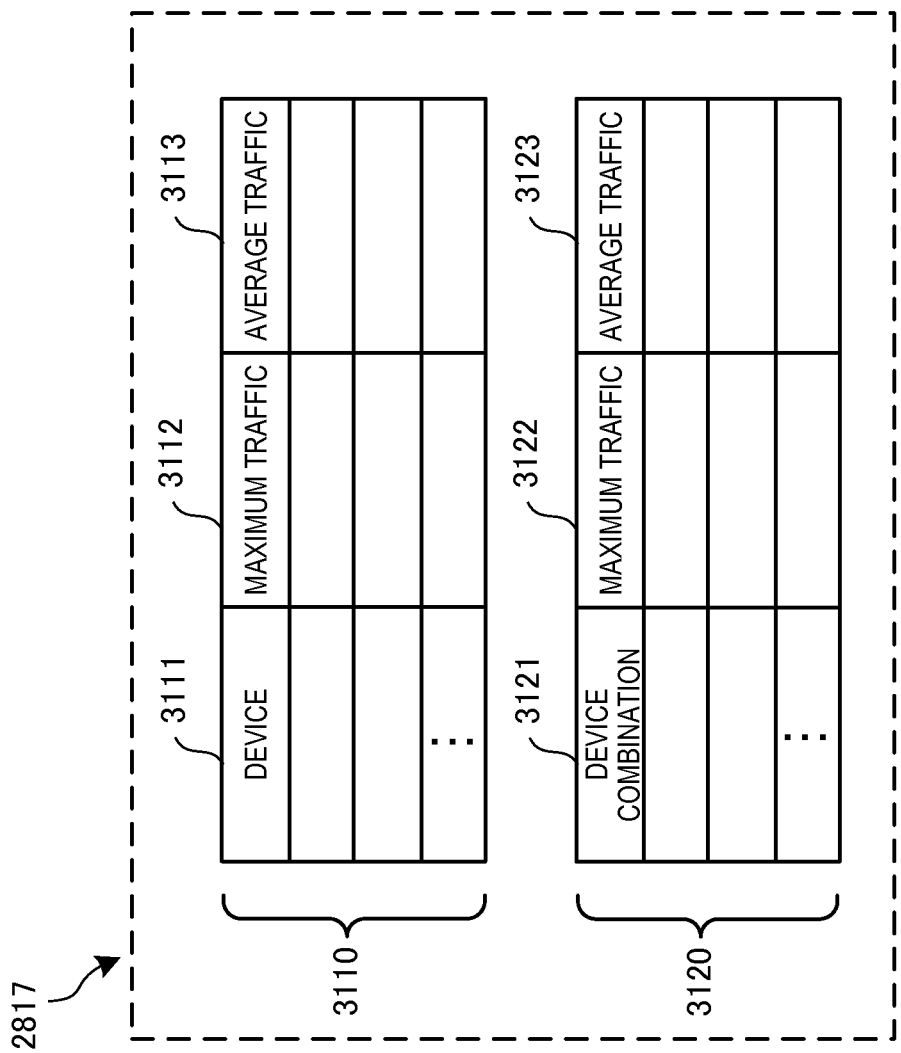
FIG. 31 is a view showing the arrangement of a traffic DB according to the fourth embodiment of the present invention.

FIG. 31 is a view showing the arrangement of the traffic DB 2817 according to this embodiment. Note that the arrangement of the traffic DB 2817 is not limited to FIG. 31.

The traffic DB 2817 includes a database 3110 that accumulates a history of a traffic corresponding to each device, and a database 3120 that accumulates a history of a traffic when using a combination of devices.

The database 3110 stores a maximum traffic 3112 and an average traffic 5113 in association with each device 3111. The database 3120 stores a maximum traffic 3122 and an average traffic 5123 in association with each device combination 3121.

(Device Connection Instruction Table)

Figure 32:
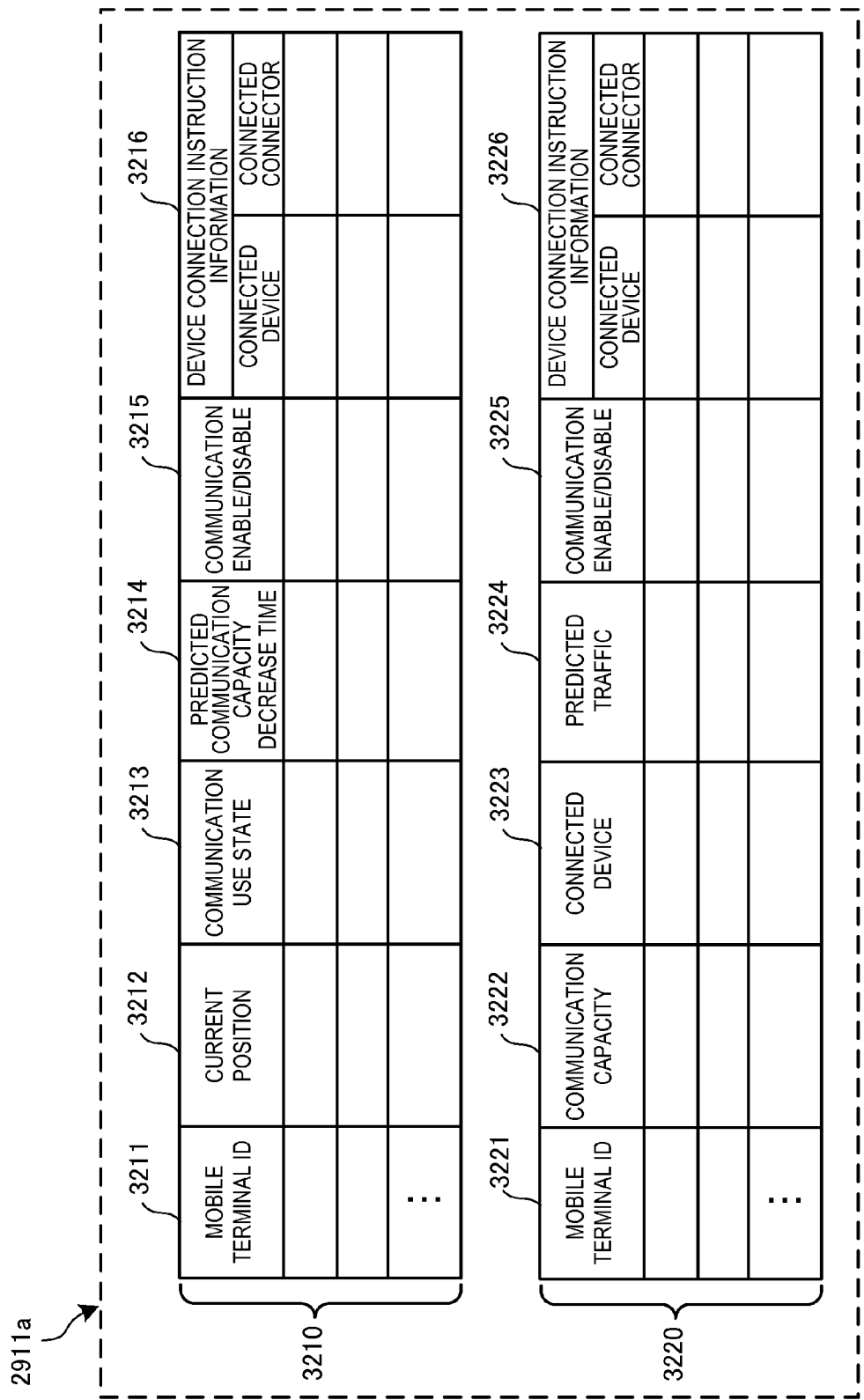
FIG. 32 is a view showing the arrangement of a device connection instruction table according to the fourth embodiment of the present invention.

FIG. 32 is a view showing the arrangement of the device connection instruction table 2911a according to this embodiment.

The device connection instruction table 2911a includes a table 3210 used in the operation shown in FIG. 28A, and a table 3220 used in the operation shown in FIG. 28B.

The database 3210 stores a current position 3212, a communication use state 3213, a predicted communication capacity decrease time 3214, a communication enable/disable 3215, and device connection instruction information 3216 including a connected device and a connected connector in association with a mobile terminal ID 3211.

The database 3220 stores a communication capacity 3222 allowed by a mobile terminal, a connected device 3223, a predicted traffic 3224, a communication enable/disable 3225, and device connection instruction information 3226 including a connected device and a connected connector in association with a mobile terminal ID 3221.

<<Processing Procedure of Cloud Server>>

FIG. 33 is a flowchart showing the processing procedure of the cloud server 2710 according to this embodiment. This flowchart is executed by a CPU 1110 shown in FIG. 11 using a RAM 1140 and implements the functional components shown in FIG. 29. Note that the same processes as in FIG. 13 of the second embodiment are deleted in FIG. 33.

In step S3311, the cloud server 2710 determines whether occurrence of a communication failure is predicted. In step S3321, the cloud server 2710 determines whether an increase in the traffic is predicted.

Upon predicting occurrence of a communication failure, the cloud server 2710 advances to step S3313 and selects the mobile terminal of the transmission destination of device connection instruction information. In step S3315, the cloud server 2710 generates device connection instruction information based on the communication capacity DB 2816. In step S3317, the cloud server 2710 transmits the device connection instruction information to the selected transmission destination mobile terminal.

Upon predicting occurrence of an increase in the traffic, the cloud server 2710 advances to step S3323 and selects the mobile terminal of the transmission destination of device connection instruction information. In step S3325, the cloud server 2710 generates device connection instruction information based on the traffic DB 2817. In step S3317, the cloud server 2710 transmits the device connection instruction information to the selected transmission destination mobile terminal.

Fifth Embodiment

An information processing system according to the fifth embodiment of the present invention will be described next. The information processing system according to this embodiment is different from the second to fourth embodiments in that a program after device connection is decided based on the history of the combinations of the device and used programs and executed. The rest of the components and operations is the same as in the second to fourth embodiments. Hence, the same reference numerals as in the second embodiment denote the same components and operations, and a detailed description thereof will be omitted.

According to this embodiment, after a device instructed by the user is connected, an information processing apparatus selects and executes a program appropriate for the connected devices so that a service of using the connected device without a user operation can be received.

<<Information Processing System>>

The arrangement and operation of the information processing system according to this embodiment will be described with reference to FIGS. 34 and 35. Note that in this embodiment, an example will be described in which a device is connected from event prediction based on a schedule according to the third embodiment, and an appropriate program is selected and activated, thereby causing a cloud server 3410 to process the connected device without a user operation. In particular, an example will be explained in which periodical collection of patient's biological information (pulses, blood pressure, body temperature, or the like) is performed using a mobile terminal by connecting a sensor device. However, the present invention is not limited to this.

(Description of Operation)

Figure 34:
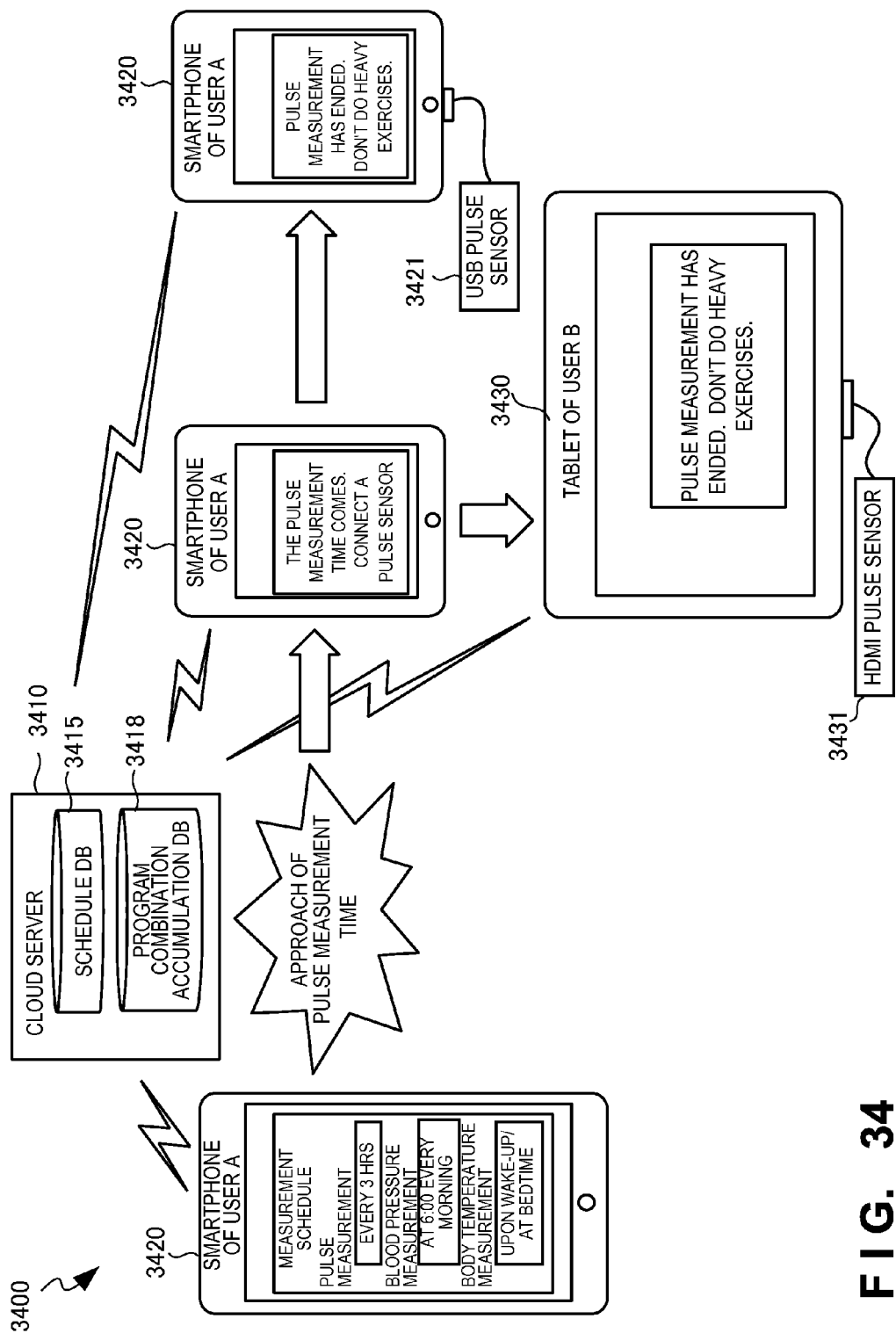
FIG. 34 is a view for explaining the operation of an information processing system according to the fifth embodiment of the present invention.

FIG. 34 is a view for explaining the operation of an information processing system 3400 according to this embodiment.

On the left view of FIG. 34, the measurement schedule of biological information of a user A who is a patient is registered from a mobile terminal 3420 that is the smartphone of the user A. For example, measuring the pulses every 3 hrs, measuring the blood pressure at 6:00 every morning, and measuring the body temperature upon wake-up and at bedtime are set in the schedule information. The schedule is transmitted from the mobile terminal 3420 to the cloud server 3410 and registered in a schedule DB 3415 of the cloud server 3410.

For example, out of the set schedule, an approach of the pulse measurement time is detected as event occurrence. First, as shown in the central view of the upper stage, a message "The pulse measurement time comes. Connect a pulse sensor" is displayed on the screen of the mobile terminal 3420 that is the smartphone of the user A. If a USB pulse sensor 3421 connectable to the USB connector of the mobile terminal 3420 exists in the vicinity, the pulses are measured by connecting the USB pulse sensor 3421 to the mobile terminal 3420. In this case, if the USB pulse sensor 3421 is the one that is always used by the user A or is of the same model, no problem arises. However, if the USB pulse sensor 3421 is of a different model, a program including a device driver requires to be searched for and installed. In this embodiment, however, a program corresponding to the connected USB pulse sensor 3421 is automatically selected and installed based on a program combination accumulation DB 3418 held by the cloud server 3410. For this reason, no user operation is necessary.

Also, for example, assume that not a USB pulse sensor but an HDMI pulse sensor 3431 exists in the vicinity. In this case, if a mobile terminal 3430 that is the tablet of a user B, which includes an HDMI connector, exists in the vicinity, the pulses of the user A can be measured by connecting the HDMI pulse sensor 3431 to the mobile terminal 3430. In this case, normally, the mobile terminal 3430 is not used to measure the pulses. Hence, just connecting is not enough to operate the HDMI pulse sensor 3431. The device driver of the HDMI pulse sensor 3431, a driver application used to control the HDMI pulse sensor 3431 from the cloud server 3410 via the mobile terminal 3430, a data processing application that collects and processes biological information, a web application used to do the data processing between the sensor and the mobile terminal, and the like require to be searched and installed by the user. In this embodiment, however, the program is automatically installed by referring to the history accumulated in the program combination accumulation DB 3418 of the cloud server 3410 and executed. Hence, no user operation is necessary.

As a result, the user A is notified via the mobile terminal 3420 or 3430 of a message "Pulse measurement has ended. Don't do heavy exercises".

(Operation Procedure)

Figure 35:
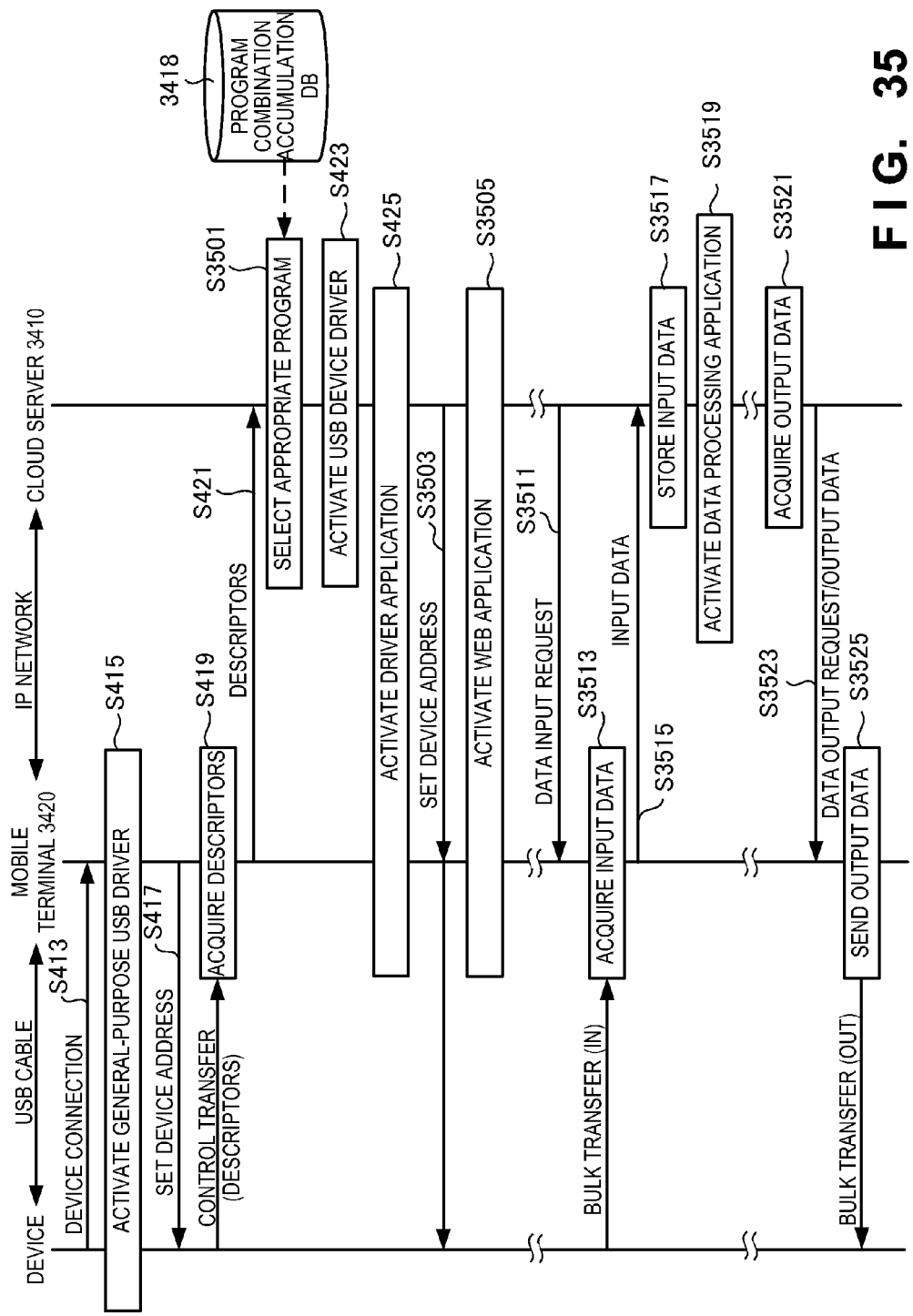
FIG. 35 is a sequence chart showing the operation procedure after device connection in the information processing system according to the fifth embodiment of the present invention.

FIG. 35 is a sequence chart showing the operation procedure after device connection in the information processing system 3400 according to this embodiment. Note that the same step numbers as in FIG. 4A of the second embodiment denote the same steps in FIG. 35, and a description thereof will be omitted.

Upon acquiring descriptors from the device connected to the mobile terminal 3420, the cloud server 3410 selects a program appropriate for processing using the connected device in step S3501 by referring to the program combination accumulation DB 3418. After activating the selected USB device driver and driver application, the cloud server 3410 sets a device address in step S3505. In step S3505, the selected web application is activated.

Data input/output after that is performed in the following way. For data input from the device, the cloud server 3410 sends a data input request to the mobile terminal 3420 in step S3511. In step S3513, the mobile terminal 3420 acquires input data by bulk transfer (IN). In step S3515, the mobile terminal 3420 IP-encapsulates the input data and transmits it to the cloud server 3410. In step S3517, the cloud server 3410 stores the input data. If data processing is necessary, a data processing application is activated in step S3519. Note that the data processing application is also selected in step S3501.

On the other hand, to output data to the device, the cloud server 3410 acquires output data in step S3521. In step S3523, the cloud server 3410 transmits a data output request to the mobile terminal 3420 together with the output data. In step S3525, the mobile terminal 3420 sends the decapsulated output data to the device by bulk transfer (OUT).

<<Functional Arrangement of Cloud Server>>

Figure 36:
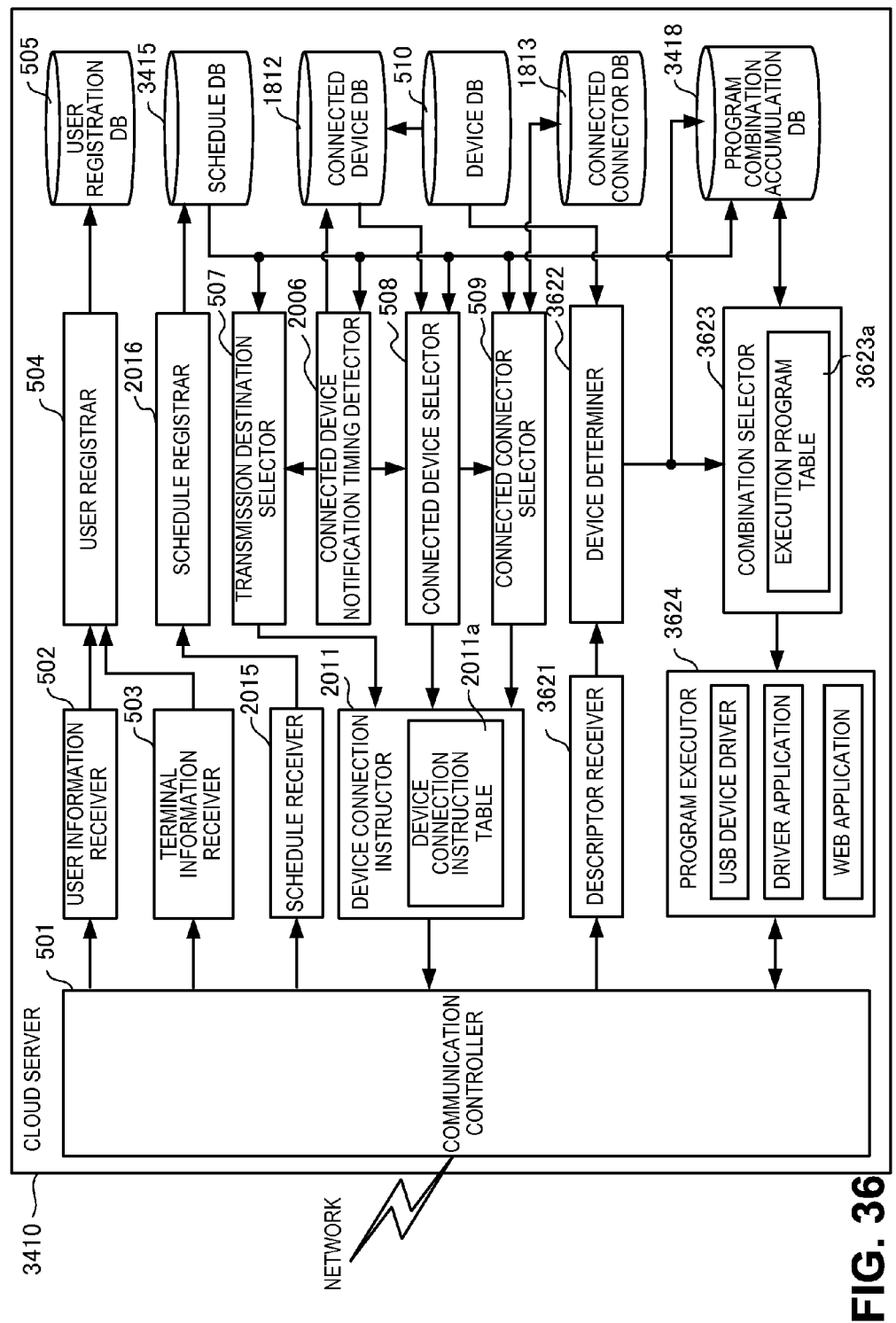
FIG. 36 is a block diagram showing the functional arrangement of a cloud server according to the fifth embodiment of the present invention.

FIG. 36 is a block diagram showing the functional arrangement of the cloud server 3410 according to this embodiment. Note that the same reference numerals as in FIG. 5 of the second embodiment or FIG. 20 of the third embodiment denote the same functional components in FIG. 36, and a description thereof will be omitted.

A schedule DB 3415 registers a schedule concerning biological information measurement according to this embodiment (see FIG. 37).

A descriptor receiver 3621 receives the descriptors of a connected device which are transmitted by the mobile terminal. A device determiner 3622 determines the connected device based on the received descriptors and the contents of a device DB 510. A combination selector 3623 includes an execution program table 3623a (see FIG. 39), and selects a combination of execution programs by referring to the program combination accumulation DB 3418 (see FIG. 38). A program executor 3624 executes the selected program. The program to be selected and executed includes a USB device driver, a driver application (driver application in FIG. 36), and a web application (web application in FIG. 36).

(Schedule DB)

FIG. 37 is a view showing the arrangement of the schedule DB 3415 according to this embodiment. Note that the schedule DB 3415 is not limited to FIG. 37. In addition, the same reference numerals as in FIG. 21 of the third embodiment denote the same fields.

The schedule DB 3415 stores a schedule content 3702 in association with a date/time 2101 of an event occurrence for instructing the user's mobile terminal to connect a device in accordance with the schedule. A connected device instruction timing 3703, a user ID 2104 who has registered the schedule, and a measurement target patient ID 3705 are stored in association with each schedule content 3702.

(Program Combination Accumulation DB)

FIG. 38 is a view showing the arrangement of the program combination accumulation DB 3418 according to this embodiment. Note that the program combination accumulation DB 3418 is not limited to FIG. 38.

The program combination accumulation DB 3418 stores a connected device 3803 in the history of connection in association with a mobile terminal 3801 and a connected connector 3802 held by the mobile terminal 3801. A combination of a used driver 3804 and a used application 3805 are stored in association with each connected device 3803. Note that the used driver is a device driver. The used application includes a driver application, a data processing application, and a web application. The used application 3805 can also store different combinations.

A use count 3806, a total satisfaction level 3807 of all users, an average satisfaction level 3808, and a maximum/minimum satisfaction level 3809 are stored in association with each combination of the used driver 3804 and the used application 3805. Another index can also be stored.

The combination selector 3623 gives scores to various programs usable in a combination with the connected device by referring to the use count 3806, the total satisfaction level 3807 of all users, the average satisfaction level 3808, and the maximum/minimum satisfaction level 3809, and automatically selects and installs the program of the highest score.

(Execution Program Table)

Figure 39:
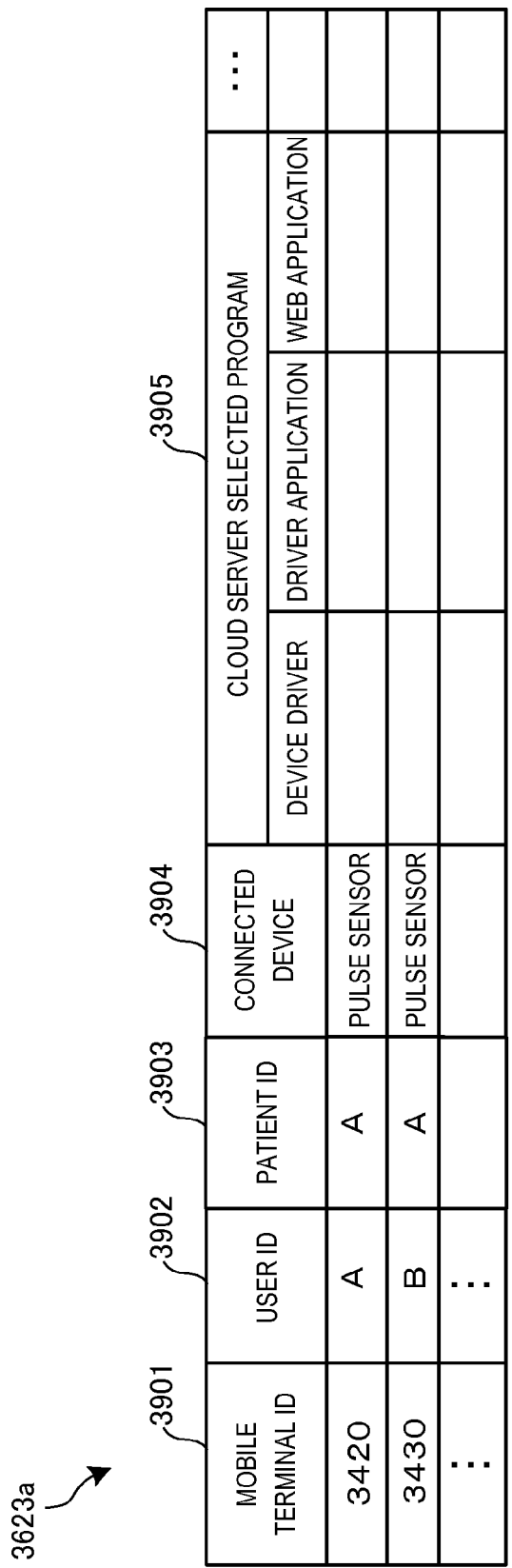
FIG. 39 is a view showing the arrangement of an execution program table according to the fifth embodiment of the present invention.

FIG. 39 is a view showing the arrangement of the execution program table 3623a according to this embodiment.

The execution program table 3623a stores a patient ID 3903, a connected device 3904, and a cloud server selected program 3905 selected by the cloud server 3410 in association with a mobile terminal ID 3901 and a user ID 3902. The cloud server selected program 3905 is an appropriate combination of a device driver, a driver application, and a web application and is automatically executed by the cloud server 3410. Hence, the user can use the connected device without any operation.

<<Processing Procedure of Cloud Server>>

Figure 40:
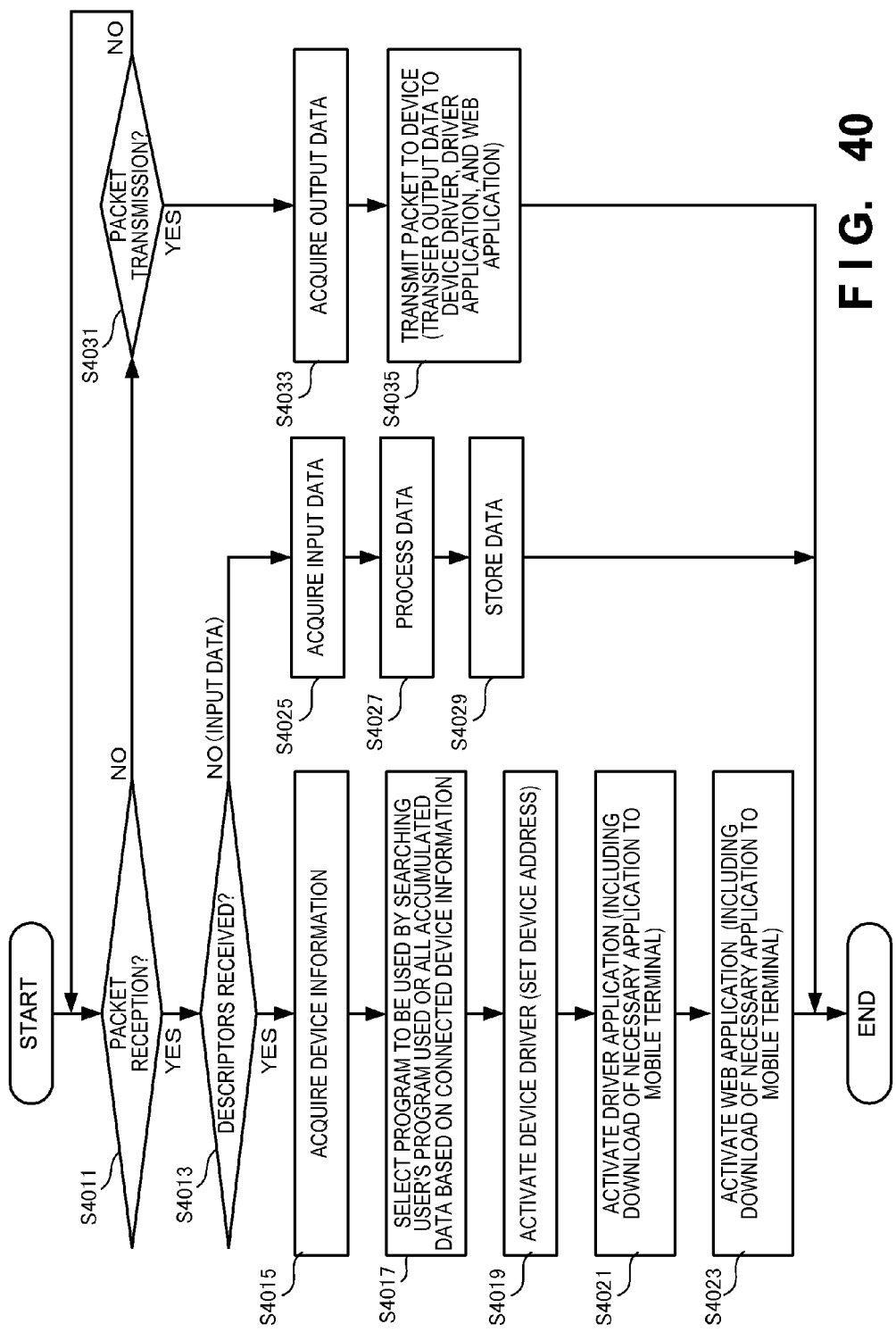
FIG. 40 is a flowchart showing the processing procedure of the cloud server according to the fifth embodiment of the present invention.

FIG. 40 is a flowchart showing the processing procedure of the cloud server 3410 according to this embodiment. This flowchart is executed by a CPU 1110 shown in FIG. 11 using a RAM 1140 and implements the functional components shown in FIG. 36. Note that the flowchart of FIG. 40 starts in accordance with an event occurrence such as a packet transmission/reception in the cloud server 3410.

In step S4011, the cloud server 3410 determines whether a packet is received. In step S4031, the cloud server 3410 determines whether to transmit a packet. Upon receiving a packet, the cloud server 3410 advances to step S4013, decapsulates the packet, and determines whether the descriptors of the connected device are received. If no descriptors are received, the cloud server 3410 determines that input data is received.

Upon receiving descriptors, the cloud server 3410 advances to step S4015 and acquires the device information of the connected device from the descriptors. In step S4017, the cloud server 3410 searches the program combination accumulation DB 3418 based on the device information and selects a program that appropriately operates the device. In step S4019, the cloud server 3410 activates the selected device driver. Note that the cloud server 3410 sets a device address for the device. In step S4021, the cloud server 3410 activates the selected driver application. The cloud server 3410 downloads an application corresponding to the mobile terminal 3420 as required. In step S4023, the cloud server 3410 activates the selected web application.

Upon receiving input data, the cloud server 3410 advances to step S4025 and acquires the input data. In step S4027, the cloud server 3410 performs data processing as required. Note that the data processing application can also be selected in step S4017. In step S4029, the cloud server 3410 stores the input data from the device.

On the other hand, to transmit a packet to the device, the cloud server 3410 advances to step S4033 and acquires output data. In step S14035, the cloud server 3410 outputs the encapsulated output data to the device. That is, the cloud server 3410 transfers the output data to the device driver, the driver application, and the web application.

Sixth Embodiment

An information processing system according to the sixth embodiment of the present invention will be described next. The information processing system according to this embodiment is different from the second to fifth embodiments in that when the traffic or communication capacity is predicted, and the band is determined to be insufficient, the mobile terminal performs communication via a plurality of communication paths. The rest of the components and operations is the same as in the second to fifth embodiments. Hence, the same reference numerals as in the second to fifth embodiments denote the same components and operations, and a detailed description thereof will be omitted.

According to this embodiment, the band is automatically changed by predicting the traffic or communication capacity, a connected device can be processed without user's awareness of the change in the traffic or communication capacity.

<<Operation Procedure of Information Processing System>>

FIG. 41 is a sequence chart showing the operation procedure when a mobile terminal communicates via a plurality of communication paths in an information processing system 4100 according to this embodiment.

In step S4101, a cloud server 4110 and a device 4130 are performing data input/output via a mobile terminal 4120.

In step S4111, the cloud server 4110 predicts the traffic and the communication capacity. In step S4113, the cloud server 4110 determines whether the communication band of the mobile terminal 4120 is sufficient as the result of prediction of the traffic and the communication capacity. If the communication band is sufficient, the data input/output is measured directly.

Upon predicting that the communication band of the mobile terminal 4120 is not sufficient as compared to the traffic, the cloud server 4110 advances to step 4115 and selects an appropriate communication method of the mobile terminal 4120. The communication method of the mobile terminal 4120 is, for example, communicating by 4G/3G alone, communicating by WiFi alone, or communicating while extending the communication band using both 4G/3G and WiFi.

In step S4117, the communication method is changed to the selected one. In step S4119, a driver application for a first channel that is 4G/3G is activated. In step S4121, a driver application for a second channel that is EiFi is activated. From then on, the mobile terminal 4120 separates data input/output between it and the device 4130 in step S4123. In step S4125, broadband communication using both 4G/3G and WiFi is performed. Note that when a plurality of devices are connected, the communication separation may be done on a device basis. Alternatively, input data and output data may be separated, or image data and audio data may be separated.

Seventh Embodiment

An information processing system according to the seventh embodiment of the present invention will be described next. The information processing system according to this embodiment is different from the second to sixth embodiments in that when a device is connected to a mobile terminal, the mobile terminal cannot acquire device information. The rest of the components and operations is the same as in the second to sixth embodiments. Hence, the same reference numerals as in the second to sixth embodiments denote the same components and operations, and a detailed description thereof will be omitted.

According to this embodiment, even when the mobile terminal cannot acquire device information, a cloud server controls the connected device. For this reason, control can be done for a connected device of whatever type.

<<Operation Procedure of Information Processing System>>

FIG. 42 is a sequence chart showing an operation procedure when a mobile terminal in an information processing system 4200 according to this embodiment cannot acquire device information.

In FIG. 42, as an example in which a mobile terminal 4220 cannot acquire device information, a case where a device is connected from an RS232 cable to a USB cable will be described. Assume that the mobile terminal 4220 has no special driver configured to acquire, from a USB packet, the device information of a device connected to the RS232. However, the present invention is not limited to this. Note that the same step numbers as in FIG. 4A of the second embodiment denote the same steps in FIG. 42, and a description thereof will be omitted.

In step S4201, a device is connected to the mobile terminal 4220 via an RS232 cable and a USB cable. From step S415, the mobile terminal 4220 attempts to acquire the descriptors of the device by activating a general-purpose USB driver. However, in step S419, a timeout occurs without acquiring the descriptors.

Upon detecting the timeout, the mobile terminal 4220 stops processing of the general-purpose USB driver in step S4209. In step S4211, the mobile terminal 4220 requests a cloud server 4210 to control the connected device.

Upon receiving the device control request, the cloud server 4210 sequentially operates drivers capable of operating the connected device and determines the connected device in step S4213. More specifically, first, in step S4215, the cloud server 4210 activates a set of drivers. In step S4217, the cloud server 4210 accesses the device by the activated drivers. In step S4219, the cloud server 4210 determines whether the device is controllable. Upon determining that the device is controllable, the cloud server 4210 acquires the device information by the drivers in step S4221. The drivers include a driver that implements conversion between RS232 and USB in addition to the drivers capable of driving the device.

When the device information is acquired, the cloud server 4210 selects an appropriate program including a device driver, a driver application, and data processing application, and a web application by referring to a program combination accumulation DB 3418 in step S3501.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a storage medium storing the program, and a WWW (World Wide Web) server that causes a user to download the program.

This application claims the benefit of Japanese Patent Application No. 2012-068503 filed on Mar. 24, 2012, which is hereby incorporated by reference herein in its entirety.

The invention claimed is:

1. An information processing apparatus comprising:
a memory storing instructions; and
one or more processors configured to execute the instructions to:
  detect an event occurrence requiring a device connection to a mobile terminal;
  predict, in response to the detection of the event occurrence, the device connection to the mobile terminal to handle the event; and
  transmit, via a network, to a mobile terminal, device connection instruction information for instructing a user to perform the predicted device connection,
  wherein, to detect the event occurrence, the one or more processors are configured to execute the instructions to predict a communication capacity of the mobile terminal, and to detect prediction of a change in the communication capacity as the event occurrence, and wherein, to predict the device connection to the mobile terminal, the one or more processors are configured to use the predicted change in the communication capacity of the mobile terminal to avoid an impact of the change in the communication capacity of the mobile terminal.

2. The information processing apparatus according to claim 1, wherein the one or more processors are further configured to execute the instructions to:
store a schedule of the user,
detect an approach of the schedule as the event occurrence, and
predict the device connection for executing the schedule of the user in response to the approach of the schedule.

3. The information processing apparatus according to claim 2, wherein the schedule of the user is a schedule of a electronic conference, and the one or more processors are further configured to execute the instructions to:
store participants in the TV conference, and
when there is no response to the device connection instruction information, predict the device connection to a mobile terminal of a participant who is not the user from the participants in the conference, and transmit the device connection instruction information to the mobile terminal of the participant who is not the user.

4. The information processing apparatus according to claim 2,
wherein the schedule of the user is the schedule of an electronic conference, and the one or more processors are further configured to execute the instructions to:
accumulate a connection history via the network by the user, and
when there is no response to the device connection instruction information to the user, estimate a participant who is not the user by referring to the connection history, predict the device connection to a mobile terminal of the estimated participant, and said transmit the user connection instruction information to the mobile terminal of the estimated participant.

5. The information processing apparatus according to claim 1, wherein the one or more processors are further configured to execute the instructions to:
predict a traffic of the mobile terminal,
detect prediction of an increase in the traffic as the event occurrence, and
predict device connection to a mobile terminal different from the mobile terminal based on the predicted increase in the traffic of the mobile terminal.

6. The information processing apparatus according to claim 1, wherein the one or more processors are further configured to execute the instructions to:
accumulate information associated with the device connection to the mobile terminal, and
predict the device connection to the mobile terminal based on the information associated with the device connection.

7. The information processing apparatus according to claim 6, wherein the one or more processors are further configured to execute the instructions to:
accumulate a history of used devices in correspondence with events to occur, and
predict the device connection to handle the events based on the history of the used devices.

8. The information processing apparatus according to claim 7, wherein the one or more processors are further configured to execute the instructions to:
accumulate the history of the devices used to execute the schedule, and
predict the device connection for executing the schedule of the user based on the history of the used devices.

9. The information processing apparatus according to claim 1, wherein the one or more processors are further configured to execute the instructions to:
identify combinations of a device connected to the mobile terminal and a program used to operate the device;
decide an appropriate combination of the identified combinations when the device is connected to the mobile terminal; and
execute the program in accordance with the appropriate decided combination.

10. The information processing apparatus according to claim 9, wherein the program includes a device driver that drives the device, a driver application that controls the device via the network and the mobile terminal, and a data processing application that executes data processing using the device on a predetermined communication protocol via the network and the mobile terminal.

11. A control method of an information processing apparatus, the method comprising:
detecting an event occurrence requiring a device connection to a mobile terminal;
predicting, in response to the detection of the event occurrence, the device connection to the mobile terminal to handle the event; and
transmitting, via a network, to the mobile terminal, device connection instruction information for instructing a user to perform the predicted device connection,
wherein detecting the event occurrence includes predicting a communication capacity of the mobile terminal and detecting prediction of a change in the communication capacity as the event occurrence, and
wherein predicting includes using the predicted change in the communication capacity of the mobile terminal to avoid an impact of the change in the communication capacity of the mobile terminal.

12. The control method according to claim 11, further comprising:
storing a schedule of the user,
detecting an approach of the schedule as the event occurrence, and
predicting the device connection for executing the schedule of the user in response to the approach of the schedule.

13. The control method according to claim 12, wherein the schedule of the user is the schedule of an electronic conference, and the method further comprises:
storing participants in the conference, and
when there is no response to the device connection instruction information to the user, predicting the device connection to a mobile terminal of a participant who is not the user from the participants in the conference, and transmitting the device connection instruction information to the mobile terminal of the participant who is not the user.

14. The control method according to claim 12, wherein the schedule of the user is the schedule of an electronic conference, and the method further comprises:
accumulating a connection history of the user via the network, and
when there is no response to the device connection instruction information to the user, estimating a participant who is not the user by referring to the connection history, predicting the device connection to a mobile terminal of the estimated participant, and transmitting the user connection instruction information to the mobile terminal of the estimated participant.

15. The control method according to claim 11, further comprising:
    predicting a traffic of the mobile terminal,
    detecting prediction of an increase in the traffic as the event occurrence, and
    predicting the device connection to a mobile terminal different from the mobile terminal based on the predicted increase of the traffic of the mobile terminal.

16. A non-transitory computer-readable medium storing a control program that, when executed by a processor of an information processing apparatus, causes the processor to perform a method, the method comprising:
    detecting an event occurrence requiring a device connection to a mobile terminal;
    predicting, in response to the detection of the event occurrence, the device connection to the mobile terminal to handle the event; and
    transmitting via a network, to the mobile terminal, device connection instruction information for instructing a user to perform the predicted device connection,
    wherein the detecting includes predicting a communication capacity of the mobile terminal and detecting prediction of a change in the communication capacity as the event occurrence, and
    wherein predicting includes using the predicted change in the communication capacity of the mobile terminal to avoid an impact of the change in the communication capacity of the mobile terminal.

17. An information processing system comprising:
    a mobile terminal; and
    an information processing apparatus connected to the mobile terminal via a network, the information processing apparatus comprising:
        a first memory storing first instructions; and
        one or more first processors configured to execute the first instructions to:
            detect an event occurrence requiring a device connection to the mobile terminal;
            predict, in response to the detection of the event occurrence, the device connection to the mobile terminal to handle the event; and
            transmit via a network, to the mobile terminal, device connection instruction information for instructing a user to perform the predicted device connection,
        wherein, to detect the event occurrence, the one or more first processors are configured to execute the first instructions to predict a communication capacity of the mobile terminal and to detect prediction of a change in the communication capacity as the event occurrence, and
        wherein, to predict the device connection to the mobile terminal, the one or more first processors are configured to execute the first instruction to use the predicted change in the communication capacity of the mobile terminal to avoid an impact of the change in the communication capacity of the mobile terminal, and
    the mobile terminal comprising:
        a second memory storing second instructions; and
        one or more second processors configured to execute the second instructions to:
        receive the device connection instruction information; and
        connect the device according to the device connection instruction information.

* * * * *

UNITED STATES PATENT AND TRADEMARK OFFICE
CERTIFICATE OF CORRECTION

PATENT NO. : 9,509,950 B2
APPLICATION NO. : 14/387695
DATED : November 29, 2016
INVENTOR(S) : Kobayashi It is certified that error appears in the above-identified patent and that said Letters Patent is hereby corrected as shown below:

In the Claims

Claim 3, Column 29, Lines 17-18, delete "a electronic conference," and insert --an electronic conference,--.

Claim 4, Column 29, Line 38, delete "and said transmit" and insert --and transmit--.

Signed and Sealed this
Twenty-first Day of March, 2017

Michelle K. Lee
*Director of the United States Patent and Trademark Office*